US011277395B2

(12) United States Patent
Leblond et al.

(10) Patent No.: US 11,277,395 B2
(45) Date of Patent: Mar. 15, 2022

(54) CLOUD-AUTHENTICATED SITE RESOURCE MANAGEMENT DEVICES, APPARATUSES, METHODS AND SYSTEMS

(71) Applicant: Schneider Electric Buildings, LLC, Rockford, IL (US)

(72) Inventors: Simon Leblond, Montreal (CA); Simon Caron, Montreal (CA)

(73) Assignee: Schneider Electric Buildings, LLC, Rockford, IL (US)

( * ) Notice: Subject to any disclaimer, the term of this patent is extended or adjusted under 35 U.S.C. 154(b) by 0 days.

(21) Appl. No.: 17/030,125

(22) Filed: Sep. 23, 2020

(65) Prior Publication Data

US 2021/0258293 A1 Aug. 19, 2021

Related U.S. Application Data

(62) Division of application No. 16/289,835, filed on Mar. 1, 2019, now Pat. No. 10,819,692, which is a division of application No. 15/023,971, filed as application No. PCT/US2014/058480 on Sep. 30, 2014, now Pat. No. 10,375,047.

(Continued)

(51) Int. Cl.
*H04L 29/06* (2006.01)
*H04L 9/32* (2006.01)

(52) U.S. Cl.
CPC .............. *H04L 63/08* (2013.01); *H04L 9/32* (2013.01)

(58) Field of Classification Search
CPC ..................................................... H04L 63/08
See application file for complete search history.

(56) References Cited

U.S. PATENT DOCUMENTS 6,085,238 A 7/2000 Yuasa et al.
2002/0093425 A1* 7/2002 Puchek ................... G07C 9/37
340/540

(Continued)

FOREIGN PATENT DOCUMENTS

SG        175493 A1   11/2011

OTHER PUBLICATIONS

Extended European Search Report for EP Application No. 21181904.0 dated Dec. 17, 2021.

*Primary Examiner* — Bradley W Holder
(74) *Attorney, Agent, or Firm* — Locke Lord LLP

(57) ABSTRACT

The CLOUD-AUTHENTICATED SITE RESOURCE MANAGEMENT DEVICES, APPARATUSES, METHODS AND SYSTEMS ("CASRM") transforms resource-use, weather, and user settings inputs into resource management schedule and control outputs. The CASRM achieves data transformation via using a building automation management device, comprising at least a processor a memory storing processor-executable instructions to receive, at a virtual cloud network controller, a data packet from a source building resource control device and to access a virtual routing table corresponding to a local virtual network associated with a control entity. The building automation management device may also determine a destination building resource control device based on the virtual routing table and at least one destination address in the data packet, and may send the data packet to the destination building resource control device.

20 Claims, 47 Drawing Sheets

Related U.S. Application Data

(60) Provisional application No. 61/949,865, filed on Mar. 7, 2014, provisional application No. 61/884,995, filed on Sep. 30, 2013.

(56) References Cited

U.S. PATENT DOCUMENTS

| | | | |
|---|---|---|---|
| 2003/0149576 A1* | 8/2003 | Sunyich | G06Q 10/02 705/5 |
| 2013/0043973 A1* | 2/2013 | Greisen | G07C 9/00817 340/5.51 |
| 2014/0015638 A1* | 1/2014 | Cochran | G06K 7/10297 340/5.65 |

* cited by examiner

Figure 6  Controller Settings Update Component

Figure 19B

CLOUD-AUTHENTICATED SITE RESOURCE MANAGEMENT DEVICES, APPARATUSES, METHODS AND SYSTEMS

PRIORITY CLAIM

This patent application is a divisional of U.S. patent application Ser. No. 16/289,835 filed Mar. 1, 2019, which is a divisional of U.S. patent application Ser. No. 15/023,971 filed Mar. 22, 2016, which is a national stage of PCT Application Serial No. PCT/US2014/058480, filed Sep. 30, 2014 and entitled, "CLOUD-AUTHENTICATED SITE RESOURCE MANAGEMENT APPARATUSES, METHODS AND SYSTEMS," which in turn claims priority to and the benefit of: (1) U.S. provisional patent application Ser. No. 61/884,995, filed Sep. 30, 2013, and entitled, "CLOUD-AUTHENTICATED SITE RESOURCE MANAGEMENT APPARATUSES, METHODS AND SYSTEMS"; and (2) U.S. provisional patent application Ser. No. 61/949,865, filed Mar. 7, 2014, and entitled "CLOUD-AUTHENTICATED SITE RESOURCE MANAGEMENT APPARATUSES, METHODS AND SYSTEMS." The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address resource management via cloud-authenticated devices, and more particularly, include CLOUD-AUTHENTICATED SITE RESOURCE MANAGEMENT DEVICES, APPARATUSES, METHODS AND SYSTEMS.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Users may wish to control a plurality of resources within a site or building. A user may use an electronic device to monitor resource use.

BRIEF DESCRIPTION OF THE DRAWINGS

The accompanying appendices and/or drawings illustrate various non-limiting, example, innovative aspects in accordance with the present descriptions:

FIGS. 19A-B show screenshot diagrams illustrating Zigbee network settings in some embodiments of the CASRM;

DETAILED DESCRIPTION

Figure 1A:
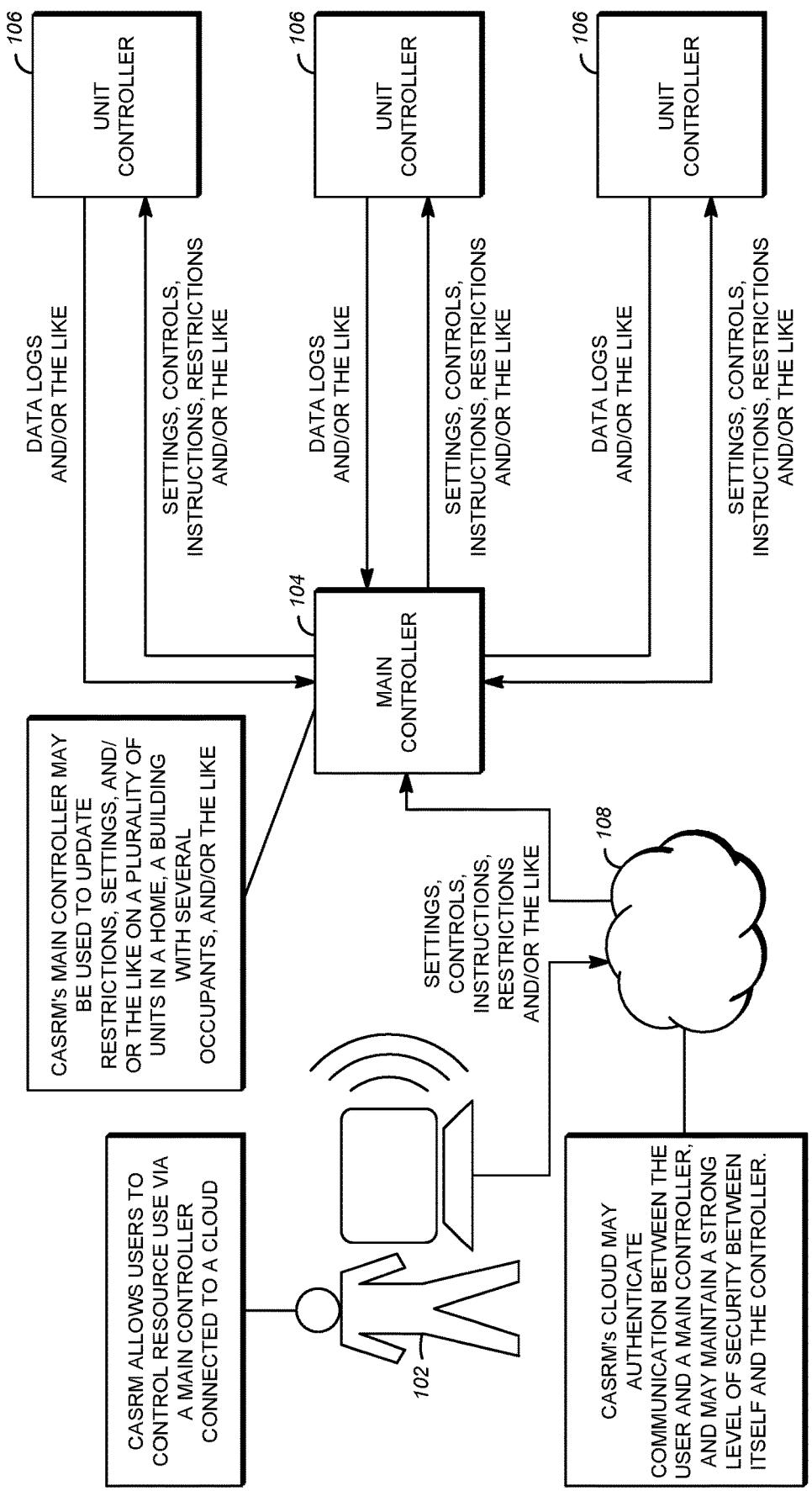
FIGS. 1A-C show block diagrams illustrating example embodiments of the CLOUD-AUTHENTICATED SITE RESOURCE MANAGEMENT DEVICES, APPARATUSES, METHODS AND SYSTEMS (hereinafter "CASRM")

FIG. 1A shows a block diagram illustrating example embodiments of the CASRM. In some implementations, a user 102 may wish to control resources within a home, building, and/or a similar site. In some implementations, a user may be a person living in a home, a landlord, superintendent, and/or a like entity, a resource company (e.g., an electric company), and/or the like. In some implementations, a user may wish to monitor electric, gas, water, oil, and/or like resources, and/or may wish to control electronic home and/or like appliances (including but not limited to kitchen appliances, lights, heating and air conditioning units, washing and drying machines, electronic showers and/or baths, electronic window shades and/or blinds, fans, bathroom resources, computer resources, and/or the like). The user may choose to control these resources and/or appliances via a building resource control device, such as main controller 104.

In some implementations, the main controller may be any electronic device that is capable of interacting with the various resources and/or appliances; in other implementations, the main controller may be a device particularly designed for detecting and/or monitoring a particular resource, appliance, and/or the like. The main controller may have wired or wireless functionality with a network controller. The main controller may include customizable user interfaces (e.g., the user may be able to choose screen colors, and/or a display language) as well as customizable hardware (e.g., customizable casings and facia convers). The main controller may provide data such as the current date and/or time, resource usage, indoor and/or outdoor temperatures, humidity, weather data, custom utility logos, and/or like information.

Main controllers may be configured for residential buildings, commercial buildings, hospitality locales (e.g., hotels and/or the like), and/or other such locations. In some implementations, commercial and/or hospitality buildings may be able to alter which settings and/or resources a user may be able to access and/or alter (e.g., in some implementations an employee can be prevented from affecting the temperature of an office floor, and/or a guest at a hotel may only have the ability to turn heat on or off, and/or the like). The user can set a target resource usage for an area in a building (e.g., can set a target temperature and/or the like), and the main controller may provide instructions to resource devices, appliances and/or other resource controllers in order to meet the target usage specified by the user.

Figure 1B:
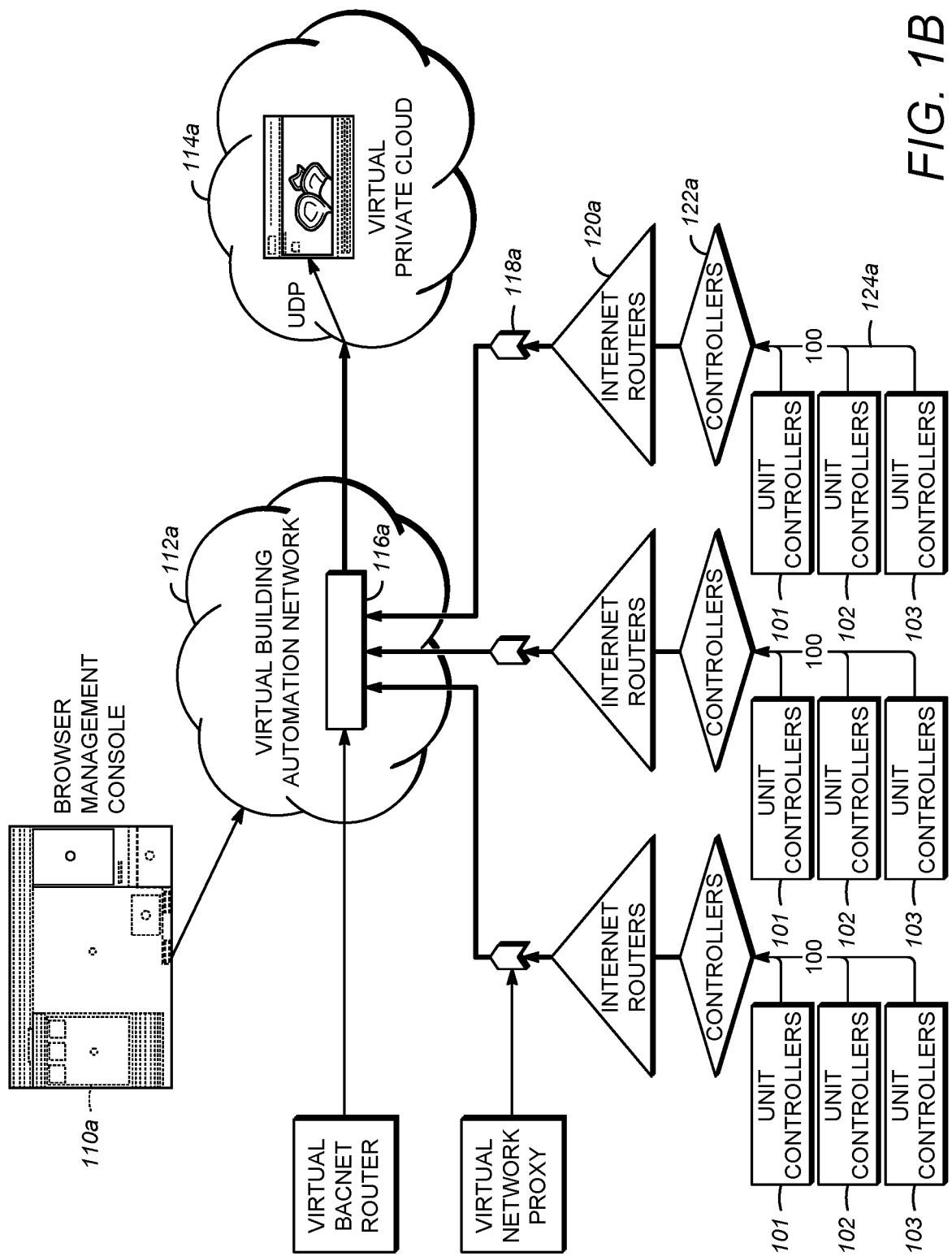
Figure 1C:
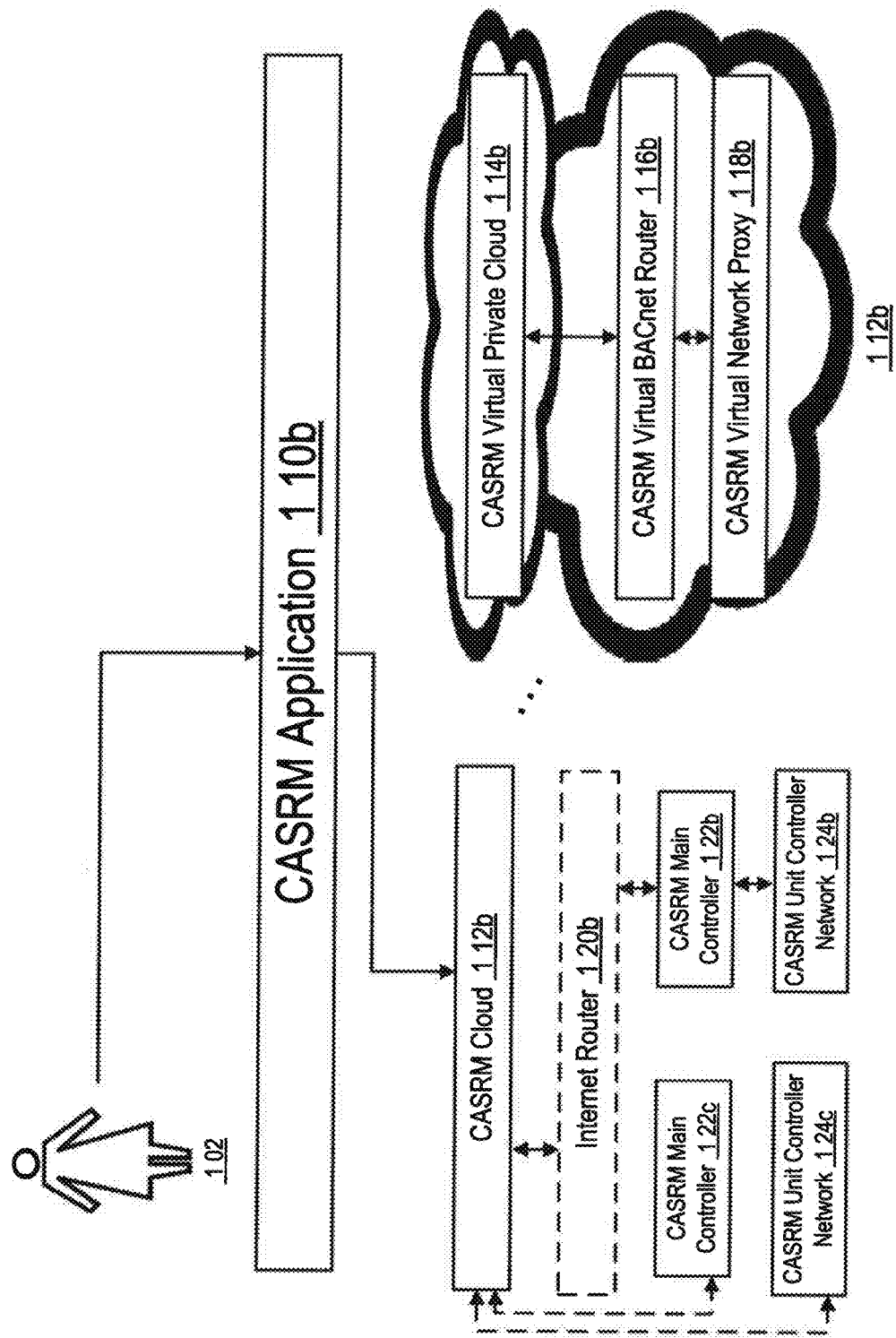

In some implementations, this main controller may be used to update settings, restrictions, and/or the like, or issue controls, instructions, and/or the like, to resources and/or appliances. In other implementations, other devices (e.g. unit controllers) that may control resources and/or appliances 106 may receive instructions, controls, settings, and/or restrictions from the main controller. In some implementations, the main and unit controllers may connect via a field bus (e.g., BACnet, LON, modbus, Zigbee, KNX, and/or the like). In other implementations (referring to FIGS. 1B and 1C), the main and unit controllers may connect via a building automation management device (e.g., a cloud network controller, such as a device instantiating CASRM cloud 112a and/or 112b), which may facilitate a network connection between various controllers 122a-c, and/or the like in the network without physical network infrastructure at the controllers' sites. For example, in some implementations, rather than using a physical device (e.g., a BACnet IP switch, router, and/or the like) which communicates with the controllers via UDP, TCP, and/or a like protocol, and relays this information to other controllers, sites, a central processing location, and/or the like, the controllers may connect directly to the CASRM cloud, which may package the data and forward it to the appropriate recipients (e.g. an internet router 120a and/or 120b) in a format similar to that which would be sent from the physical device (e.g., via CASRM Virtual BACnet Router 116a and/or 116b and CASRM Virtual Network Proxy 118a and/or 118b). In some implementations, traditional physical layers define data links and physical layers and protocols for communication between layers, said protocols including open, unencrypted ARC-NET, Ethernet, BACnet/IP, KNX-related protocols, Point-To-Point over RS-232, Master-Slave/Token-Passing over RS-485, LonTalk, and/or like protocols.

In some implementations, the CASRM cloud may allow for virtualizing said layers and/or communication between layers, and may allow for virtualizing a plurality of physical layer configurations supporting a plurality of layer protocols. For example, the CASRM cloud may support virtualization of a BACnet physical network, and a LON physical network, and may allow for communications between the two networks. This may allow networks which traditionally would require modification of a protocol and/or format in order to communicate, to send and receive data from other networks regardless of the nature of the underlying network on which the virtualized network is based. Virtualization may also allow the CASRM cloud to provide secure web sockets for the purpose of generating fully-secure tunnels that may enable full duplex (e.g., duplex BACnet) communications, and/or the like. In some implementations, the CASRM cloud may also be able to facilitate the virtualization of a local network of physical devices (e.g., a user-specified local network of unit controllers 124a-124c, and/or the like). In some implementations, the virtual network architecture implemented by the CASRM cloud may also be able to provide security to communications between controllers and/or control devices that may not be able to be handled by a traditional BACnet and/or the like infrastructure (e.g., may be able to provide a way of granting varying user access privileges, providing a secure form of communication between controllers via providing an extra layer of security with regards to communications between devices, and/or the like).

The CASRM cloud may facilitate more secure data storage solutions via its Virtual Private Cloud (VPC) 114a and/or 114b. In some implementations, the VPC may be used to control and/or manage network configurations, e.g., may manage routing tables, NATting and/or NAT Gateways, network Access Control Lists (ACL), subnets, security groups, and/or like security. In some implementations the VPC may also be configured to back up data and/or to serve as a permanent data repository for the CASRM cloud, and/or the like. In some implementations, the CASRM may implement a plurality of VPCs in order to facilitate these and other features for various users within the CASRM cloud.

Figure 1D:
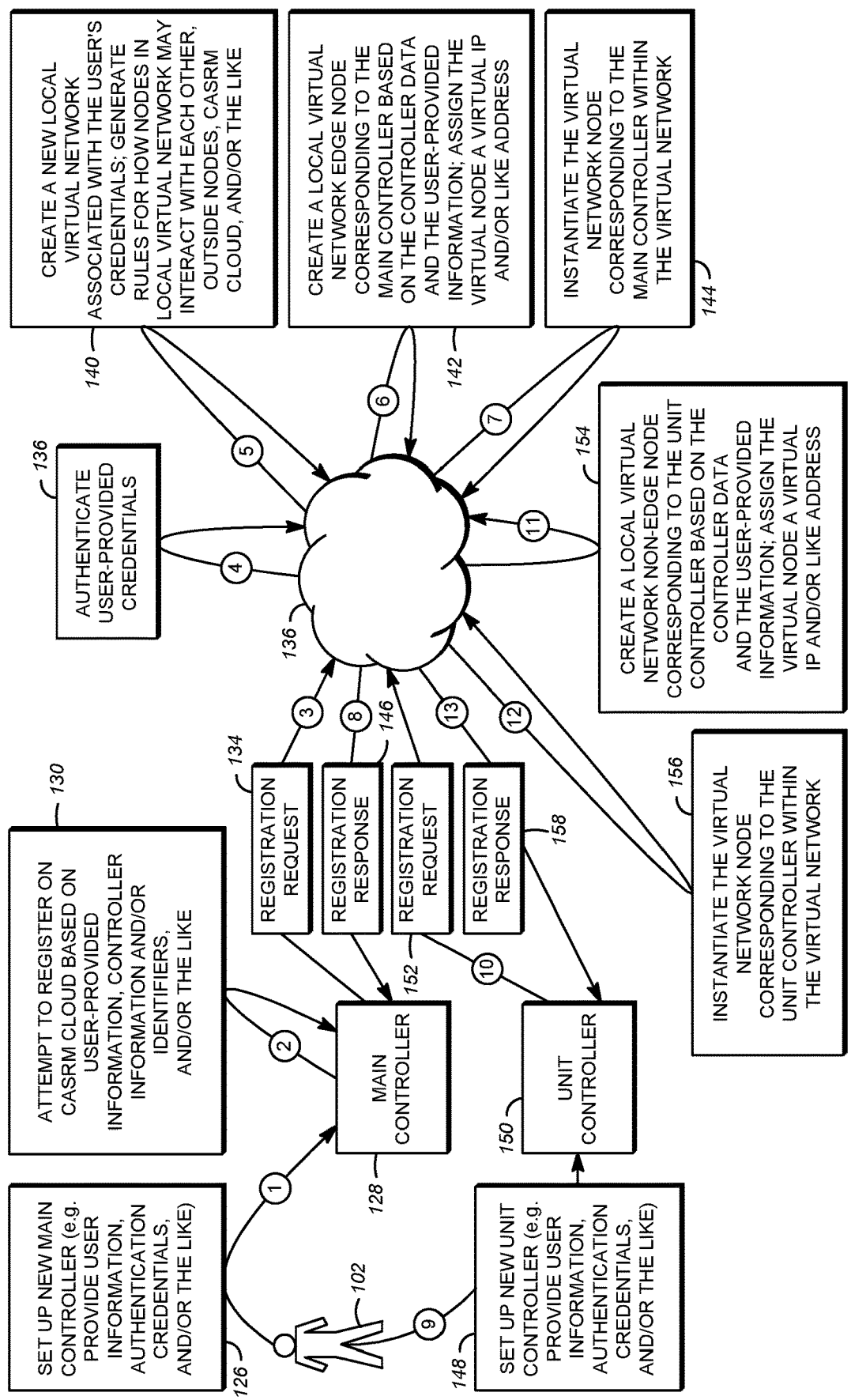
FIGS. 1D-E show data flow diagrams illustrating interaction with the CASRM cloud in some embodiments of the CASRM.

As a non-limiting example, referring to FIG. 1D, in some implementations, a user 102 may set up a new main controller device 126, e.g., via providing user information (e.g., name, address, correspondence address, and/or the like), authentication credentials (e.g., user name, user password, user activation code if applicable, and/or the like), and/or like information to a main controller 128, to an application interface linked to the CASRM cloud, and/or the like. The main controller may attempt to register on the cloud 130 using the user-provided input, its controller information (e.g., controller ID, controller type, controller location, and/or the like), and/or any other information the cloud may need to facilitate authentication and registration of the main controller into the network, and/or the like. In some implementations the controller may send a registration request 134 to the CASRM cloud 136 in order to be registered to the network. In some implementations, registration request 134 may take a form similar to the following:

POST/registration_message.php HTTP/1.1
Host: www.CASRMproccess.com

```
Content-Type: Application/XML
Content-Length: 788
<?XML version = "1.0" encoding = "UTF-8"?>
<registration_message>
<timestamp>2016-01-01 12:30:00</timestamp>
    <user_params>
        <user_username>example_name</user_username>
        <user_password>********</user_password>
        <user_address>123 Main Street, Anytown, Anytown 12345</user_address>
    </user_params>
    <controller_params>
        <controller_ID>12345678</controller_ID>
        <controller_GPS>-73, 140</controller_GPS>
        <controller_type>main</controller_type>
        <controller_action>add</controller_action>
    </controller_params>
</registration_message>
```

The CASRM cloud may be able to authenticate the user-provided credentials 138, and may generate a new local virtual network for the user for the new main controller 140. The new local virtual network may be stored as a new record for a virtual network in the CASRM database, and the record may be linked to and/or otherwise associated with that of the user account record. In some implementations the user may specify that the main controller be added to an existing local virtual network instead. In some implementations the CASRM cloud may generate and/or modify rules for the virtual network (e.g., may specify how nodes within the virtual network interact with each other, with other nodes in other virtual networks, with the CASRM cloud, and/or like entities). The CASRM cloud may also create a new local virtual network edge node for the main controller to 142 to add to the local virtual network. In some implementation the node may contain information corresponding to the main controller (e.g., controller data and/or the like), and may also be linked to the user (e.g., may also contain user-provided information, and/or the like), and may be assigned a virtual IP and/or like network address which is mapped onto the physical main controller device, and/or the like. The node may also be configured to have particular relationships with other nodes already in the network, if applicable (e.g., may be designated as a node through which other nodes within the network must interface with in order to communicate with the CASRM cloud, or a node which only communicates with certain other nodes within the network, and/or the like). The CASRM cloud may store routing tables and/or the like corresponding to the virtual network, and/or the like. In some implementations the CASRM cloud may then instantiate the virtual network node within the virtual network 144 (e.g., may modify the virtual network record to include the node and to include its connections to other nodes within the network, and/or the like), and may send a registration response 146 to the main controller, user, and/or the like, which may provide a confirmation that the controller has been added to the virtual network, and/or the like.

In some implementations, if the user wishes to set up a new controller 148 (e.g., a unit controller 150, and/or the like), the user may again provide authentication credentials, user information, and/or the like to the unit controller, to a CASRM application interface, and/or the like, which may send a new registration request 152 to the CASRM cloud. In some implementations, a registration request 152 may take a form similar to registration request 134, and may comprise information about the user, the controller, and/or the like. In some implementations, the CASRM cloud may use the information to create a local virtual network node 154 (e.g., a non-edge node, and/or the like) corresponding to the new unit controller, and based on the data provided to the cloud. The CASRM cloud may also be able to assign a virtual IP and/or like network address to the unit controller, and may instantiate the new node within the virtual network 156. The cloud may then generate and send a registration response 158 to the user, unit controller, and/or the like indicating that the controller was added to the virtual network, and/or the like.

Figure 1E:
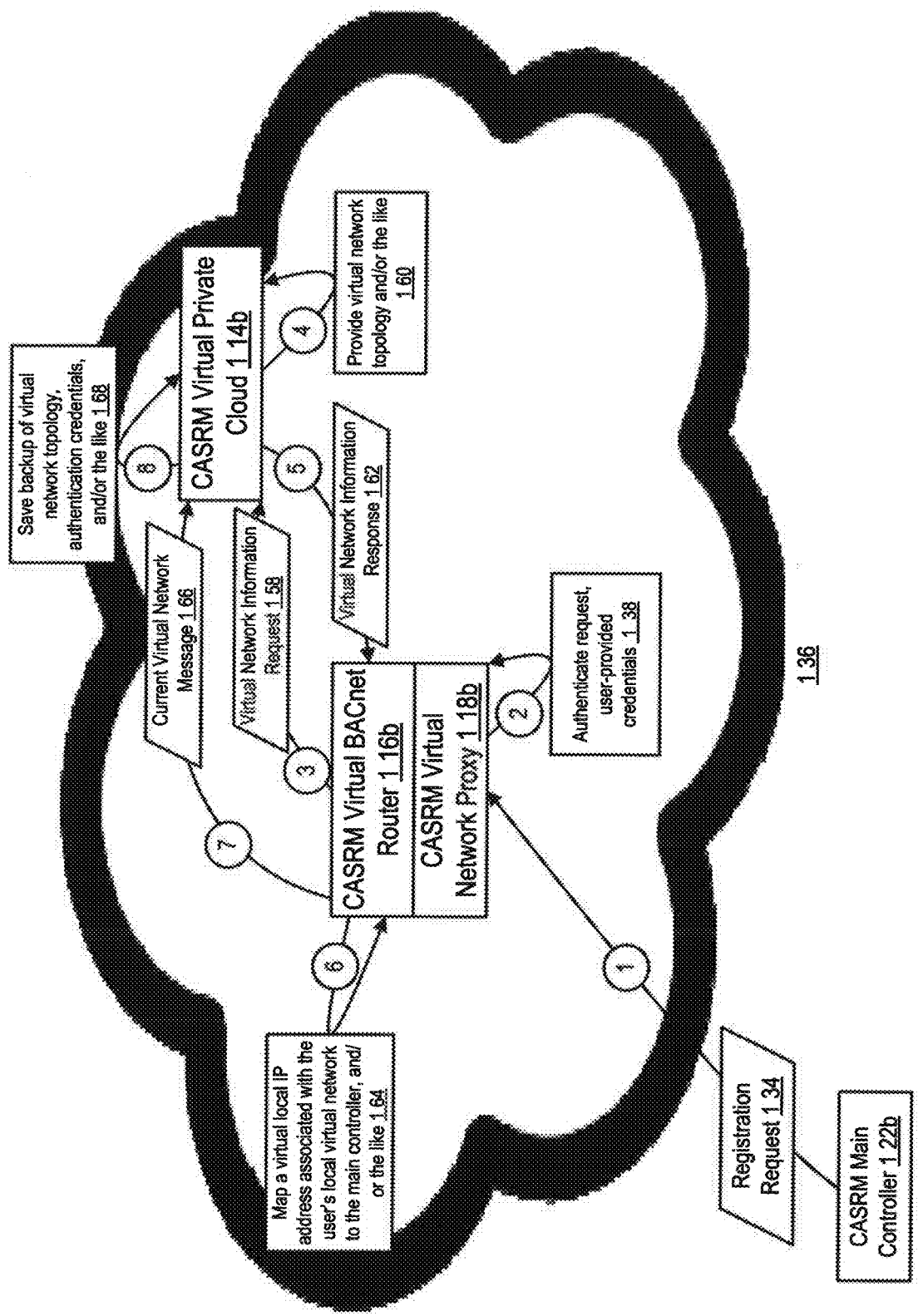

Referring to FIG. 1E, in some implementations, when the controller and/or application interface sends registration request 134 to the CASRM cloud, the request may be authenticated 138 by the CASRM Virtual Network Proxy 118b, and/or the like. The cloud may query the CASRM Virtual Private Cloud 114b via a virtual network information request 158, in order to obtain information about the virtual network's topology and/or the like 160 for the virtual network the controller is being registered to. In some implementations if a new virtual network is being generated, the Virtual Private Cloud may not be queried for a virtual network topology, and/or may provide a blank virtual network topology, and/or the like. The private cloud may provide the virtual network topology via a virtual network information response 162, which may be used by the CASRM Virtual BACnet router 116b and/or the like in order to map a virtual local IP and/or like network address to the controller based on the user's local virtual network information 164, and/or the like. In some implementations, the private cloud may then be used to back up and/or store a copy of the new virtual network topology via sending the new topology to the cloud in a current virtual network message 166. The virtual private cloud may save the backup of the virtual network topology, any authentication credentials that are to be associated with the virtual network, and/or the like 168.

In some implementations, the CASRM cloud may accessed off-site from the user via CASRM application 110 a and/or 110b, which may allow the user to access and/or control various controller and/or like devices; in other implementations, the user may be able to host CASRM infrastructure on-site as an application and/or software service via CASRM application 110. In some implementations, the user may pay a subscription fee and/or the like for accessing the service, and the fee amount and/or method of payment may depend on the method of use that the user chooses. In some implementations a different service may be provided to the user based on the user's current infrastructure, management needs, and/or the like (e.g., a homeowner may obtain a different service than a landlord of multiple properties, and/or the like). In some implementations, for example, a homeowner may obtain a service which allows them to control a specified number of controllers at one site, while a landlord of multiple properties may need a more complete version of the service, e.g., one which supports multiple controllers on multiple sites, and/or the like. In some implementations settings and/or service changes may be implemented via using the user's account credentials and/or service access permissions to grant access to certain portions of the platform to the user. In some implementations the user may be able to designate sub-accounts to users of controllers at a site and/or the like, and may be able to forward subscription costs and/or the like to the sub-accounts, may be able to receive monetary incentives for signing up sub-accounts with CASRM, and/or the like. In some implementations, users may be able to reassign device addresses, ownership, and/or the like on the fly in order to adapt to temporary conditions within a building (e.g. conventions, parties, guests, and/or the like; e.g., see FIGS. 12A-B).

Such unit controllers and/or appliances may also send data (e.g. usage logs, reports, confirmations, and/or the like) to the main controller to allow the main controller to determine usage patterns and/or other useful information in determining further settings, restrictions, and/or the like to issue to the devices and/or appliances. In some implementations, said settings, restrictions, and/or the like may be determined dynamically as new information is provided to the main controller. In some implementations, example controllers which may be used include a SER8300 Room Controller with a SC3000 Relay Pack, and/or the like.

In some implementations, referring back to FIG. 1A, data may be authenticated by the CASRM cloud network 108 before it may be instantiated on a controller. In other implementations, controllers may receive a variety of other types of information from the CASRM cloud. In some implementations, controllers may implement a firewall in order to provide strong security for communications. In some implementations, the controllers may utilize iptable rules similar to the following in order to block unwanted incoming and outgoing traffic:

```
# Allow outgoing DHCP
iptables -A INPUT -i eth0 -p udp --dport 67:68 --sport 67:68 -j ACCEPT
# Allow outgoing ICMP
iptables -A OUTPUT -o eth0 -p icmp --icmp-type echo-request -j ACCEPT
iptables -A INPUT -i eth0 -p icmp --icmp-type echo-reply -j ACCEPT
# Allow outgoing DNS
iptables -A OUTPUT -o eth0 -p udp --dport 53 -j ACCEPT
iptables -A INPUT -i eth0 -p udp --sport 53 -j ACCEPT
# Allow outgoing http
iptables -A OUTPUT -o eth0 -p tcp --dport 80 -j ACCEPT
iptables -A INPUT -i eth0 -p tcp --sport 80 -j ACCEPT
# Allow outgoing https
iptables -A OUTPUT -o eth0 -p tcp --dport 443 -j ACCEPT
iptables -A INPUT -i eth0 -p tcp --sport 443 -j ACCEPT
```

In some implementations, in order to communicate with each other, a user's electronic device, an appliance, and/or the like, the devices may use the cloud to open up connections between the two devices. For example, if a user's electronic device wishes to send instructions to the controller, the cloud may, after authenticating the user, send the electronic device's current IP address and outgoing port number to the controller. The controller may then send a packet of information to the IP address and port that it received from the cloud, allowing the controller to receive data from that address. Likewise, the cloud may send the controller's IP address and outgoing port number to the electronic device, which may then send data to the provided address. Having already opened up its firewall for data from the electronic device's address, the controller may then be able to accept data from the electronic device, and vice-versa. In some implementations, the controller may also send packets of data to all of the electronic device's known ports (and vice-versa) in order to open all of its ports for communication.

In some implementations, the CASRM may receive a registration request for a resource management device, may authenticate the registration request, and may generate a first virtual local network based on the request. The CASRM may also generate a virtual network node with a virtual local address, the virtual local address corresponding to a first location of the virtual network node within the first virtual local network. The CASRM may map the virtual network node to the resource management device, and may store first virtual local network and virtual network node information in a database.

In some implementations the CASRM may also receive a request to authenticate an update to alter the virtual network node corresponding to the resource management device via updating the virtual local address of the virtual network node to correspond to a location on a second virtual network address, and may move the resource monitoring device from the first virtual network to the second virtual network via updating the virtual network address of the virtual network node corresponding to the resource monitoring device to reflect that it is on the second virtual local network. The CASRM may then send a notification indicating the device has been moved to the second virtual network.

In some implementations, the CASRM may also receive a registration request for a secondary resource device, may authenticate the registration request, and may generate a new virtual network node with a new virtual local address, the new virtual local address corresponding to a location of the new virtual network node within the first virtual local network. The CASRM may map the new virtual network node to the secondary resource device, and may link the new virtual network node to the virtual network node corresponding to the resource management device within the first virtual local network. The CASRM may store new virtual network node information in the database, and may store permissions in the database to allow the secondary resource device to be issued instructions from the resource management device, the instructions issued from the resource management device including instructions to alter the settings on the secondary resource device.

In some implementations, the secondary resource device may be a Heating, Ventilation, and Air Conditioning (HVAC) device, and the settings altered may be one of heating, ventilation, or air conditioning settings. Examples of such instructions and settings include but are not limited to: instructions for retrieving different rooms' or areas' temperature, humidity and occupancy; instructions for changing a thermostat set point; instructions for retrieving and changing predefined set points on a thermostat; instructions to copy set points from one HVAC device to another HVAC device; instructions to copy all the changes performed to one HVAC device to another HVAC device; and/or like instructions. In some implementations, the secondary resource device may be a utility device in control of a utility resource, the settings altered may be utility resource consumption settings, and the utility resources consumed may include electric, gas, water, and oil. For example when the secondary resource device is a lighting system and/or a like system, the instructions and settings can include: instructions to operate a light, e.g., on, off and/or dim levels; instructions to organize the lighting devices in groups; instructions to add, remove and/or rename a lighting group; instructions to add an remove a lighting system to a lighting group; instructions and/or permissions to view a lighting scene; instructions and/or permission to create a lighting scene from current lighting settings; instructions to remove and rename existing lighting scenes; instructions and/or permissions to add/and remove a device from a lighting scene; and/or like instructions and/or permissions. In some implementations, the secondary resource device may be a secondary resource management device, and the settings altered may include settings to control at least one other secondary resource device.

Figure 2A:
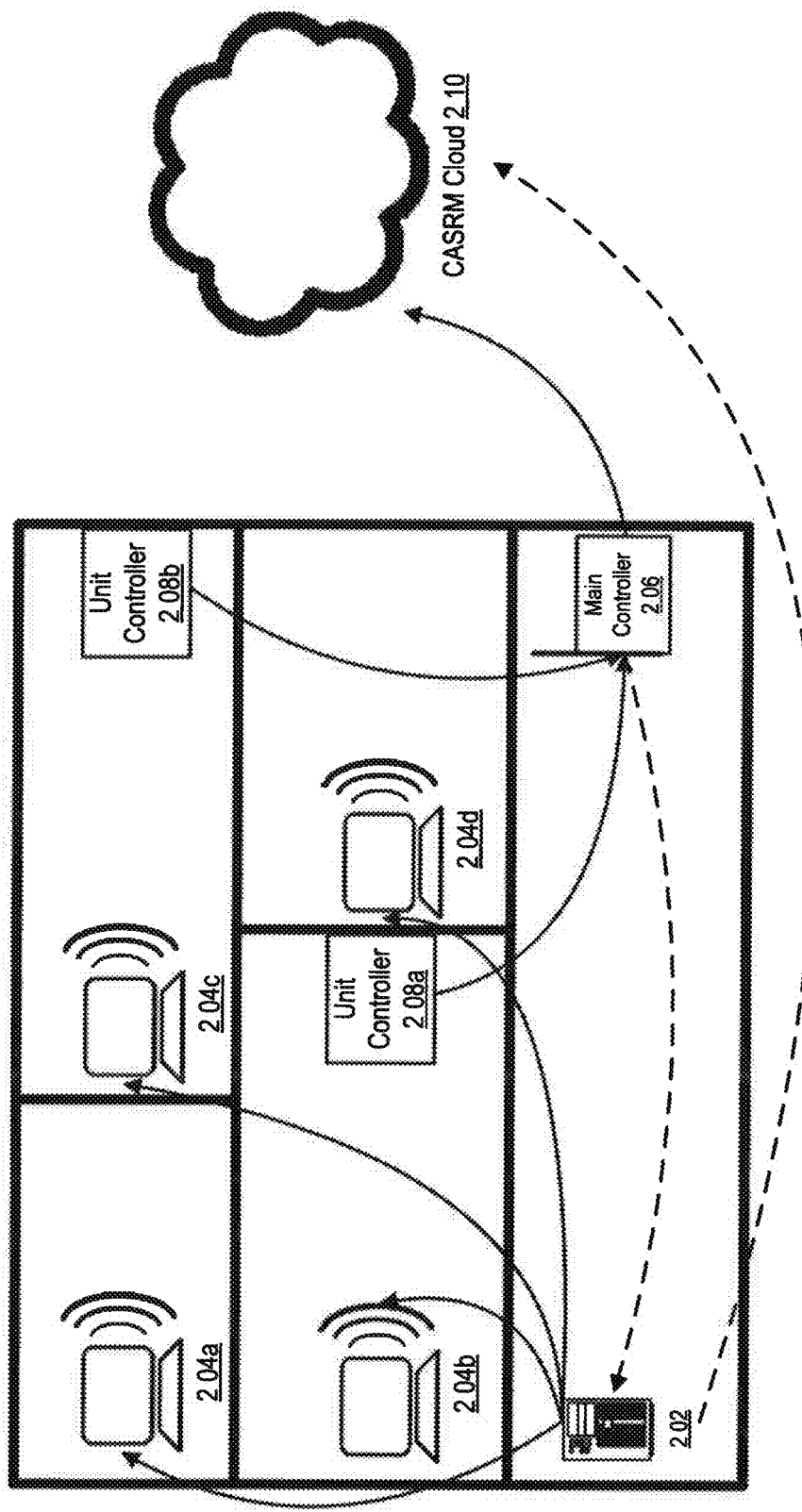
FIGS. 2A-B show block diagrams illustrating relationships between users, controllers, and the cloud in some embodiments of the CASRM.
Figure 2B:
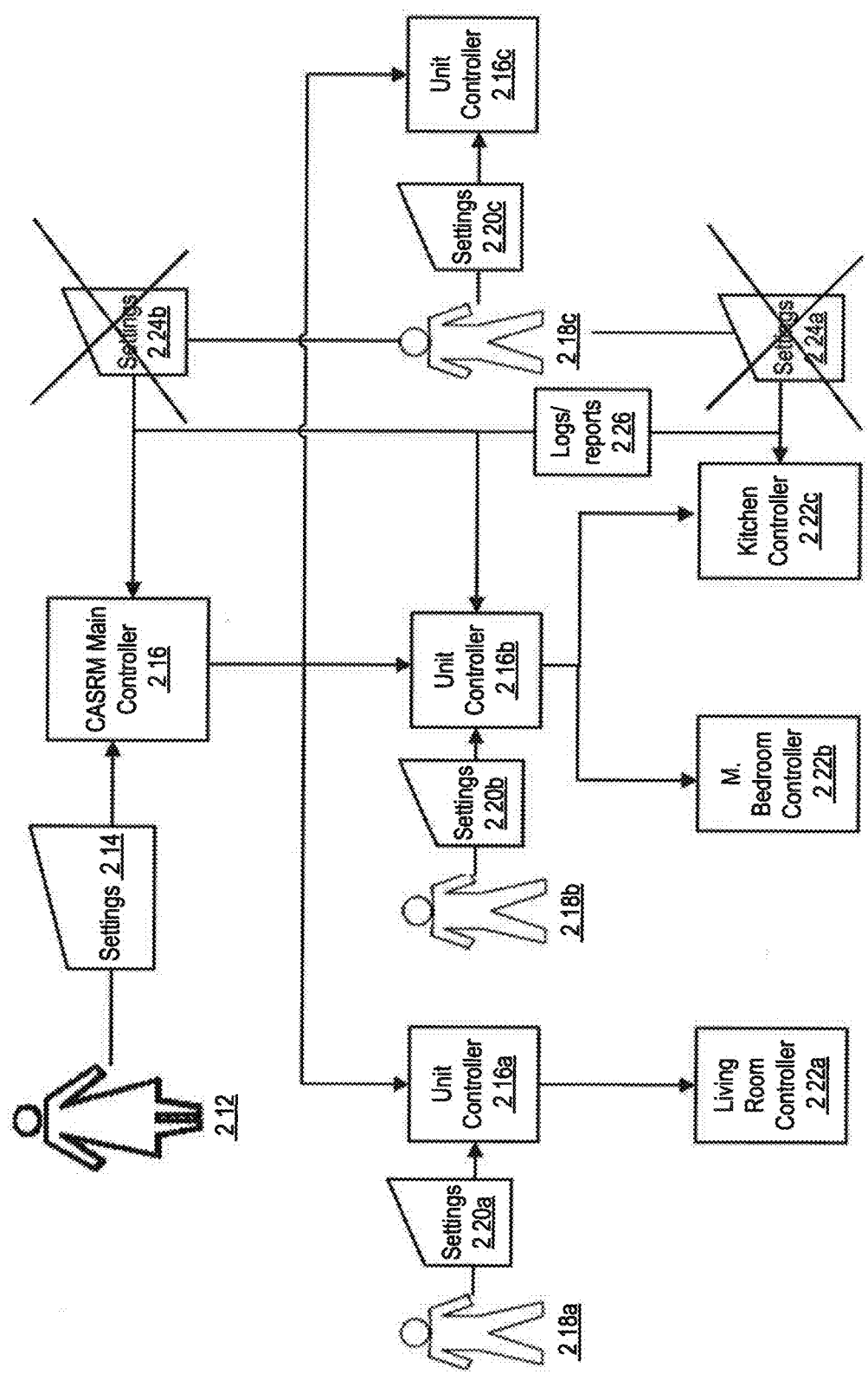

FIGS. 2A-B show block diagrams illustrating relationships between users, controllers, and the cloud in some embodiments of the CASRM. In some implementations, a main controller 206 may work on the same network 202 as the rest of the electronic network-enabled devices 204a-d in use in a home, building, site, and/or the like, and may connect to the CASRM cloud 210 using this network connection. In other implementations, the main controller may work on a separate General Packet Radio Service (GPRS) network in order to connect with the cloud on a network completely separate from the main infrastructure of the home, building, and/or the like in which it is installed. The main controller may also interact with various unit controllers 208a-b via the site's network connection, via the GPRS network connection, via a LAN, via Bluetooth, and/or the like.

A user may use a web application and/or a like user interface in order to obtain information from the main controller and/or other network-enabled devices. In some implementations the web application can provide a user with a dashboard which enables the user to manage and/or modified the settings of the devices installed in different sites. For example, a user can view all metering devices on a site and/or can view detailed metering information corresponding to a specific device. In some implementations, information about a given room's temperature may be found by querying the CASRM cloud server using a GET operation and a URI representing a thermostat's present value property. For example, sending a GET request on the CASRM cloud server using a URI may result in the following response from the CASRM cloud server:

```
<?xml                                                   version="1.0"           encoding="UTF-8"?>
<?xml-stylesheet                                        type='text/xsl'         href='/casrm/xsl'?>
<real
  xmlns:c2g="http://www.can2go.com"
  xmlns:xsi="http://www.w3.org/2001/XMLSchema-instance"                  writable="true"  displayName="Present_Value"
  xsi:schemaLocation="http://casrm.org/ns/schema/1.0/casrm/xsd"
  xmlns="https://obix.org/ns/schema/1.0" val="24" />
```

In some implementations, the response may contain a real value (e.g., 24) which is equivalent to the present value property. In some implementations, an oBix-based server may also be utilized. In some implementations, the CASRM cloud server may not handle requests if the path of the request does not start with an authorized server root (e.g. "/casrm" and/or the like). In some implementations "network" and/or a similar name for the root of the node hierarchy of the CASRM cloud server, may be used in order to determine information about various devices connected to the CASRM cloud server.

In some implementations a third path component, e.g., "N0015A8" and/or the like, may identify a "node", which may be a logical abstraction that can represent a main controller, control device, and/or the like. Depending on the type of node, the node may also have several sub-nodes which belong to it (e.g. main controllers, unit controllers, and/or the like). In some implementations, "DEV101" may be a main controller designation in the URI. In some implementations the temperature value of a unit controller (e.g. thermostat) controlled by the main controller may be accessed via the "Present Value" property of the "Analog Value" object "AV1. In some implementations, an analog value is a representation of a "real" CASRM object (a floating point value). The web application may use this data in order to provide the state of a zone in which a controller resides, to a user of the web application.

As another example, in some implementations, finding all the temperatures from all unit controllers and/or devices in a room may involve listing all nodes in the network, listing each node's unit controllers and filtering only the unit controllers that represent and/or control a thermostat, filtering only the objects that represent the temperature for each unit controller and/or thermostat, and getting the analog value of each temperature object.

In order to avoid issuing too many HTTP requests to traverse all the nodes and devices of the network, the CASRM cloud server may generate batch requests (e.g., oBix-like batch requests and/or the like). In some implementations, for example, the CASRM cloud server may receive a GET request with https://se-ssl-cloud.com/controllers-proxy/beta1/casrm/network/a as the URI and may provide the following response:

```
<?xml version="1.0" encoding="UTF-8"?>
<?xml-stylesheet type='text/xsl' href='/obix/xsl'?>
<obj
xmlns:c2g="http://www.can2go.com"
xmlns:xsi="http://www.w3.org/2001/XMLSchema-instaace"  is="c2g:Network"  ”
xsi:schemaLocation="http://casrm.org/ns/schema/1.0/obix/xsd"  href="https://se-ssl-cloud.com/controllers-
proxy/beta1/casrm/network/"
xmlns="http://obix.org/ns/schema/1.0">
<ref  name="N0015A8"
xmlns:c2g="http://www.can2go.com"
xmlns:xsi="http://www.w3.org/2001/XMLSchema-instance"  is="c2g:LOCAL  c2g:Node"
xsi:schemaLocation="http://casrm.org/ns/schema/1.0/obix/xsd"  href="N0015A8/"
xmlns="http://obix.org/ns/schema/1.0"  />
</obj>
```

In some implementations, generating a batch request for information may comprise using the HTTP POST method and using a batch URI, and/or setting up a list of the objects the CASRM cloud server would want to read and send it as the data for this request; e.g.:

```
<list  is="casrm:BatchIn">
<uri  is="casrm:Read"  val="/obix/network/N0015A8"/>
</list>
```

In some implementations, the CASRM cloud server may respond with:

```
<?xml version="1.0" encoding="UTF-8"?>
<?xml-stylesheet type='text/xsl' href='/casrm/xsl'?>
<list
xmlns:c2g="http://www.can2go.com"  is="casrm:BatchOut  ”  href="https://se-ssl-cloud.com/controllers-
proxy/beta1/casrm/batch/"  displayName="batch"  xsi:schemaLocation="http://casrm.org/ns/schema/1.0/casrm/xsd"
of="casrm:obj"
xmlns:xsi="http://www.w3.org/2001/XMLSchema-instance"
xmlns="http://casrm.org/ns/schema/1.0">
<obj
xmlns:c2g="http://www.can2go.com"  is="c2g:LOCAL  c2g:Node"
xsi:schemaLocation="http://casrm.org/ns/schema/1.0/casrm/xsd"
xmlns:xsi="http://www.w3.org/2001/XMLSchema-instance"  href="/casrm/netwrok/N0015A8"
xmlns="http://casrm.org/ns/schema/1.0">
<ref
xmlns:c2g="http://www.can2go.com"  is="c2g:449-D-Node_Configuration-1  c2g:449-D-Device-1"  href="DEV100/"
displayName="St-Denis  Office"  name="DEV100"  xsi:schemaLocation="http://casrm.org/ns/schema/1.0/casrm/xsd"
xmlns:xsi="http://www.w3.org/2001/XMLSchema-instance"
xmlns="http://casrm.org/ns/schema/1.0"  />
<ref
xmlns:c2g="http://www.can2go.com"
xmlns:xsi="http://www.w3.org/2001/XMLSchema-instance"  href="DEV101/"  displayName="Office 222"  name="DEV101"
xsi:schemaLocation="http://casrm.org/ns/schema/1.0/casrm/xsd"  is="c2g:449-D-VT7000_Room_Controller-1  ”
xmlns="http://casrm.org/ns/schema/1.0"  />
<ref
xmlns:c2g="http://www.can2go.com"
xmlns:xsi="http://www.w3.org/2001/XMLSchema-instance"  href="DEV102/"  displayName="Office 223"  name="DEV102"
xsi:schemaLocation="http://casrm.org/ns/schema/1.0/casrm/xsd"  is="c2g:449-D-VT7000_Room_Controller-1  ”
xmlns="http://casrm.org/ns/schema/1.0"  />
...
<ref
xmlns:c2g="http://www.can2go.com"  is="c2g:449-D-EnOcean_Switch-1  c2g:449-D-Device-1"  href="DEV116/"
displayName="EnOcean  Switch  222"  name="DEV116"  xsi:schemaLocation="http://casrm.org/ns/schema/1.0/casrm/xsd"
xmlns:xsi="http://www.w3.org/2001/XMLSchema-instance"
xmlns="http://casrm.org/ns/schema/1.0"  />
...
</obj>
</list>
```

In some implementations the CASRM cloud server could receive a list with the same node reference repeated several times, e.g.:

```
<list                          is="obix:BatchIn">
<uri    is="obix:Read"    val="/casrm/network/N0015A8"/>
<uri    is="obix:Read"    val="/casrm/network/N0015A8"/>
<uri    is="obix:Read"    val="/casrm/network/N0015A8"/>
</list>
```

In some implementations the CASRM cloud server's response may contain as many objects in the list as were included in the request.

In the above example, the response comprises a list of objects that each contains the unit controller and/or devices belonging to a given node (e.g., main controller). In some implementations, it may be necessary to filter the results in order to pinpoint particular information. In some implementations, another batch request may be generated using a similar HTTP method and URI as above (POST and https://se-ssl-cloud.com/controllers-proxy/beta1/casrm/batch/). The list of objects to read may be the list of all devices found in the previous step (e.g., devices of type c2g:449-D-VT7000_Room_Controller-1):

```
<list                             is="casrm:BatchIn">
<uri    is="casrm:Read"    val="/casrm    /network/N0015A8/DEV101/"/>
<uri    is=" casrm:Read"   val="/    casrm /hetwork/N0015A8/DEV102/"/>
<uri    is=" casrm:Read"   val="/    casrm /network/N0015A8/DEV103/"/>
</list>
```

The CASRM cloud server may respond with a list containing all these devices' objects. In some implementations the data may be further filtered in order to obtain more specific information (e.g., filtering objects whose displayName have a "LocalTemperature" value, and/or the like). Filtering objects whose displayName attributes have the value "LocalTemperature" may result in the following:
<ref name="AV1" is="c2g:449-O-Analog_value-1 c2g:449-O-Object-1" href="AV1/ "displayName="LocalTemperature"/>

Having the above object, the CASRM cloud server may generate another batch request, wherein the batch path components may include further information in order to obtain even more particular information (e.g. the present local temperature value):

```
<list              is="       casrm:BatchIn">
<uri    is=" casrm:Read"    val="/    casrm    /network/N0015A8/DEV101/AV1/Present_Value"/>
<uri    is=" casrm:Read"    val="/    casrm    /network/N0015A8/DEV102/AV17/Present_Value"/>
<uri    is=" casrm:Read"    val="/    casrm    /network/N0015A8/DEV103/AV33/Present_Value"/>
</list>
```

In some implementations the AV1, AV17 and AV33 path components may be found while filtering for objects having the value "LocalTemperature" for their displayName property. In some implementations server may respond with a list of real objects, representing the temperatures values.

In order to know if and when a room's temperature has changed, the CASRM cloud server may use "watches" (e.g. oBix watch objects and/or the like) to monitor data in real-time. In some implementations, a client may create a watch object which may have a make operation on the CASRM cloud server's WatchServiceURI, and/or a like service. The CASRM cloud server may define a new Watch object and may provide a URI to access the new watch object. In some implementations the client may register or unregister objects to be watched using the Watch object provided by the CASRM cloud server. The client may also periodically poll the Watch URI via a pollChanges operation in order to determine what events have occurred since the URI was last polled.

In some implementations, the Watch object may be freed by the CASRM cloud server either if the client explicitly frees the Watch object (e.g. via deleting the object), or based on a predetermined condition (e.g. the URI is not polled by the client for a predetermined amount of time, and/or the like), and/or via other mechanisms or due to other conditions.

In some implementations Watches allow a client to maintain a substantially real-time cache and/or event history for one or more objects. They may also be used to access an event stream from a feed object.

For example, to create a watch, the client may send a HTTP POST request to the CASRM cloud server. In some implementations the CASRM cloud server may respond with a newly created watch object:

```
<?xml version="1.0" encoding="UTF-8"?>
<?xml-stylesheet type='text/xsl' href='/obix/xsl'?>
<obj xmlns:c2g="http://www.can2go.com" is="/template/casrm:Watch" casrm:Watch displayName="watch1"
xmlns="http://casrm.org/ns/schema/1.0"
xmlns:xsi="http://www.w3.org/2001/XMLSchema-instance"
xsi:schemaLocation="http://casrm.org/Bs/schema/1.0/casrm/xsd"
href="https://se-ssl-cloud.com/controllers-proxy/beta1/casrm/watchService/watch1/">
<op       href="pollRefresh/"    name="pollRefresh"   out="casrm:WatchOut"  />
<op       href="pollChanges/"    name="pollChanges"   out="casrm:WatchOut"  />
<reltime  name="lease"           writable="true" href="lease/"  val="PT20S" />
<op       in="casrm:WatchIn"     name="remove"   href="remove/" />
<op       href="delete/"         name="delete"   />
<op       in=" casrm:WatchIn"    name="add"      out=" casrm:WatchOut" href="add/" />
</obj>
```

In the example response above, the newly created watch may be found at the location specified by the schemaLocation.

In some implementations, in order to add properties watch to the newly created watch, the client may send a HTTP POST request to the CASRM cloud server with the following data:

```
<obj                                is="casrm:WatchIn">
<list      name="hrefs"             of="casrm:WatchInItem">
<uri  href="casrm:WatchInItem"  val="/casrm/network/N0015A8/DEV101/AV1/Present_Value/">
</uri>
<uri  href="casrm:WatchInItem"  val="/casrm/network/N0015A8/DEV102/AV17/Present_Value/">
</uri>
<uri  href="casrm:WatchInItem"  val="/casrm/network/N0015A8/DEV103/AV33/Present_Value/">
</uri>
</list>
</obj>
```

In some implementations, the time between the watch creation and the add operation may be less than the watch's lease (which may be 20 seconds by default). In some implementations, if the time between the watch creation and the add operation are too far apart, the watch object may be deleted and the add operation request may fail. If the add operation is successful, the CASRM cloud server may respond with the objects added to the watch:

```
<?xml version="1.0" encoding="UTF-8"?>
<?xml-stylesheet type='text/xsl' htef='/obix/xsl'?>
<obj
xmlns:c2g="http://www.can2go.com"   is="casrm:WatchOut "                                        casrm
                                    href="https://se-ssl-could.com/controllers-proxy/beta1/
/watchService/watch6/add/"          xsi:schemaLocation="http://  casrm.org/ns/schema/1.0/   casrm   /xsd"
xmlns:xsi="http://www.w3.org/2001/XMLSchema-instance"
xmlns="http://                                                                    casrm.org/ns/schema/1.0">
<list                               name="c2g:RemovedObjects"  of="              casmr:obj"           />
<list>                              name="c2g:AddedObjects"    of="              casrm:obj"           />
<list                               of="                       casrm:obj"        name="values">
<real
xmlns:c2g="http://www.can2go.com"
xmlns:xsi="http://www.w3.org/2001/XMLSchema-instance"              writable="true"     href="/    casrm
/network/N0015A8/DEV102/AV17/Present_Value/"    displayName="Present_Value"       xsi:schemaLocation="http://
casrm.org/ns/schema/1.0/                        casrm                             /xsd"
xmlns="http://                       casrm.org/ns/schema/1.0/   val="24"                              />
<real
xmlns:c2g="http://www.can2go.com"
xmlns:xsi="http://www.w3.org/2001/XMLSchema-instance"              writable="true"     href="/    casrm
/network/N0015A8/DEV103/AV33/Present_Value/"    displayName="Present_Value"       xsi:schemaLocation="http://
casrm.org/ns/sehema/1.0/                        casrm                             /xsd"
xmlns="http://                       casrm.org/ns/schema/1.0/   val="24"                              />
```

```
...
</list>
</obj>
```

In some implementations the response may be similar to the response to a "pollRefresh" request to know which object has changed since the last polling request was sent.

In order to poll a watch, the client may send a HTTP POST request to the pollRefresh operation of the watch object to poll. To poll "watch1", for example, the client may send the request to the CASRM cloud server. If at least one temperature value changed, the server may respond with all objects whose temperature changed. If no value changed, the server may respond with an empty list.

Regarding FIG. 2B, in some implementations, a user 212 may provide settings 214 to a main controller 216. In some implementations, these settings may include a temperature to keep the site at, a time limit of how long an appliance may run at a specified time of the day, and/or the like. In some implementations, the user may be a homeowner, a utility and/or resource provider, a building and/or site superintendent, and/or the like. In some implementations, said settings may be forwarded to unit controllers 216a-c, which may alter their own settings to match those issued from the main controller. Although only unit controllers are discussed hereinafter, it is to be understood that settings, instructions, and/or the like could also be sent to appliances and/or like devices. Moreover, in some embodiments, these settings include but are not limited to instructions to change user preferences; functions to manage site addresses; functions to manage user credentials and/or like system properties and functions.

In some implementations, an exemplary control sequence script for maintaining various heating and cooling settings may take a form similar to the following: (see originally filed application for exemplary form).

In some implementations, unit controllers may also receive settings 220a-c from users 218a-b who are only in control of local controllers (e.g. an employee in control of a thermostat in his office, a homeowner in control of a control device in her home, and/or the like). These users may be able to send settings to controllers they own (e.g. 216a-c), and may also be able to forward those settings to other controllers in their possession that can be controlled through their unit controllers (e.g. controllers 222a-c, which may control particular rooms in a multi-room home). However, in some implementations, restrictions may be placed on who may be allowed to send instructions, settings, and/or the like to other unit controllers under the control of the main controller, and/or the like. For example, user 218c may be able to send settings and/or instructions 220c to unit controller 216c, but may not be able to send settings and/or instructions 224a to Kitchen Controller 222c, as both user 218 and his controller may not have permission to affect Kitchen Controller 222c. Additionally, as unit controller 216c and main controller 216 may have a child-parent relationship, unit controller 216c may not be able to send settings and/or instructions 224b to main controller 216. However, lower-hierarchy controllers, such as room controllers 222a-c and unit controllers 216a-c, may be able to send logs, reports, and/or the like 226 to the main controller in order to allow the main controller to keep track of resource and/or appliance usage, local user settings, and/or the like.

Figure 3:
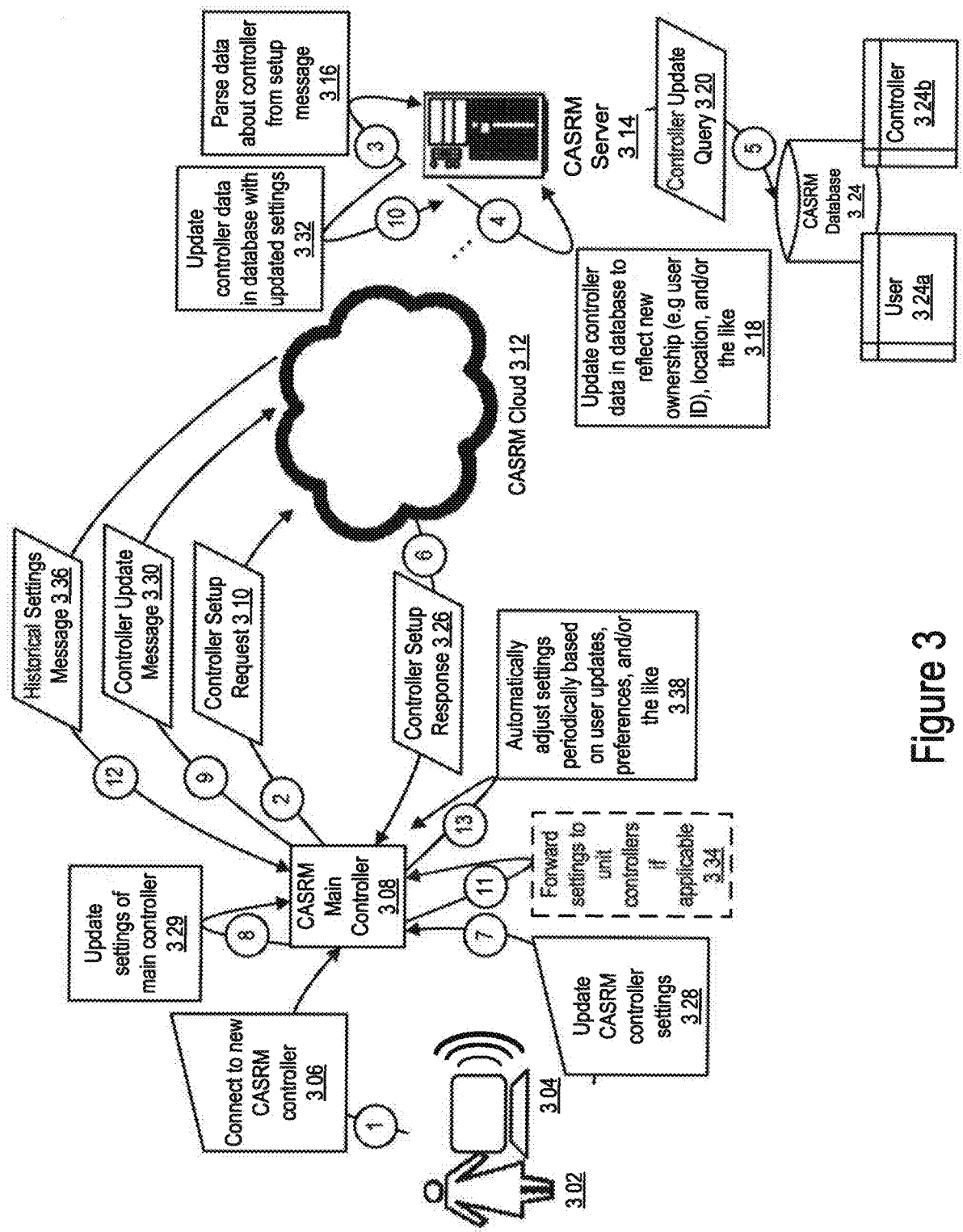
FIG. 3 shows a data flow diagram illustrating initiating a new controller in some embodiments of the CASRM.

FIG. 3 shows a data flow diagram illustrating initiating a new controller in some embodiments of the CASRM. In some implementations, a user 302 may utilize an electronic device 304 to connect 306 to a new CASRM main controller 308 that has been installed in a home, office building, and/or the like. In some implementations, the electronic device itself may act as a main controller, and may instead be connecting via a webpage, application, and/or the like to CASRM cloud 312 for initialization.

In some implementations, the main controller may send a controller setup request 310 to the CASRM cloud. In some implementations, said request may be an XML-encoded HTTP(S) POST message, which may take a form similar to the following:

```
POST /controller_setup_message.php HTTP/1.1
Host: www.CASRMproccess.com
Content-Type: Application/XML
Content-Length: 788
<?XML version = "1.0" encoding = "UTF-8"?>
<controller_setup_message>
    <timestamp>2016-01-01 12:30:00</timestamp>
        <user_params>
            <user_username>example_name</user_username>
            <user_password>********</user_password>
            <user_new>true</user_new>
            <user_name>Jane Smith</user_name>
            <user_address>123 Main Street, Anytown, Anytown 12345</user_address>
            <user_email>example_email@example.com</user_email>
            <user_phone>1111111111</user_phone>
            <user_map></user_map>
        </user_params>
        <controller_params>
            <controller_ID>12345678</controller_ID>
            <controller_GPS>-73, 140</controller_GPS>
        </controller_params>
</controller_setup_message>
```

In some implementations, a CASRM server 314 in the cloud may parse 316 controller, user, and/or like data from the controller setup request. The server may also update the controller's data to indicate new ownership, create or update a user record for the user initializing the controller, and/or the like 318. In some implementations such data may be stored and/or updated in the user 324*a* and/or controller 324*b* tables of the CASRM database 324. In some implementations, the user's ID, the controller's new location, and/or the like, may all be used to update records in the database. In some implementations the server may perform these actions via a controller update query 320 to the database, which may be a PHP encoded MYSQL message similar to the following:

```
<?php
    . . .
    $user = $_POST["user_username"];
    $user_password = $_POST["user_password"];
    $controller = $_POST["controller_ID"];
    . . .
    if(mysql_num_rows(mysql_query("SELECT user_username, user_password FROM users WHERE user_username = '$user' AND user_password = '$user_password"'))){
        $result= mysql_query (UPDATE users SET user_address=$user_address WHERE user_id='$user');
        $user_id = mysql_result($result, 0, "user_ID");
        $result= mysql_query (UPDATE controllers SET user_ID='$user_ID' WHERE user_id='$user_ID');
        . . .
    }
>
```

In some implementations, the cloud may send a controller setup response 326 back to the main controller, indicating that the database has successfully initialized the new user-controller relationship in the cloud. In some implementations, the user may then start to provide controller settings, instructions, restrictions, controls, and/or the like 328 to the main controller. The main controller may update itself with those settings 329, and may also send a controller update message 330 to the cloud in order to indicate that a change in settings has been made to the main controller. In some implementations, the controller update message may be an XML-encoded HTTP(S) POST message that may take a form similar to the following:

```
POST /controller_update_message.php HTTP/1.1
Host: www.CASRMproccess.com
Content-Type: Application/XML
Content-Length: 788
<?XML version = "1.0" encoding = "UTF-8"?>
<controller_update_messege>
<timestamp>2016-01-01 12:30:00</timestamp>
    <user_params>
        <user_name>example_name</user_name>
        <user_password>********</user_password>
    </user_params>
    <controller_params>
        <controller_ID>12345678</controller_ID>
        <controller_GPS>-73, 140</controller_GPS>
    </controller_params>
    <settings>
        <electricity>
            <lights>
                <lights_limit>12, hours</lights_limit>
                <lights_limit>10, kWh</lights_limit>
                <lights_Sunday>1800,0000</lights_Sunday>
                <lights_Monday>2000, 0000</lights_Monday>
                . . .
                <lights_Satarday>1900, 0500</lights_Satarday>
            </lights>
            <temperature>
                . . .
            </temperature>
            . . .
        </electricity>
        <water>
            <water_gallons>20</water_gallons>
            . . .
        </water>
        <gas>
```

-continued

```
            . . .
        </gas>
        . . .
    </settings>
</controller_update_message>
```

The cloud may then update the controller data in the controller's record in the database to incorporate the new settings. In some implementations, the cloud may keep track of all changes in settings in order to determine historical usage statistics, historical tendencies towards certain resource settings, schedules, and/or the like, and/or for a like purpose. In some implementations the cloud may also authenticate any request from a user to change the settings of the main controller, and may then send a confirmation to the main controller before it changes its settings.

In some implementations, the main controller may forward the settings received either from the user or from the confirmation from the cloud to unit controllers at the site 334. Additionally, whenever the main controller receives historical settings data via a historical settings message 336, the main controller may automatically adjust its settings and/or its algorithm for automatically maintaining settings in the absence of user input 338, based on the historical setting data received. In some implementations, historical settings message 336 may be an XML-encoded HTTP(S) POST message which may take a form similar to the following:

```
POST /controller_update_message.php HTTP/1.1
Host: www.CASRMproccess.com
Costent-Type: Application/XML
Contest-Length: 788
<?XML version = "1.0" encoding = "UTF-8"?>
<controller_update_message>
<timestamp>2036-01-01 12:30:00</timestamp>
    <user_params>
        <user_name>example_name</user_name>
        <user_password>********</user_password>
    </user_params>
    <controller_params>
        <controller_ID>12345678</controller_ID>
        <contoller_GPS>-73, 140</controller_GPS>
    </controller_params>
    <settings_history>
        <settings_1>
            <settings_date>2036-01-01 12:30:00</settings_date>
            <electricity>
```

```
        ...
    </electricity>
    <water>
        ...
    </water>
    <gas>
        ...
    </gas>
    ...
</settings_1>
<settings_2>
    <settings_date>2036-05-06 12:30:00</settings_date>
    <electricity>
        ...
    </electricity>
    <water>
        ...
    </water>
    <gas>
        ...
    </gas>
    ...
</settings_2>
    ...
</settings_history>
</controller_update_message>
```

In some implementations, the main controller may automatically adjust settings by aggregating the historical data it possesses and determining average resource use schedules and/or the like based on the averages of the historical data. In some implementations, the main controller includes a collection of functions to generate and maintain resource use schedules. In some implementation, the collection of functions include but is not limited to: functions to retrieve the existing schedules of a determined site; functions to edit a weekly and/or daily schedule; functions to remove and/or add a schedule entry; functions to add and/or remove a schedule; functions to rename a schedule; functions to associate or dissociate a device with an existing schedule and the like schedule related functions. Schedules may include weekly and/or daily temperature settings and/or like setpoints to maintain during a particular day and/or week. In some implementations, in addition to the schedules the main controller can also include a collection of functions to generate and maintain calendars. Such a collection of function can include but is not limited to: functions to view existing calendars from a site; functions to add, edit and/or remove a calendar entry; functions to add, remove and/or rename a new calendar and the like functions. Calendars may include holidays, special days for resource companies (e.g., a bill due date for a utility, dates when the utility may schedule planned outages, and/or the like) alerts about when the user should suggest adjusting main controller settings (e.g., at the beginning or end of a season, and/or the like), main controller schedules, and/or the like.

In other implementations, the user of the main controller and/or a control device may be able to specify which settings, controls, and/or the like the local user has priority over setting, and which the main controller and/or control device has priority over (e.g. in some implementations, the local user's temperature settings may be set as being a priority over temperature settings sent from the master controller, and/or the like). In further implementations, settings from the main controller may override the user's local settings under certain circumstances (e.g., the main controller's settings may override the unit controller's settings when the unit controller detects no one is in the room and/or using the appliance, resource, device, and/or the like connected with the unit controller, and/or the like).

Figure 4:
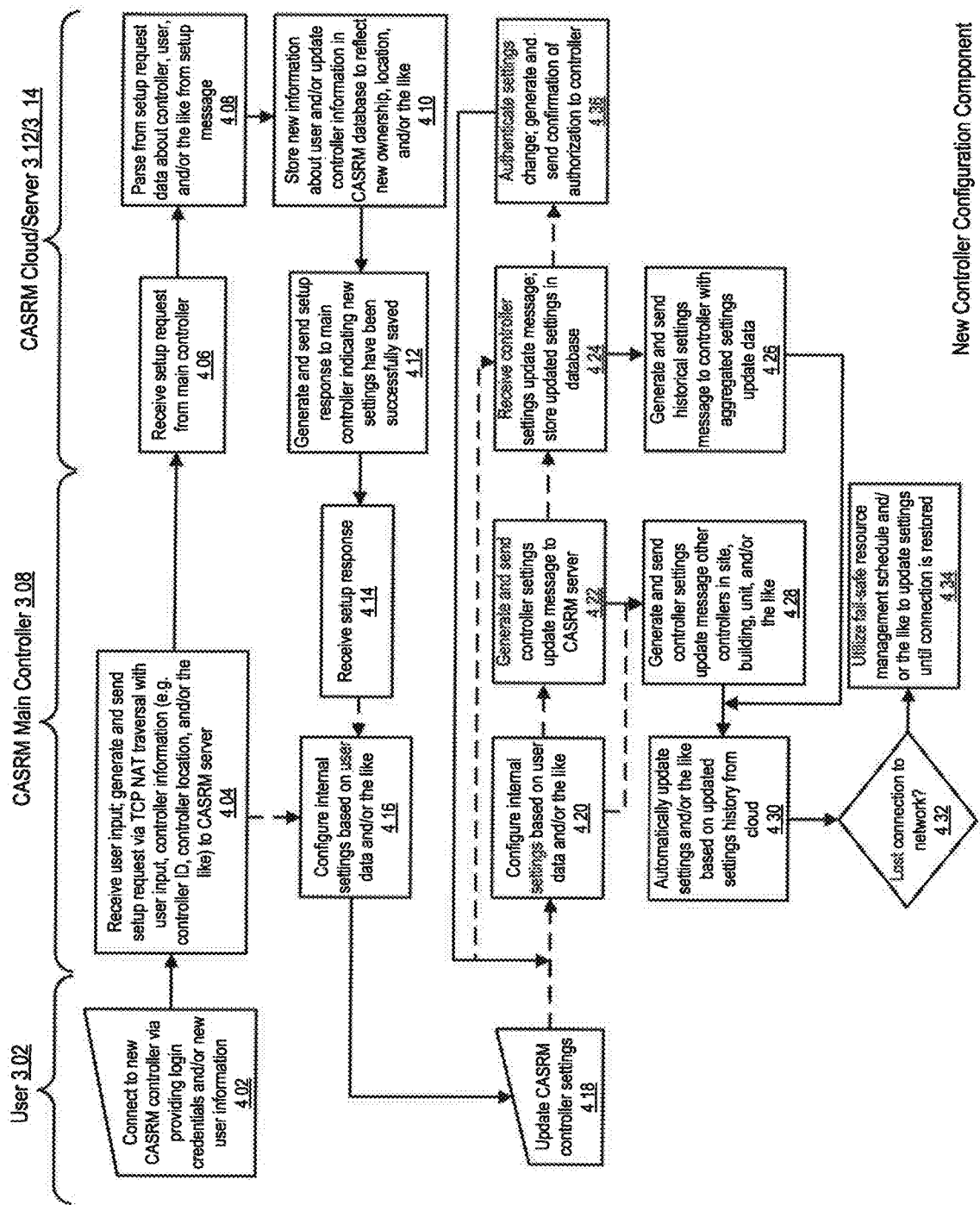
FIG. 4 shows a logic flow diagram illustrating initiating a new controller in some embodiments of the CASRM.

FIG. 4 shows a logic flow diagram illustrating initiating a new controller in some embodiments of the CASRM. In some implementations, the user may connect 402 to the new CASRM main controller, or may connect to a controller interface via her electronic device, and may provide user login credentials (e.g. a username and passport), new user information (e.g. name, address, username, password, email, phone number, map of home, office/and or the like layout, and/or the like), and/or like information. In some implementations, the main controller may receive the user's input and generate a setup request 404 to the cloud containing the user input, controller information (e.g. the controller ID, the controller location, and/or the like), and/or like information. In some implementations, the main controller and the cloud may connect via a TCP or UDP NAT traversal-based connection (e.g. TCP/UDP hole punching).

In some implementations, the cloud may receive 406 the setup request from the main controller and parse from the data provided therein user data, controller data, and/or the like 408 from the request. The cloud may store any new user information in a new user record, in the CASRM database 410, may update the user's existing record with any new information provided in the request, and/or may update controller information stored in the database with the information in the request (e.g., the controller may be updated to reflect new ownership, a new address and/or location in a building, and/or the like). In some implementations, once the database has been updated, the cloud may generate and send a setup response 412 to send to the main controller, indicating that the new settings have successfully been saved to the system. After receiving 414 the setup response, the main controller may configure itself based on the user-provided settings 416 (e.g., may initialize living room defaults if the user indicated the controller is situated in the living room, may initialize summer office defaults if the user indicated the date of initialization, and/or the like).

In some implementations, a user may subsequently update 418 the main controller's settings. The main controller may configure its internal settings 420 based on the user-provided settings data, and then may generate and send a controller setting update message 422 to the CASRM cloud. In some implementations, the user may instead provide the settings information (e.g., to the controller and/or directly to the cloud), and the cloud, after receiving the controller settings 424 and storing the updated settings in the controller's update history, may authenticate 436 the actual instantiation of the updated settings on the main controller. After configuring its internal settings, the main controller may generate and send controller settings update messages 428 to other controllers in the site, building, unit, and/or the like.

Upon receiving historical settings data via a historical settings message generated by the cloud 426 and containing aggregate settings update and/or like data, the main controller may automatically update its settings and/or the like 430 based on the history that it obtains from the cloud. Should the main controller lose its connection to the cloud 432, the main controller may use a fail-safe resource management schedule 434, may keep its own historical record of settings updates, and/or the like until its connection with the cloud has been restored.

Figure 5:
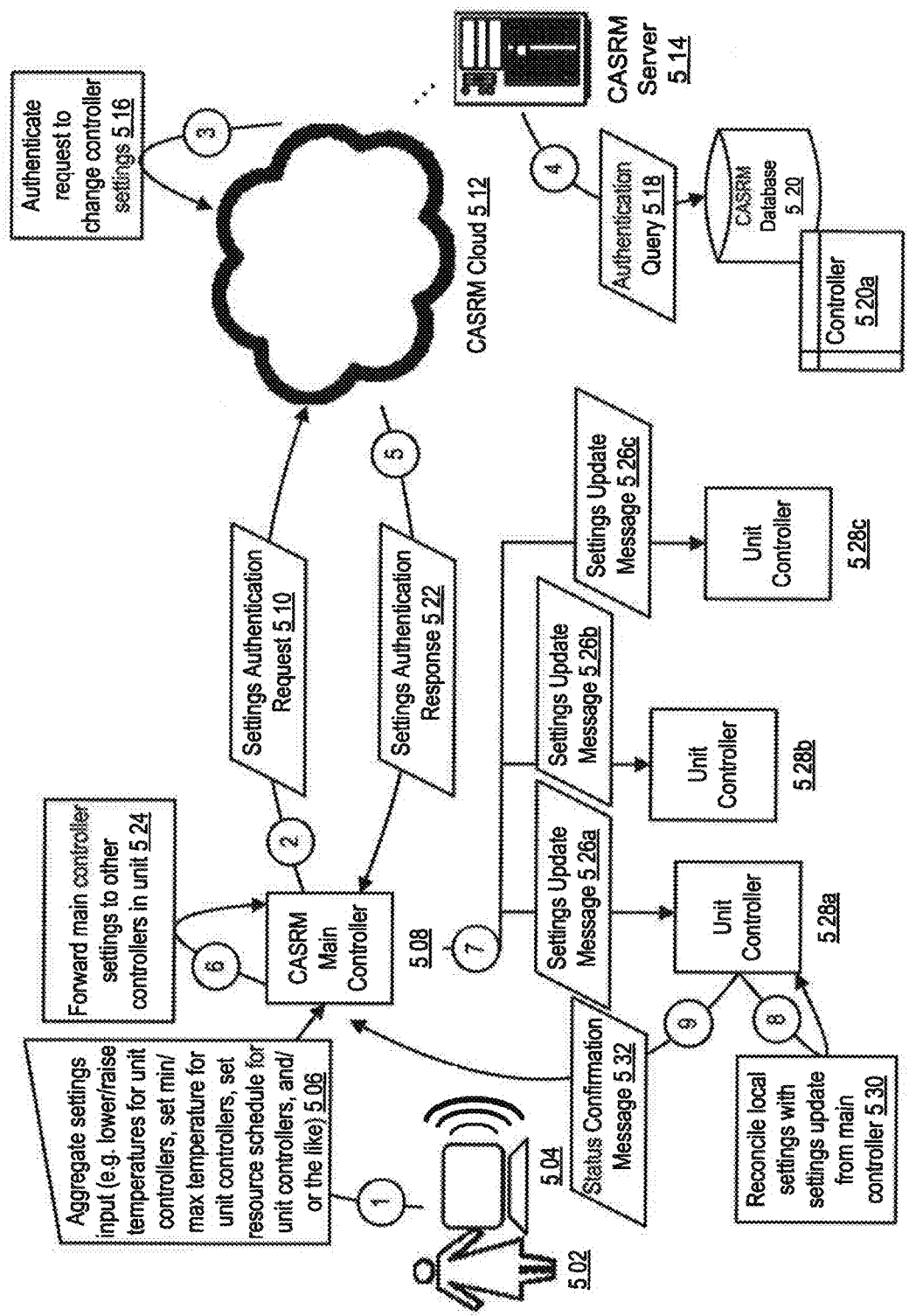
FIG. 5 shows a data flow diagram illustrating updating controller settings in some embodiments of the CASRM.

FIG. 5 shows a data flow diagram illustrating updating controller settings in some embodiments of the CASRM. In some implementations, a user 502 may user her electronic device 504 in order to provide settings input 506 to a CASRM main controller 508. In some implementations, the settings input may include aggregate settings for a plurality of unit controllers and/or like devices. The main controller may send these settings and authentication information to the CASRM cloud via a settings authentication request 510. In some implementations, settings authentication request 510 may be an XML-encoded HTTP(S) POST message that may take a form similar to the following: (see originally filed application for exemplary form).

In some implementations, the cloud may authenticate 516 the request to change controller settings via querying 518 the database 520 to ensure the user provided the correct credentials for the main controller and for the unit controllers. If the user is authenticated, the cloud may send a settings authentication response 522 to the main controller indicating that it has permission to forward 524 the settings to the unit controllers. In some implementations the settings may be sent via settings update messages 526a-b. In some implementations, the settings update messages 526a-c may be XML-encoded HTTP(S) POST messages that may take a form similar to the following: (see originally filed application for exemplary form).

In some implementations, the unit controllers may need to reconcile their local settings 530 with those issued from the main controller. In some implementations the unit controllers may send 532 a status confirmation message to the main controller indicating that the settings have successfully been sent and instantiated and/or incorporated on the unit controllers.

Figure 6:
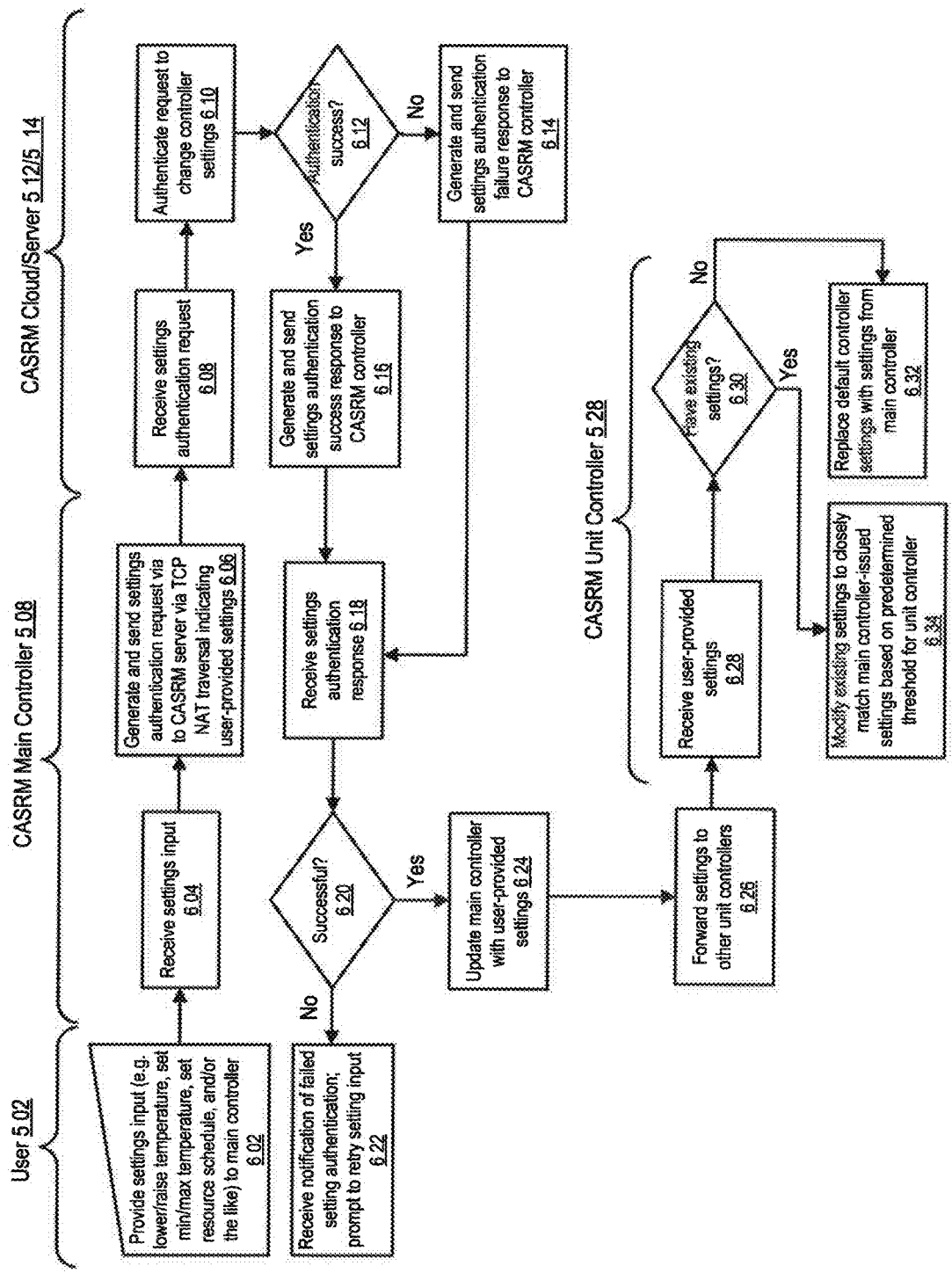
FIG. 6 shows a logic flow diagram illustrating updating controller settings in some embodiments of the CASRM.

FIG. 6 shows a logic flow diagram illustrating updating controller settings in some embodiments of the CASRM. In some implementations, a user may provide controller settings 602 to her main controller. Said settings may include temperature changes (e.g. lowering/raising temperatures, setting minimum/maximum temperatures, and/or the like), setting resource schedules, and/or like settings. Once the main controller receives the settings 604 from the user, the main controller may generate and send a settings authentication request to the CASRM cloud 606 via a TCP or UDP NAT traversal connection (e.g. TCP/UDP hole punching). The cloud, after receiving 608 the settings authentication request, may authenticate the user's request to change her controller settings 610 based on the user's provided credentials and based on which of the controllers the user wishes to update have records which are linked to her account. If the authentication is successful 612, then the cloud may generate and send an authentication response to the main controller 616 indicating that the authentication was successful. If the authentication is not a success 612, then the cloud may generate and send an authentication failure response to the main controller 614. Once the main controller has received a settings authentication response 618, it may determine whether or not it received a notification of success or failure 620. If authentication was successful, then the main controller may update itself 624 with the user-provided settings, and may forward 626 the applicable settings to the user's unit controllers. If the authentication was not successful, the user may receive a notification indicating that her settings authentication process failed 622 (e.g. the user provided the wrong credentials, tried to send settings to a controller she does not own, and/or the like), and may be prompted to retry submitting her settings input.

Once settings have been received by the unit controllers 628, the controllers may determine whether or not there are previously-submitted settings on the unit controllers 630, or whether the unit controllers are using default (e.g., factory-default, the exact settings last sent to the unit controller by the main controller, and/or the like) settings. If a unit controller does not have existing custom settings, the unit controller may replace its default settings with the settings received from the main controller 632. If a unit controller has existing custom settings (e.g. settings from the user or a user who only has control over the unit controller, and/or the like), then the unit controller may need to modify its existing settings to reconcile them with the settings provided by the main controller. For example, in some implementations, the unit controller may modify its locally-provided settings to closely match those from the main controller, but may have a predetermined threshold that allows the unit controller to modify its settings without needing to completely override the settings already on the unit controller. For example, a unit controller serving as a thermostat may be allowed to have settings that vary from those from the main controller by 5° F., a unit controller which controls lights may be able to leave lights on for an extra two hours in comparison with the main controller schedule each day, and/or the like.

Figure 7:
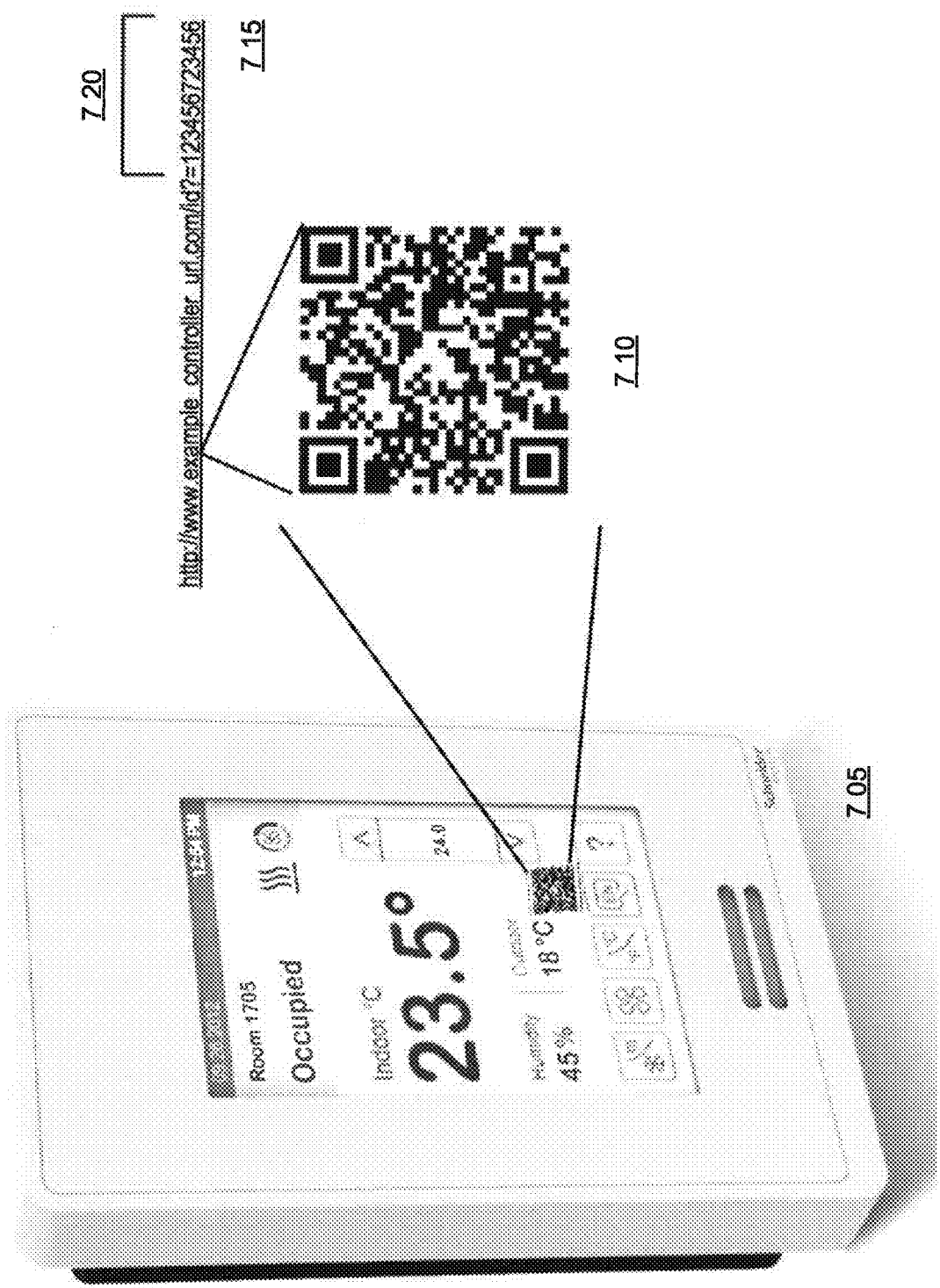
FIG. 7 shows a block diagram illustrating control codes in some embodiments of the CASRM.

FIG. 7 shows a block diagram illustrating control codes in some embodiments of the CASRM. In some implementations, a user may be a guest in a home, hotel, office, and/or a like location, and may wish to have temporary control over a CASRM main controller 705. The user may see a verification code 710 (e.g. a QR code, a bar code, an NFC tag, an RFID tag, and/or the like) that they may interact with using an electronic device. Said verification code may contain information that the user may capture for the purpose of authenticating with the system, and for gaining access to the controller. In some implementations, for example, the verification code may comprise a link 715 with both a URL to a verification page and an authentication number, code, and/or the like 720 that becomes associated with the user during the temporary control process.

Figure 8:
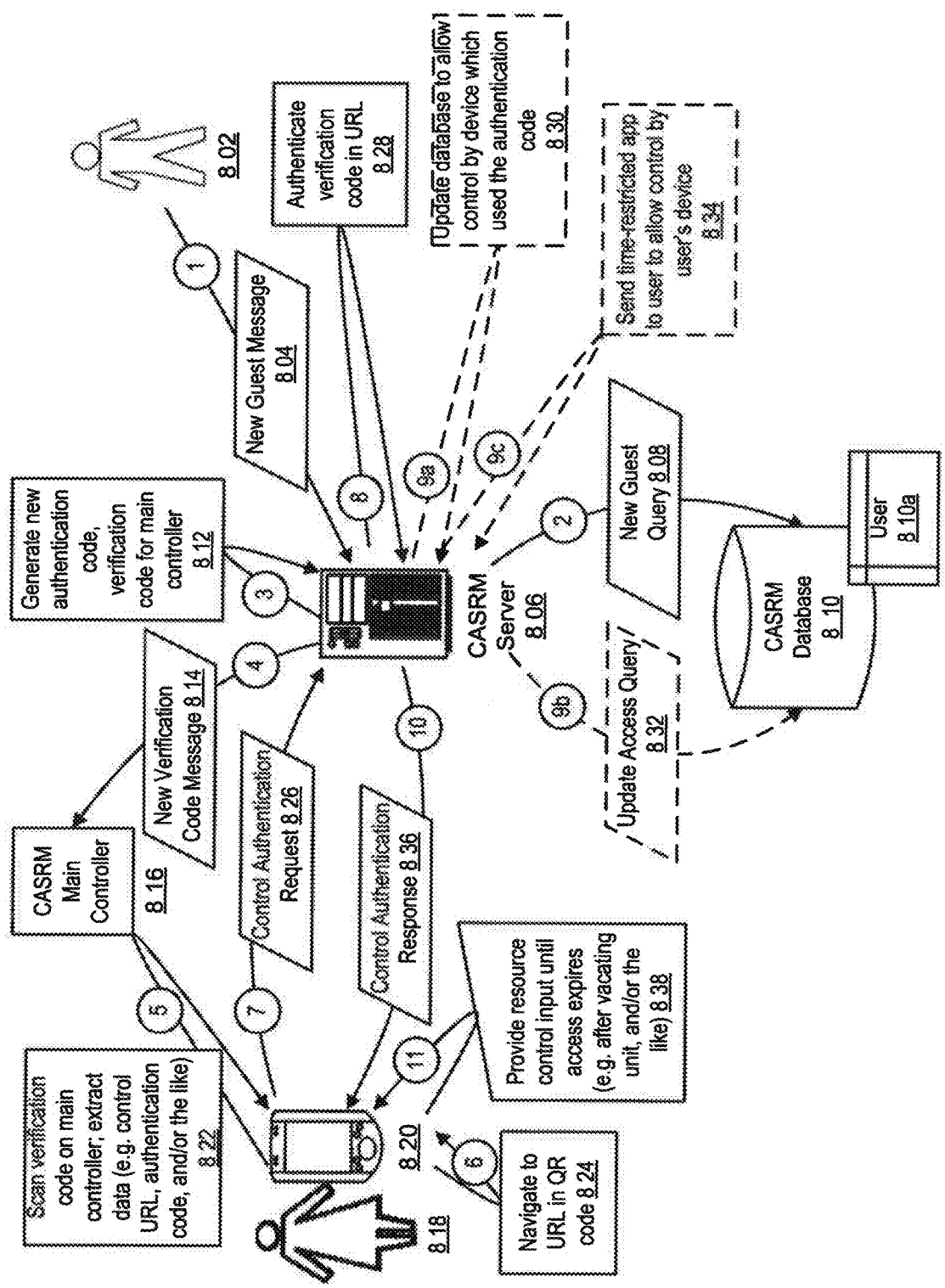
FIG. 8 shows a data flow diagram illustrating utilizing control codes in some embodiments of the CASRM.

FIG. 8 shows a data flow diagram illustrating utilizing control codes in some embodiments of the CASRM. In some implementations, a home, building hotel, and/or like manager 802 may send a new guest message 804 to the CASRM server 806, indicating that a new user may be occupying a room for a specified period of time. In some implementations, new guest message 804 may be an XML-encoded HTTP(S) POST message which may take a form similar to the following:

```
POST /new_guest_message.php HTTP/1.1
Host: www.CASRMproccess.com
Content-Type: Application/XML
Content-Length: 788
<?XML version = "1.0" encoding = "UTF-8"?>
<new_guest_message>
<timestamp>2016-01-01 12:38:00</timestamp>
    <guest_params>
        <guest_name>Jane Smith</guest_name>
        <guest_room>001</guest_room>
        <guest_stay>2, nights<guest_stay>
```

```
        <guest_username></guest_usename>
        <guest_address>123 Main Street, Any Town, Any City, 11111</guest_address>
        <guest_payment_method>credit</guest_payment_method>
        <guest_payment_no>1111222233334444</guest_payment_no>
    </guest_params>
</new_guest_message>
```

In some implementations the server may store the record of the change in occupation via a new guest query 808 to the CASRM database 810. In some implementations, new guest query 808 may be a PHP-encoded MYSQL command which may take a form similar to the following:

```
<?php
    ...
    $user = $_POST["name"];
    //$username = $_POST["username];
    $user_room = $_POST["roomno"];
    $stay = $_POST["lengthofstay"];
    ...
    //if user is in the database already and provided a
    //$result= mysql_query ("UPDATE user SET user_guest_room='$user_room' AND user_guest_stay='$stay'
WHERE user_username='$username'");
    //if user is not already in the database
    $reslut= mysql_query ("INSERT INTO user (user_name, user_username, user_guest_room, user_guest_stay)
VALUES('$user', '$username', '$user_room', '$stay')");
    ...
}
>
```

In some implementations the server may generate 812 a new authentication code, verification code, and/or the like for the main controller. In some implementations the verification code may be QR code, barcode, NFC or RFID tag, and/or a like mechanism, data. In some implementations at least a part of the authentication code may identify the controller the guest is attempting to access (e.g. part of the authentication code may comprise the controller model number, ID, and/or the like). The server may send the verification code, along with an expiration time and/or date for the code, via a new verification code message 814 to the main controller 816. The main controller may then display the verification code (e.g. if it is a QR or barcode), update the settings of a previously-existing code (e.g. update the contents of an NFC and/or RFID tag), and/or the like.

The guest 818 may use her electronic device 820 to interact with the controller, via scanning 822 the verification code for data, and extracting the data (e.g., a URL and an authentication code, and/or the like) from said data. The guest's electronic device may use the URL, and/or a like authentication mechanism stored in the verification code, to navigate to a webpage, application, and/or the like 824 for the purposes of authentication. The guest may be prompted to provide user details (e.g. name and room number, and/or the like), which, along with the guest's device information (e.g. device ID, device type, device model number, and/or the like) may be sent to the server via a control authentication request 826. In some implementations, the user may also provide information relating to a loyalty program and/or the like for a hotel chain, and/or the like, if the guest is staying in a hotel. In some implementations, control authentication request 826 may be an XML-encoded HTTP(S) POST message which may take a form similar to the following:

```
POST /control_auth_request.php HTTP/1.1
Host: www.CASRMproccess.com
Content-Type: Application/XML
Content-Length: 788
<?XML version = "1.0" encoding = "UTF-8"?>
<control_auth_request>
<timestamp>2016-01-01 12:30:00</timestamp>
    <verification_params>
        <verification_URL>http://www.example_controller_url.com/id?=123456723456
</verification_URL>
        <verification_authcode>123456723456</verification_auth_code>
    </verification_params>
    <guest_params>
        <guest_name>Jane Smith</guest_name>
        <guest_room>001</guest_room>
        <guest_stay>2, nights<guest_stay>
        <guest_username></guest_username>
    </guest_params>
    <device_params>
        <device_ID>48759876984576347</device_ID>
        <device_name>Jane\'s Phone</device_name>
        <device_OS>Windows Phone 8.0</device_OS>
```

```
        <device_veraion>8.0110327.77</device_version>
        <device_model>HTC HTC6990LVW</device_model>
        <device_type>mobile phone</device_type>
    </device_params>
</control_auth_request>
```

In some implementations, the server may authenticate the code provided by the guest's message 828. In some implementations the server may also authenticate the guest by comparing her name and room number with that provided by the manager. The server may then either update the database 830 to allow the guest's device which provided the authentication code to issue settings to the controller (e.g., by updating the guest's record to allow control over the controller 832) from a time-restricted URL, or may package a time-restricted application 834 for the guest which may allow for control on her mobile device from the application. The server may then send a control authentication response 836 to the guest's electronic device, comprising a URL or an application through which the guest can interact with the controller. For example, the guest may be able to provide resource controls, settings, and/or the like 838 until her access to the controller expires (e.g. once she has vacated the unit, after the period specified by the manager, and/or the like).

Figure 9:
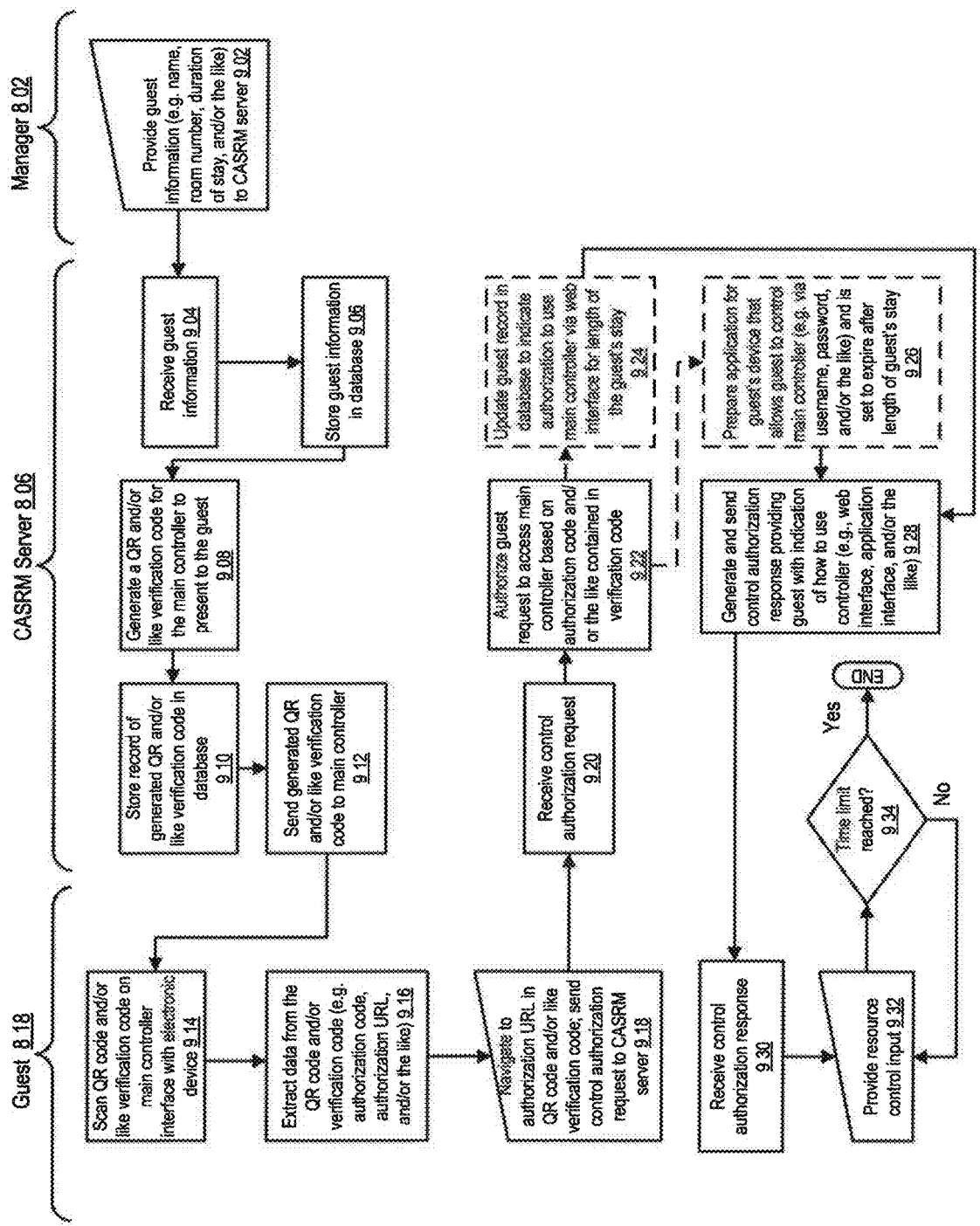
FIG. 9 shows a logic flow diagram illustrating utilizing control codes in some embodiments of the CASRM.

FIG. 9 shows a logic flow diagram illustrating utilizing control codes in some embodiments of the CASRM. In some implementations, the property manager (e.g. a homeowner, a business manager, a hotel manager, and/or the like) may provide information 902 pertaining to a guest who may be occupying space in the property the manager maintains. In some implementations the manager may provide the name of the guest, the guest's room number, the duration of the guest's stay, and/or the like. The CASRM server may, after receiving 904 the guest information, may store it in a database (e.g. may store the guest as a new user, may update an existing record related to the guest, and/or the like) 906. The server may then generate a verification code 908 for the main controller (e.g. a QR code and/or the like), and may save a copy of the generated verification code 910 for future reference (e.g. for verification purposes, for resending the code if it is corrupted on the controller, and/or the like). The server may then send the generated verification code 912 to the main controller.

The guest may at some point scan 914 the verification code provided by the main controller, and may extract data from the verification code 916, such as an authorization code, a URL to a webpage and/or application for processing authorization, and/or the like. The guest's device may navigate to the appropriate location for authorization using the data from the verification code 918, and may send data about herself to the server from this location. For example, on a webpage the guest may provider her name, room number, and/or the like, and her device, when sending this information to the server, may also include its device ID, model number, name, and/or the like.

The CASRM server may receive the authorization information from the guest in the form of a control authorization request 920, and may determine whether or not the guest is authorized to access the controller 922 (e.g. checking the guest's record against the information provided by the guest, and/or the like). In some implementations, the server may, after authorizing the guest, either update the guest's record in the database to indicate that she is authorized to use a server-provided web interface 924 for issuing instructions to the controller during the length of her stay, or may prepare a device-specific application for the guest's device that may allow the guest to use the application via her electronic device 926 to send controls, instructions, settings, and/or the like to the controller during the length of her stay. The server may generate and send a control authorization response 928 to the guest indicating that the guest is now authorized to use the controller, the method that the guest may use in order to connect and/or change settings on the controller, and/or the like.

In some implementations, after the guest has received the control authorization response 930, may start to provide resource control input (e.g. light, temperature, appliance, and/or the like settings) to the controller. As long as the time limit 934 for the guest's access to the controller has not been reached, the user may continue to alter the settings and/or the like for the controller that she has gained temporary access to.

FIGS. 10A-J show diagrams illustrating controller relationships and interfaces in some embodiments of the CASRM. For example, a user may upload maps 1002 of her site (e.g., an apartment, a floor of a house or building, a side view of a building, a plurality of buildings, and/or the like). The user may be able to user a control device 1004 (e.g., a personal computer, laptop, mobile phone, and/or any electronic device capable of connecting to a controller), to connect to and send settings and/or the like to a main controller (e g main controller 1006, main controller 1010, main controller 1014, main controller 1024, and/or the like). The main controller may be able to forward instructions from the control device to further unit controllers (e.g. living room controller 1008, unit controllers 1012a-j, unit controllers 1016a-f, unit controllers 1028a-f, and/or the like). In other implementations, the control device may also be capable of sending instructions to a unit controller, without connecting first to a main controller. In some implementations, a user may be able to view the positions of each controller on the map she uploads of her site (and/or of a generated map; see FIG. 10E). In some implementations, controllers may also use the positions of appliances, devices, and/or the like, in addition to weather and/or location conditions, in order to automatically provide regulation to various devices, appliances, and/or the like in a site. For example, living room controller 1008 may send instructions 1009a to appliances on the south end of a room that lower the temperature of the area (e.g., closing blinds and raising the air conditioning output) in order to counterbalance the effects of sunlight from southern windows (and may, inversely, send instructions 1009b to appliances and/or the like on the north end of a room in order to raise the temperature of the area (e.g., turning a fan off) in order to counterbalance the colder nature of a north-facing space. Additionally, settings may also be changed based on weather patterns the unit controllers observe (e.g., from weather reports issued from the cloud, from internal temperature readings, and/or the like) to further fine-tune settings dynamically, without the need for constant user input. Other map functions integrated in some additional and/or alternative implementations include but are not limited to functions to display multiple sites maps; functions to view a single site map; function to view a floor map; functions to view a zone, an area and/or a room amp; functions to access devices represented on a map; functions combining one or more of the aforementioned map functions; and/or like map functions.

In some implementations, a single main controller and/or control device may be able to control unit controllers in a single home (e.g. FIG. 10A), unit controllers in different homes but on the same floor of a building (e.g. FIG. 10B), unit controllers spread across it multiple floors in a building (e.g. FIG. 10C), and/or the like. In some implementations main controllers and/or control devices may control unit controllers spread across multiple buildings in which the main controller does not need to reside. For example, regarding FIG. 10D, the main controller 1024 is being controlled by a supervisor 1022 in the building where the supervisor resides 1020. However the main controller is still able to access unit controllers 1028*a-f*, even though they reside in separate buildings 1026*a-c*.

Figure 10A:
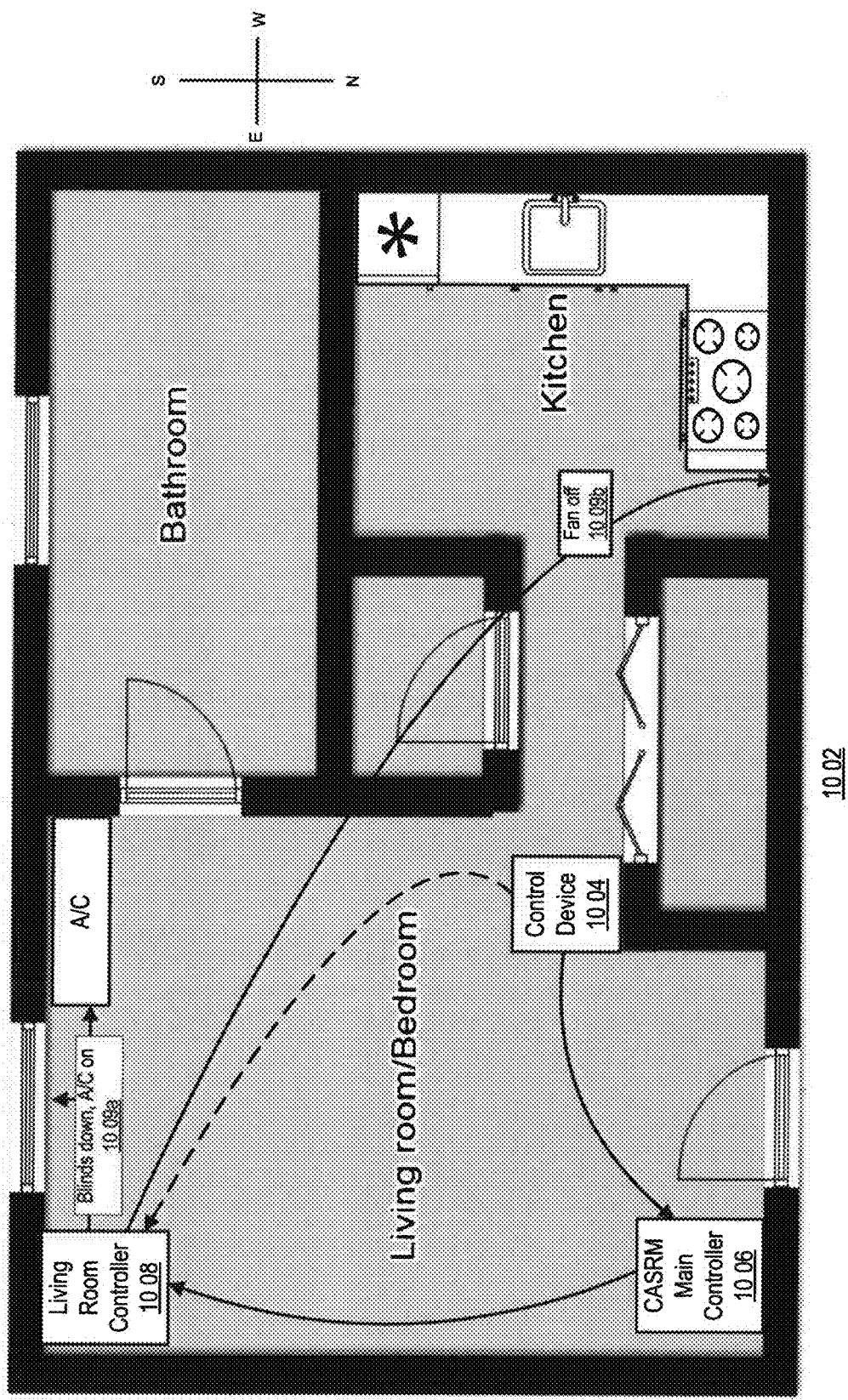
FIGS. 10A-J show diagrams illustrating controller relationships in some embodiments of the CASRM.
Figure 10B:
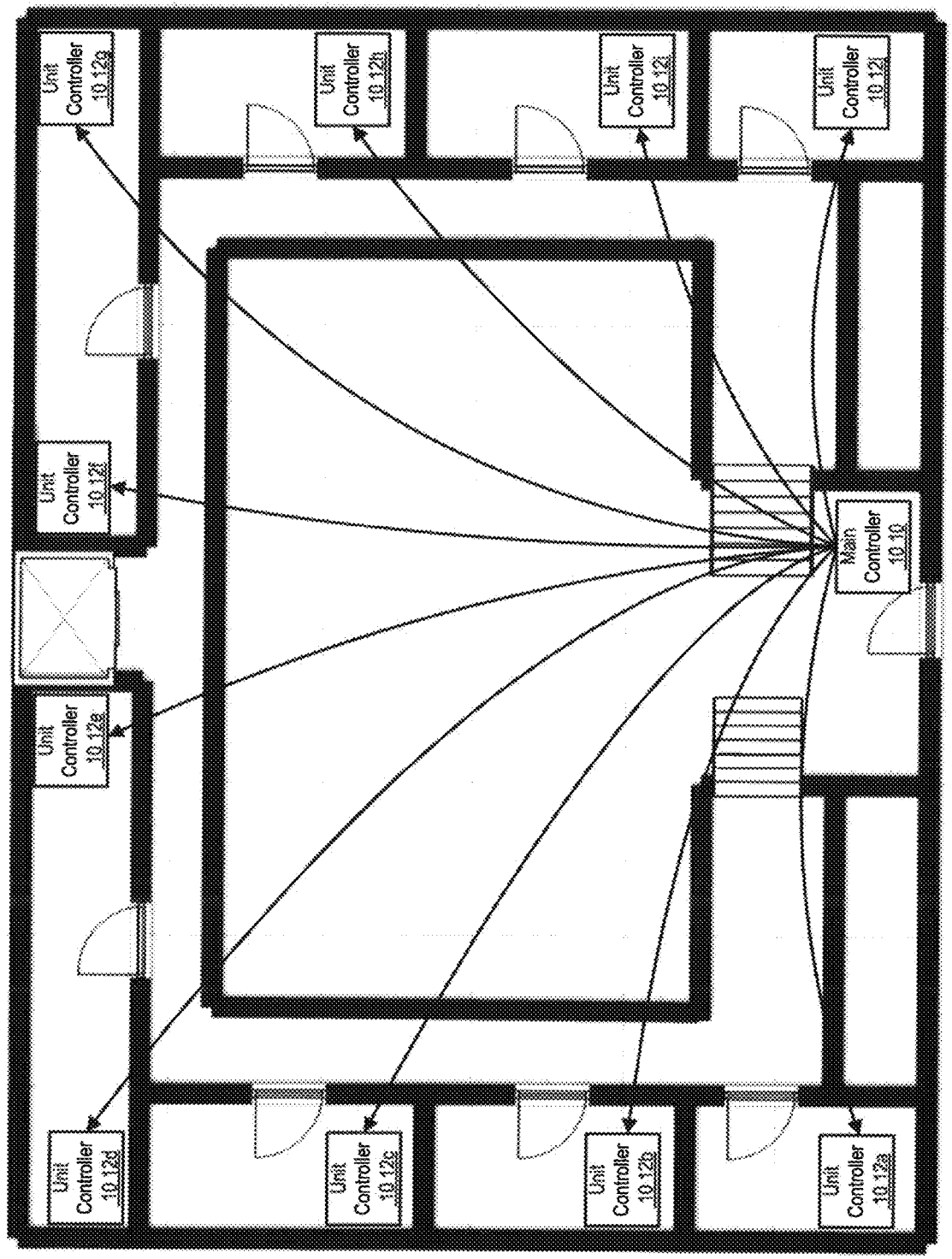
Figure 10C:
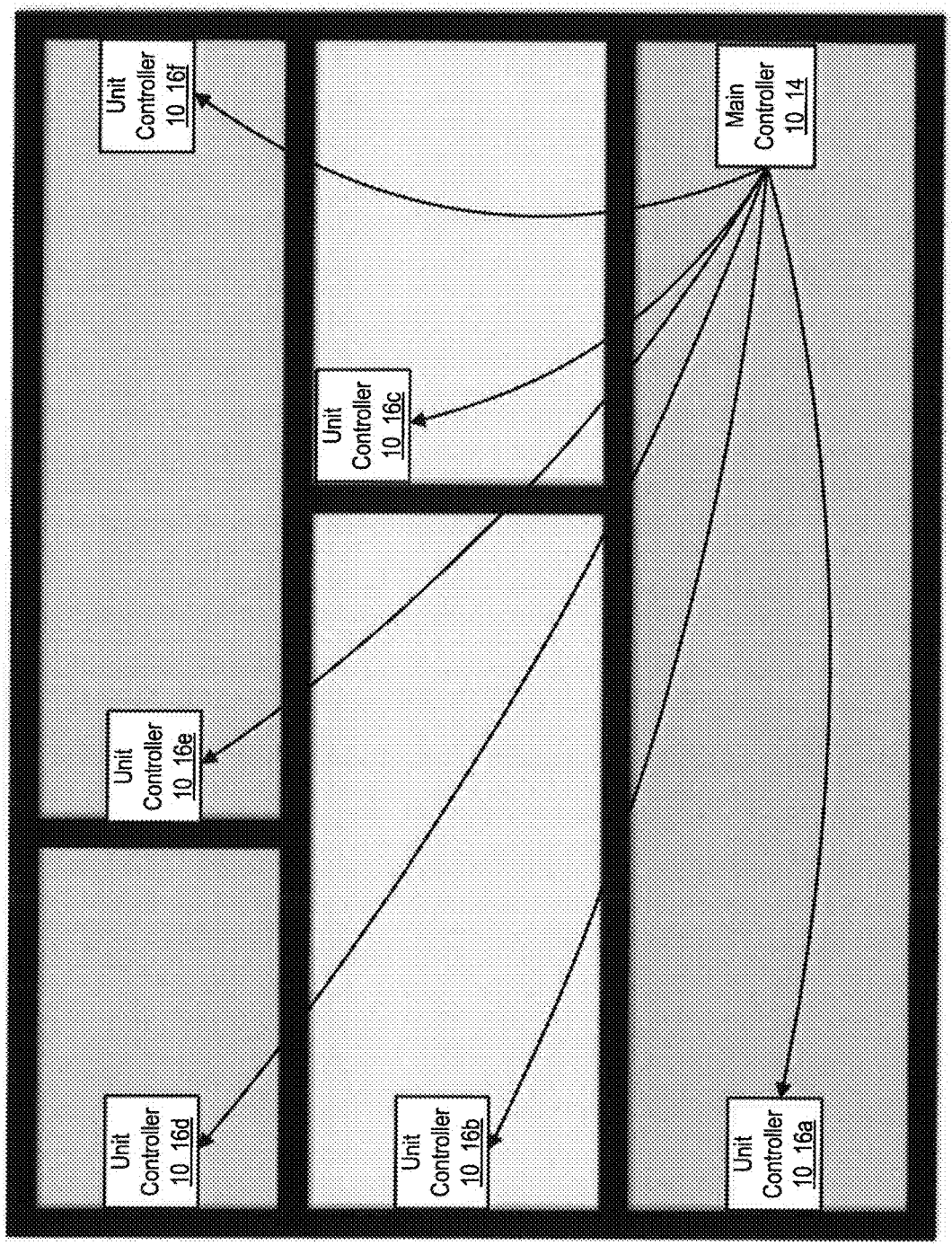
Figure 10D:
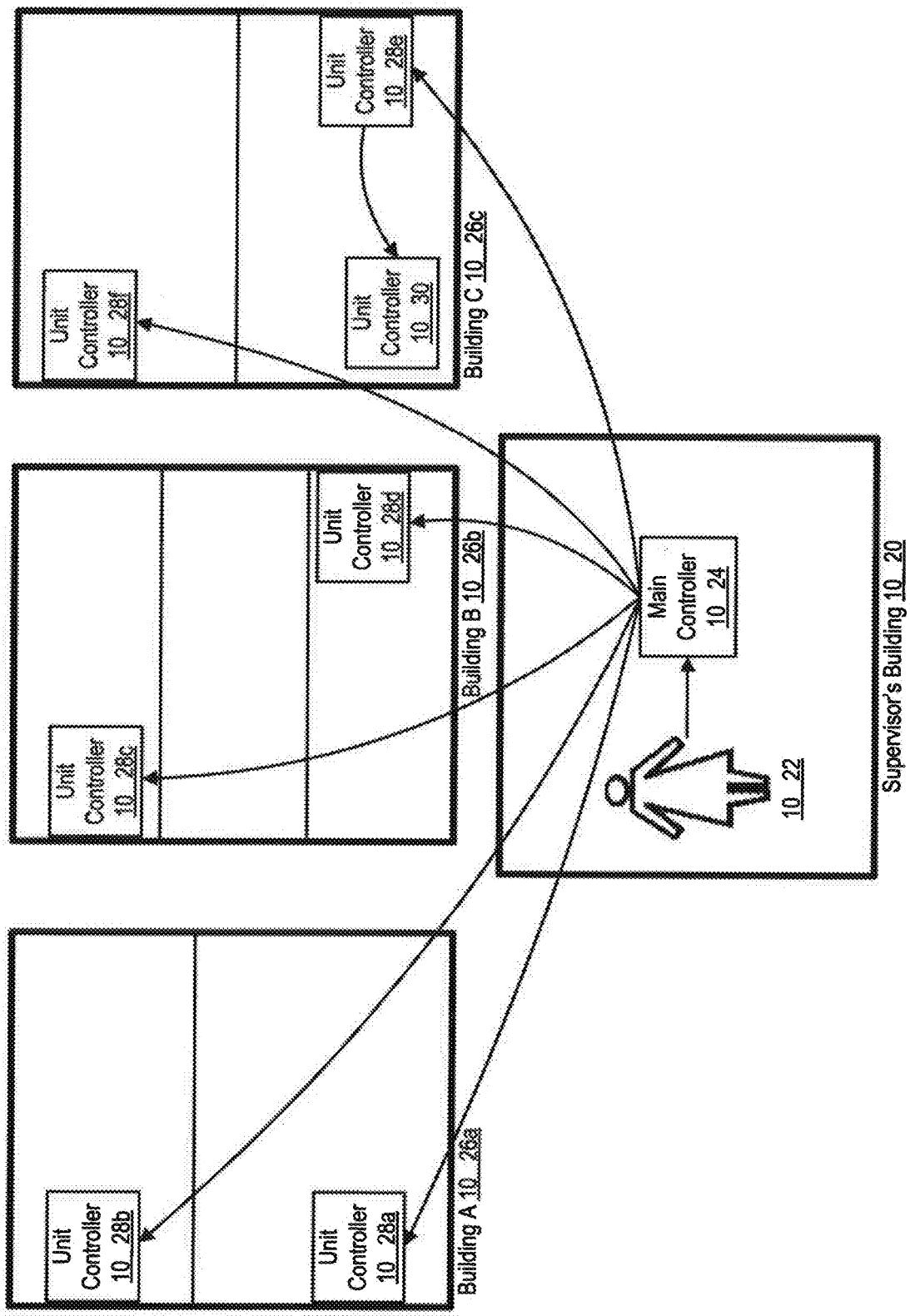
Figure 10E:
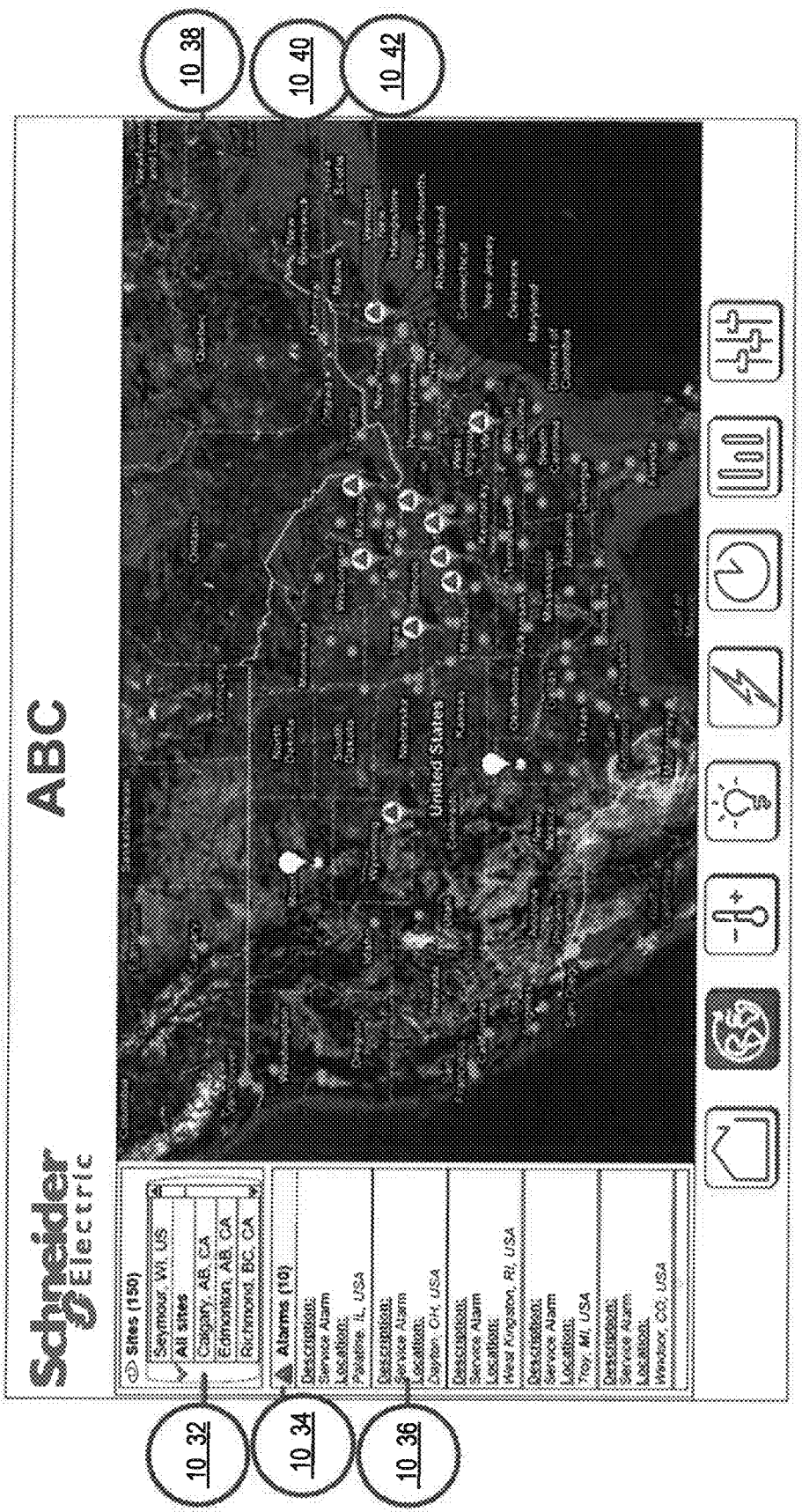

Regarding FIG. 10E, in some implementations, a user may be able to control a plurality of controllers across a city, state, country, and/or the like using the same infrastructure. In some implementations, the user may be able to use a map 1038 interface to view site and/or controller locations, and to view information pertaining to them (e.g. the status 1040 of the site and/or the like) via selecting a site, e.g. via menu 1032. In some implementations the user may also be able to view alarms 1034 and 1042, which may indicate whether problems have occurred at any sites and/or controllers. In some implementations, each alarm notification may also comprise a description 1036 of the type of alarm, the location of the alarm, and/or the like. In some implementations the user may also use the interface to provide instructions to sites, and/or the like.

Figure 10F:
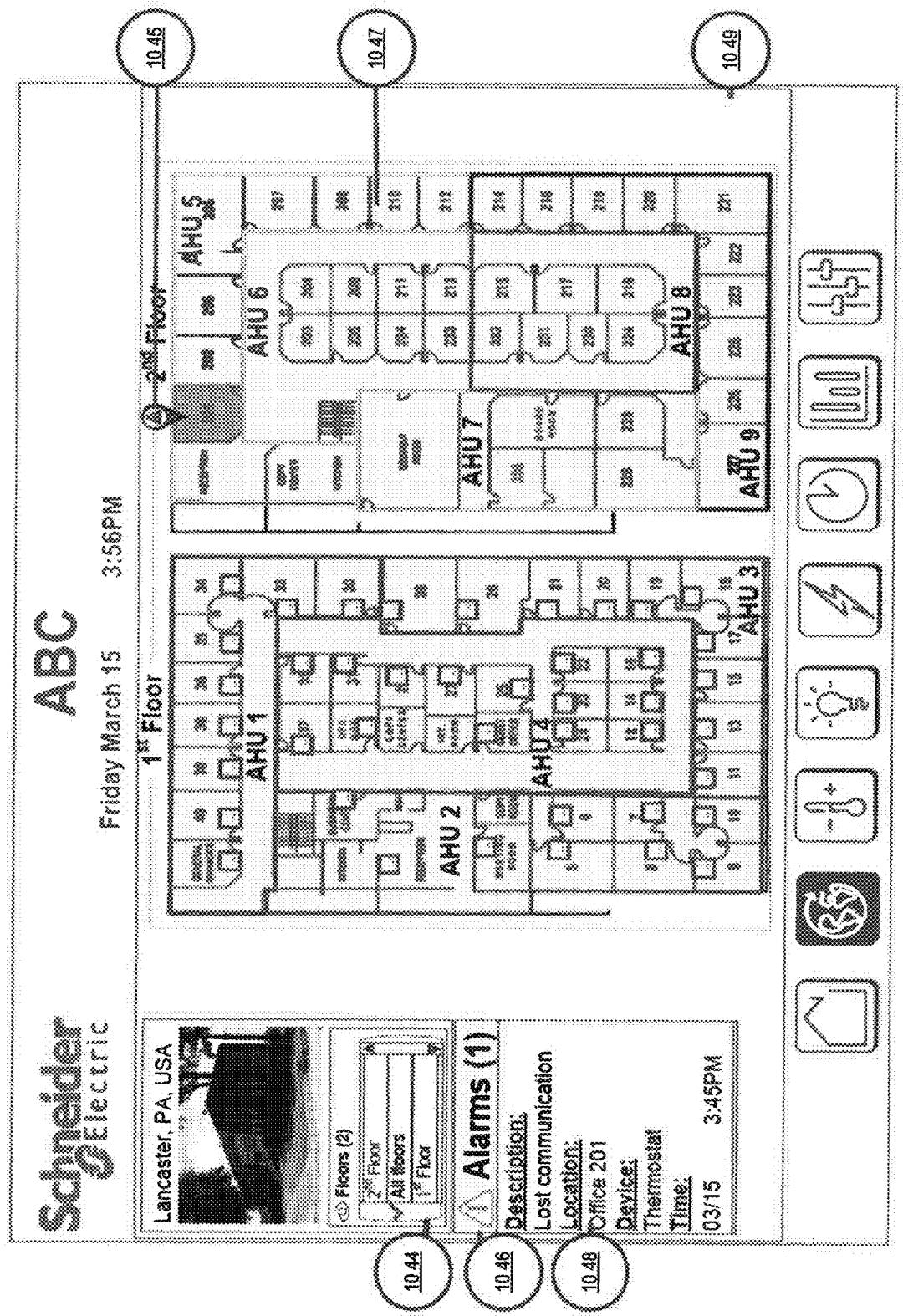

FIG. 10F provides an example of a user interface to view and manage a plurality of devices installed in a building connected to one or more controllers. In some embodiments, a user can view the devices and/or controllers installed in a building by floor for example first floor, second floor, all floors and the like 1044. Additionally the interface can communicate to the user a condition affecting one or more of the devices and/or controllers (for example, an alarm triggered by a loss of communication with one or more devices and/or controllers 1046). Further details can be also be provided to the user with respect to such a condition, for example, the cause of the condition, affected devices and/or controllers, the location of the affected devices and/or controllers, and the date and/or time the alarm fired 1046. Moreover, the interface can provide an interactive view of the floor plans e.g., 1045, such that a user can differentiate between, for example, each room in a floor plan 1047, and can determine where affected devices are located in a floor e.g., 1049.

Figure 10G:
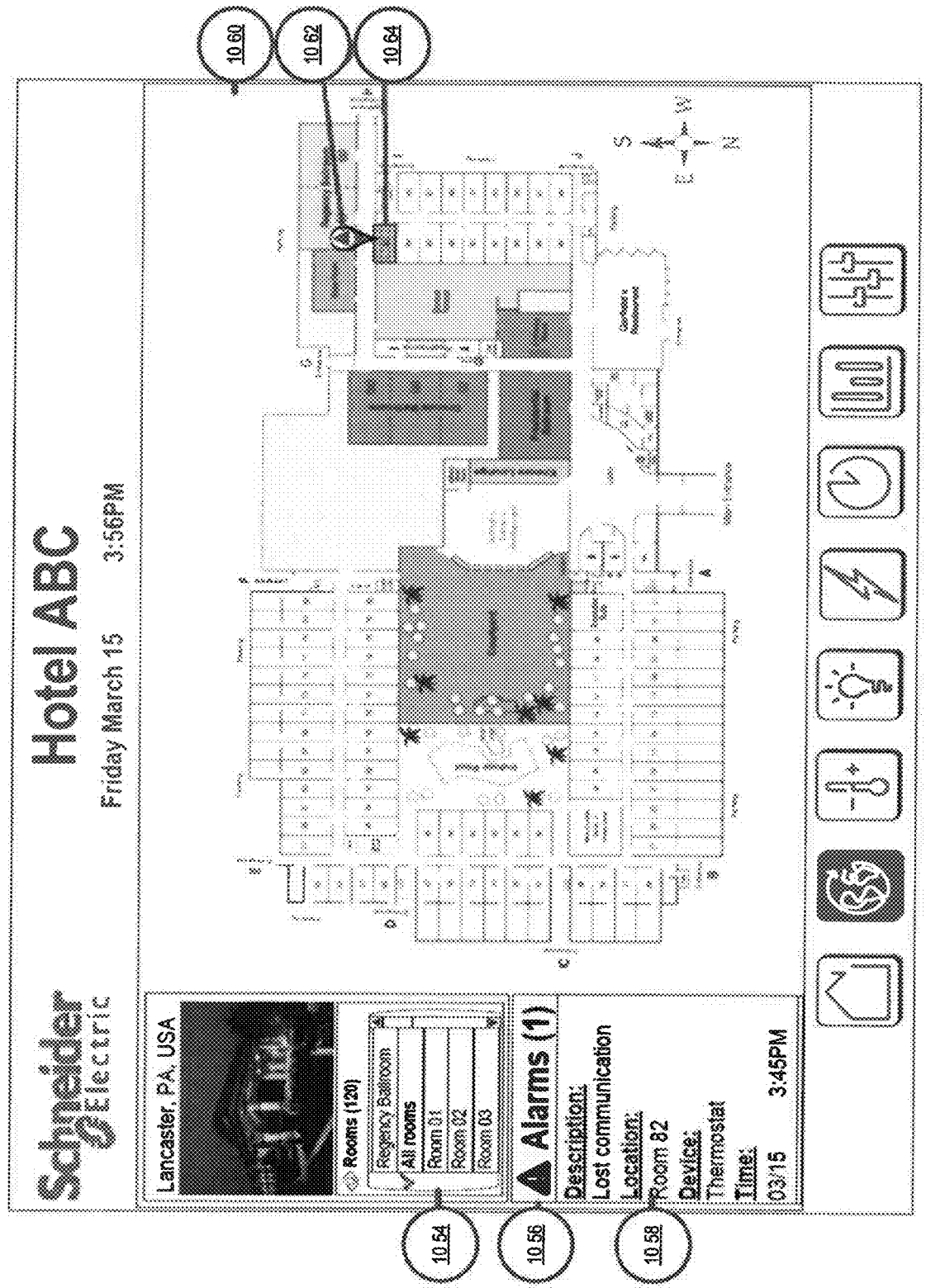

FIG. 10G provides an example of a user interface to view and manage a plurality of devices installed in an area connected to one or more controllers. In some implementations, an interface can provide an interactive view of an area where multiple devices and/or controllers are installed e.g., 1060. Such an area can include indoor areas and outdoors areas. In some implementations, the interactive view can locate a subarea where a device and/or controller is installed 1064, and the user can access specific devices by clicking on an icon in the view 1062. The icon can indicate a condition of one or more devices in the subarea, for example, an alarm condition. In addition, the interface can further provide interactive menus to change the view, for example, changing the view to a room in the area 1054. In some implementations, the interface can further provide a condition of one or more devices and/or controllers 1056 and also detail about the devices and/or controllers affected by such a condition 1058.

Figure 10H:
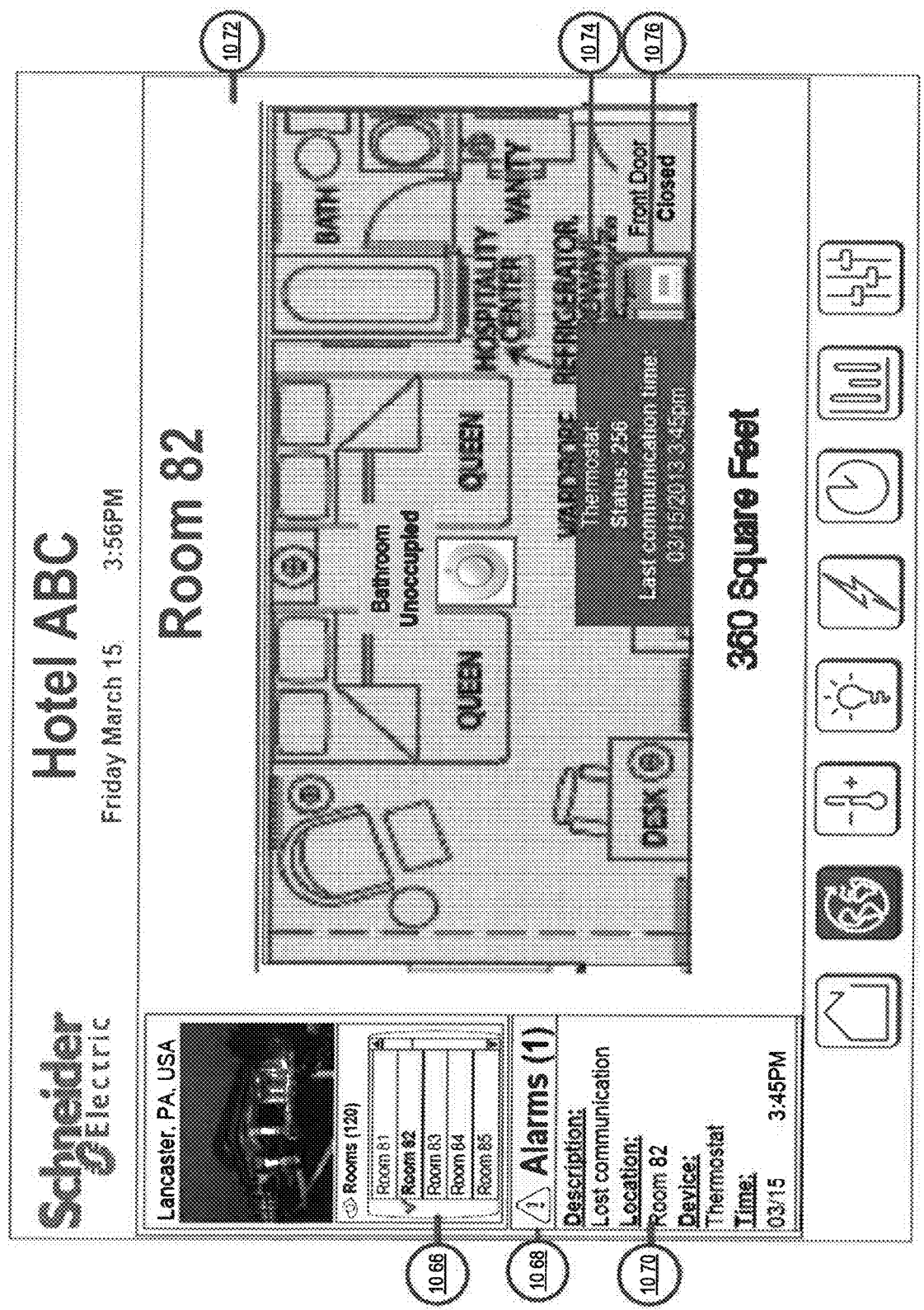
Figure 10I:
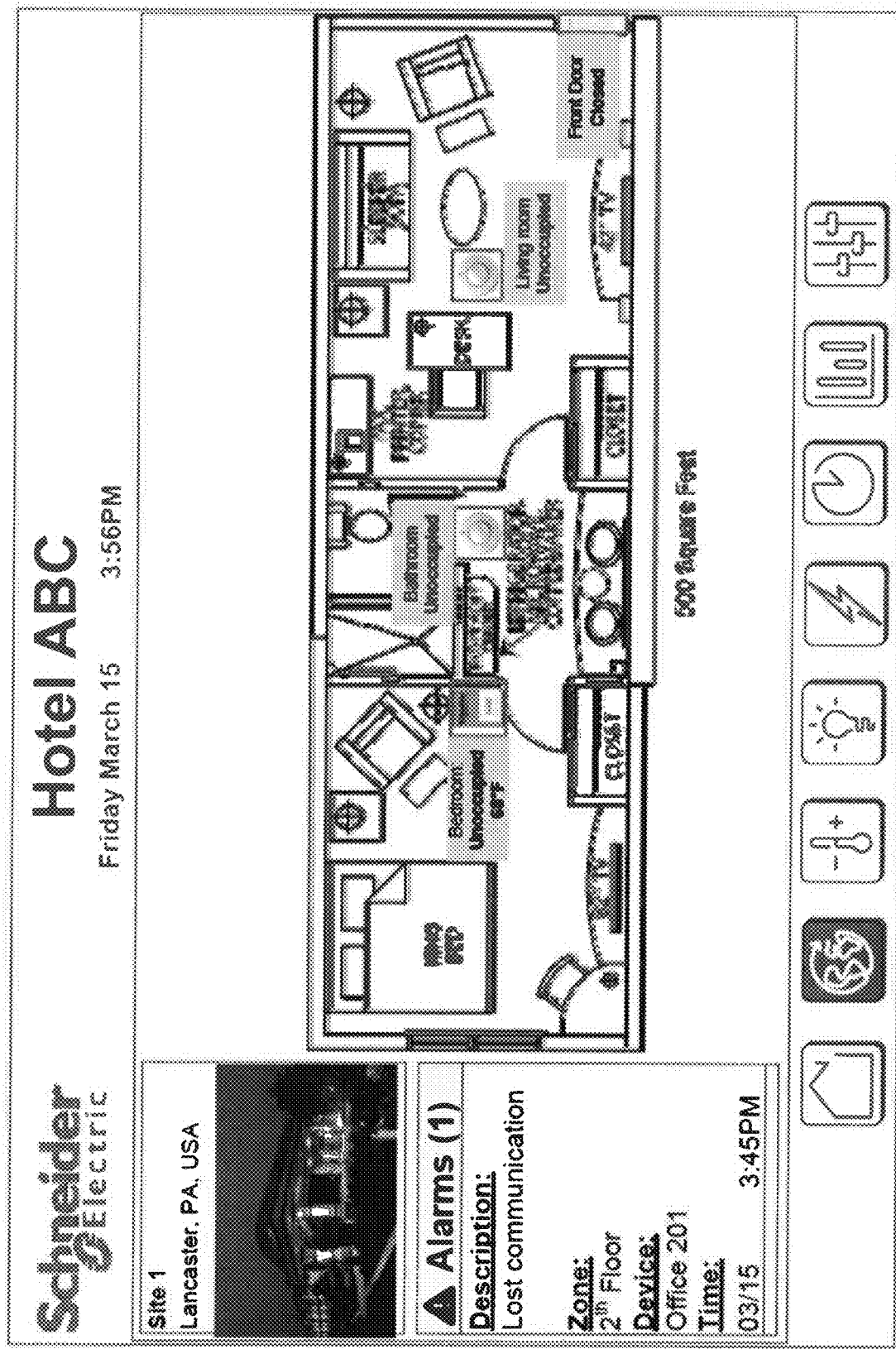
Figure 10J:
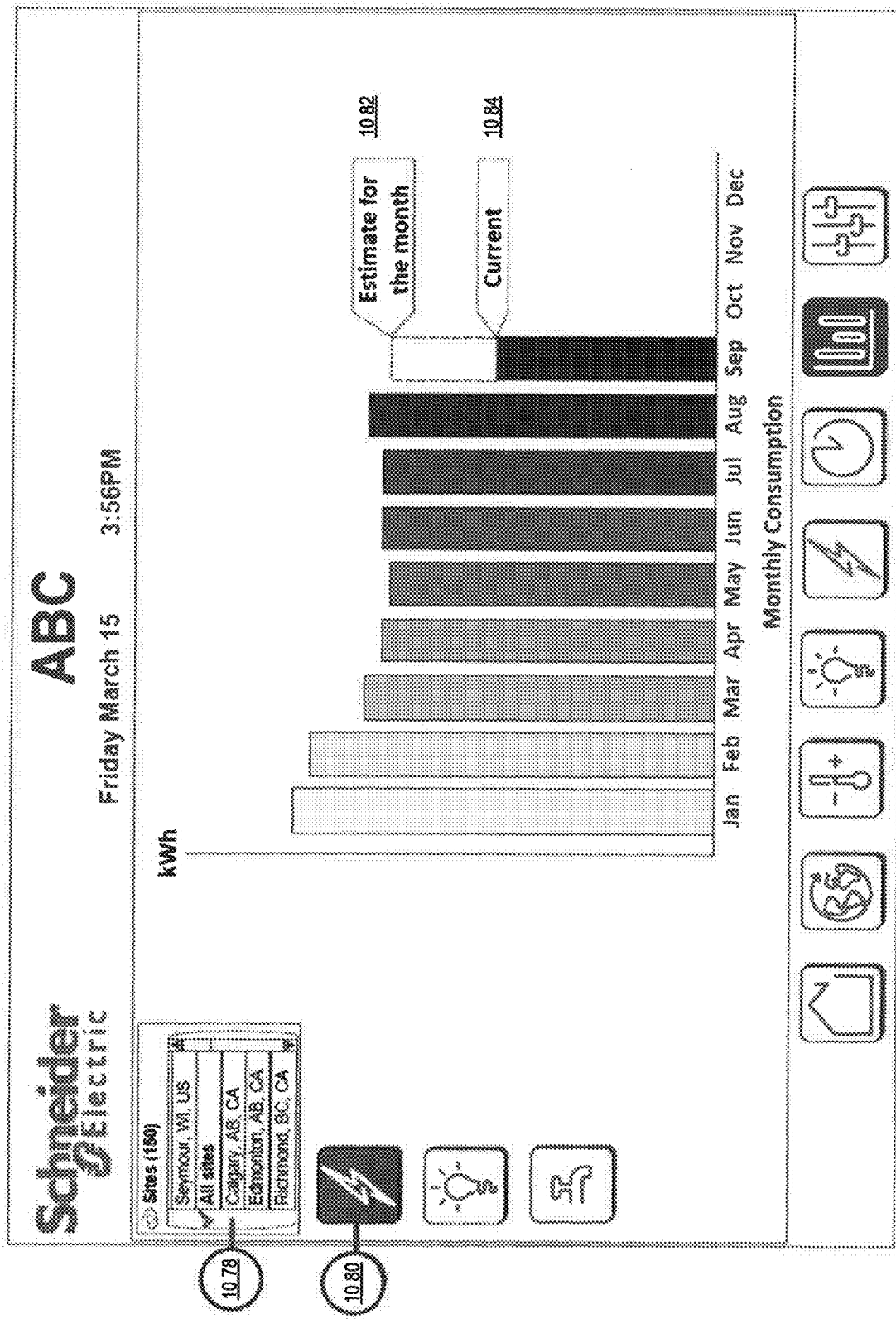

FIGS. 10H and 10I provide examples of a user interface to view and manage a plurality of devices installed in a room connected to one or more controllers. In some implementations, the view can include a floor plan of a room 1072, an icon representing the model and/or type of an installed device 1076 and a summary of a condition of one or more devices and/or controllers 1074. In addition, the interface can further provide interactive menus to view change the view for example changing the view from one room to another 1066. In some implementations the interface can further provide a condition of one or more devices and/or controllers 1068 and also detail about the devices and/or controllers affected by such a condition 1070. FIG. 10J provides an example of a user interface to view statistical data related to the devices and/or controllers installed in an area, building, room and/or similar spaces. In some implementations, a user is provided with interface controllers to view aggregated data for one or more devices and/or controllers managed by a main controller 1078. The view can additionally be changed by other types of criteria, for example, the devices and/or controllers managed in a specific city. In some implementations, the user can view the aggregated data by, for example, the type of consumed service, e.g., electricity, lighting, water and/or like services 1080. The displayed data can also provide a user with an estimate of how much of such a service will be consumed by the end of a period of time 1082 and what is the current consumption of such a service 1084.

Figure 11:
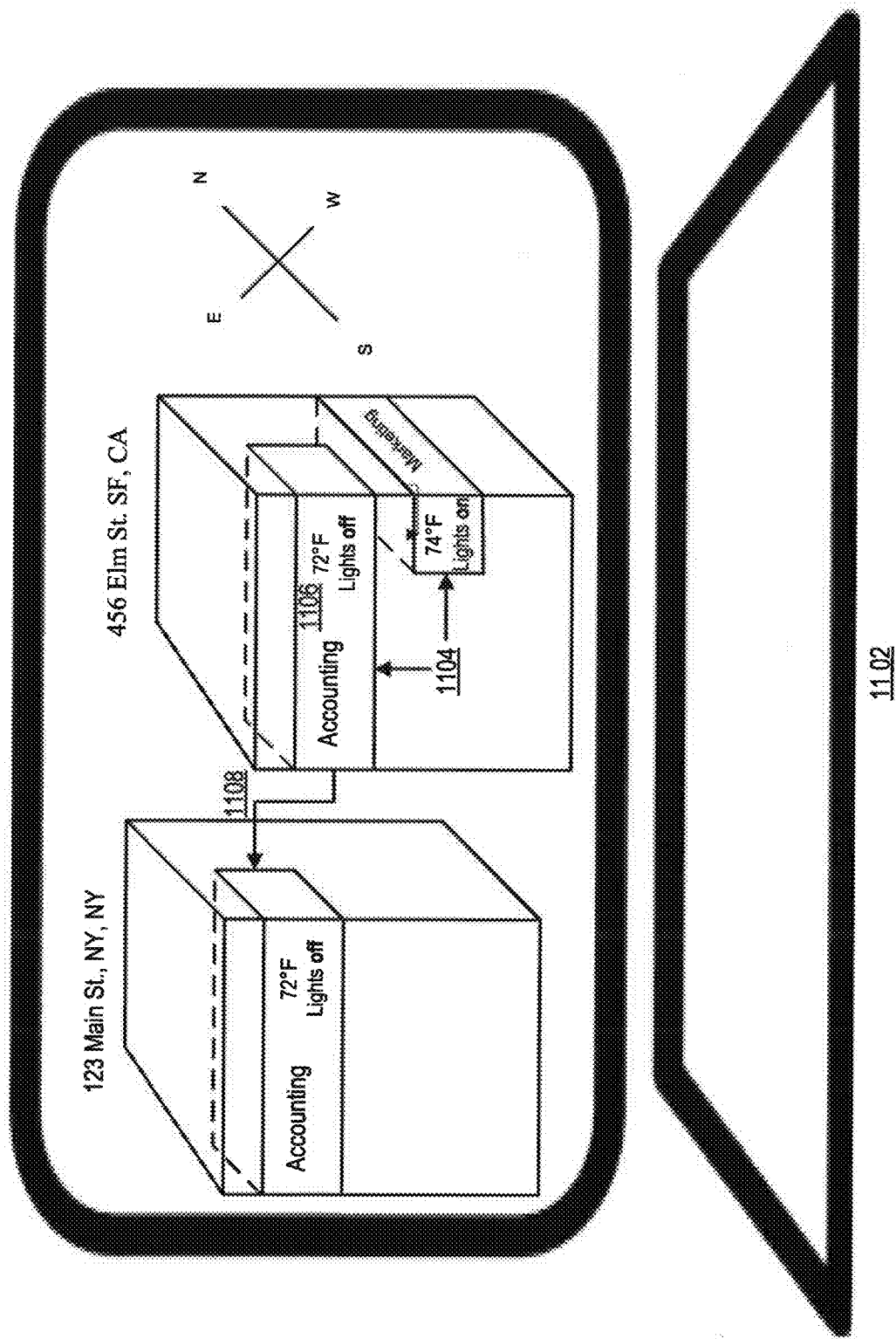
FIG. 11 shows a screenshot diagram illustrating controller management in some embodiments of the CASRM.

FIG. 11 shows a diagram illustrating controller management in some embodiments of the CASRM. In some implementations, a user may wish to user her electronic and/or control device 1102 to view portions of a home, building, and/or the like that are under the control of a CASRM controller. For example, a user may be able to view cross-sections 1104 of the building, and may be able to select these sections in order to view the status of controllers in the area, check controller settings 1106, change controller settings, view and/or change a list of people who may be authorized to change controller settings, and/or the like. In some implementations, the settings may be transmitted to different buildings with the same department 1108, to a different department in a different building that may use similar settings and/or have similar needs, and/or the like. In this example, a virtual Accounting building may be created from the cross section spanning multiple geographic locations. Thereafter, when making, e.g., climate, changes to the virtual Accounting building (e.g., turning the lights off and setting the temperature to 72 F), the affected cross sections in both Building 1 and Building 2 may receive instructions to execute the new settings, while other sections (e.g., Marketing) may remain unaffected. Such an embodiment allows for eased administration of disparate locations while maintaining logical/organizational commonality.

Figure 12A:
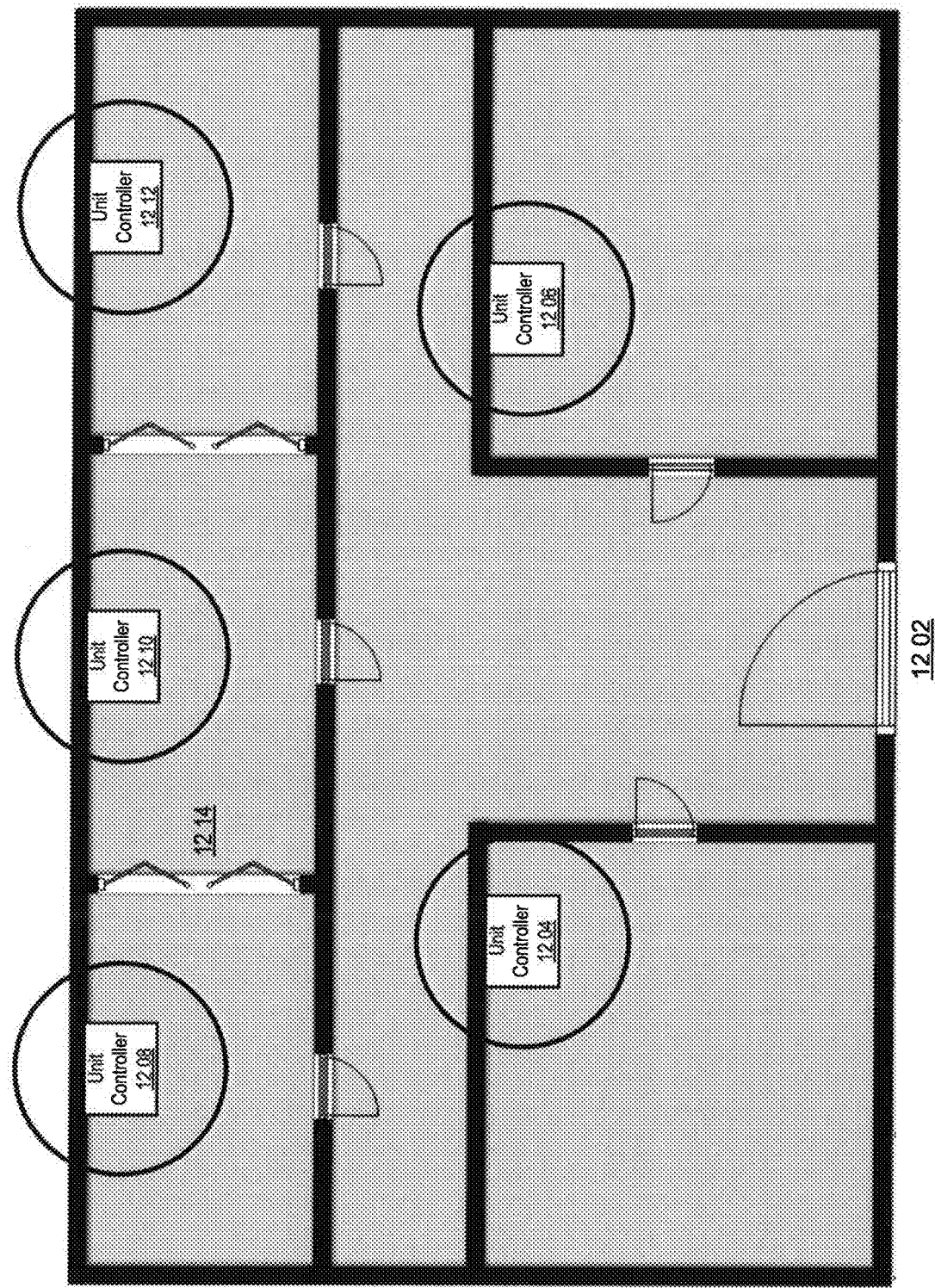
FIGS. 12A-B show screenshot diagrams illustrating controller configurations in some embodiments of the CASRM.
Figure 12B:
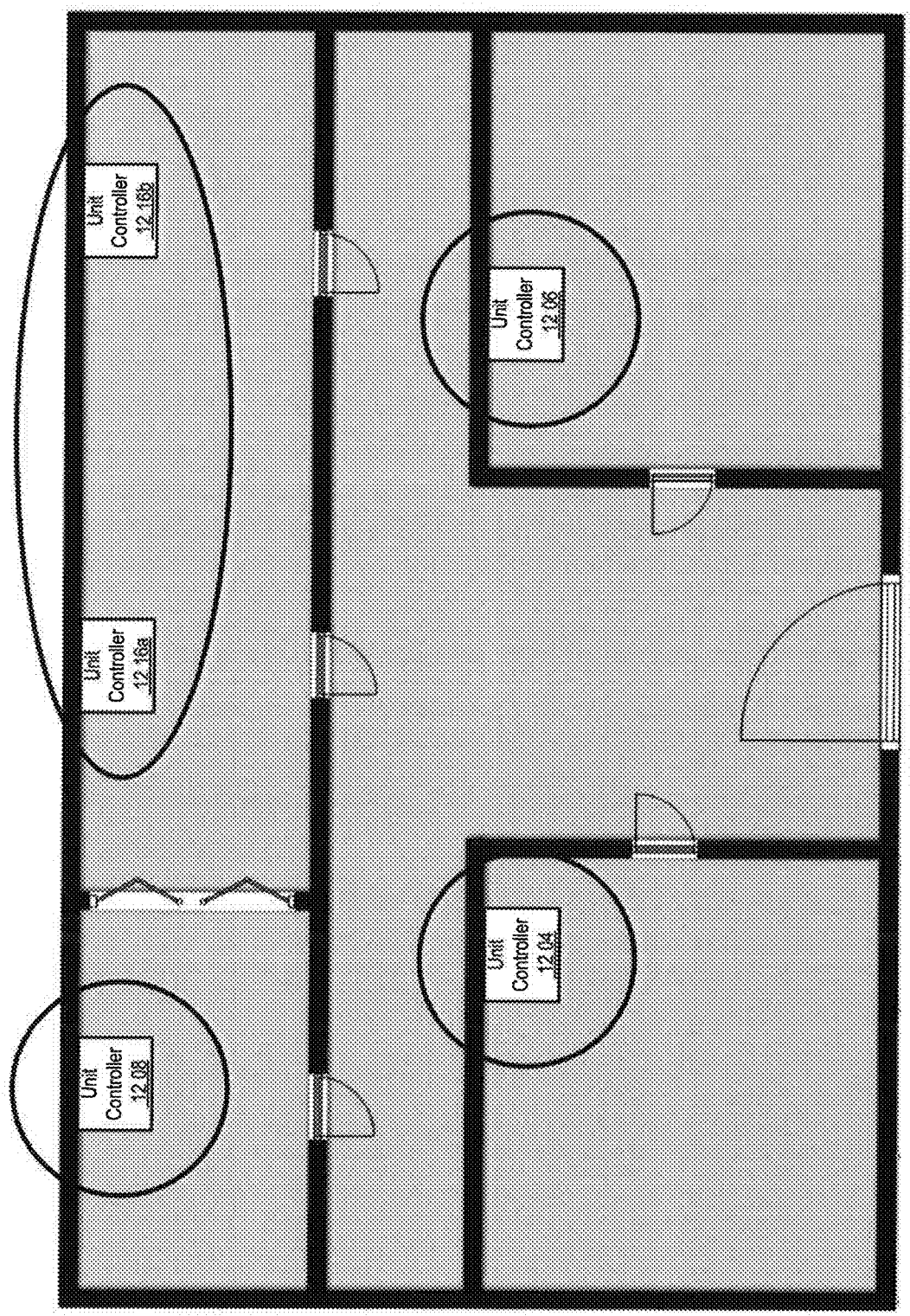

FIGS. 12A-B show screenshot diagrams illustrating controller configurations in some embodiments of the CASRM. In some implementations, for example, unit controllers may exist on virtual local networks representing the network controllable by a particular entity (e.g. user, business, and/or the like). In some implementations, CASRM may detect which network a particular controller is virtually assigned to via matching its virtual address with existing virtual networks on the site, and may use the virtual network information to determine who may be allowed (e.g., via account permission settings and/or the like) to send instructions and/or the like to the controller. In some implementations, for example, on a floor of a building 1202, unit controller 1204, 1206, 1208, 1210, and 1212 may each exist within a separate network, and a user may require permissions to access each virtual network in order to communicate with a controller in a particular network, and/or the like.

In some implementations, a building 1202 may have a need to permanently and/or temporarily change a network a particular unit controller is in. For example, if a user is managing a convention center and/or like venue during an event (e.g., conference, trade show, concert, and/or the like) and/or the like, and creates temporary rooms within a space, e.g., via folding doors 1214, moveable dividers, temporary walls, and/or the like, the user may wish to put each unit controller within each temporary space on a separate network, e.g., so that each unit controller may be temporarily controlled by the entities occupying the temporary space. Referring to FIG. 12B, in some implementations, the user may wish to enlarge a space, combine spaces, and/or the like, via removing temporary walls, shifting doors, and/or the like. In some implementations, while unit controllers 1204-08 may remain on different networks, the user may wish to place unit controllers 1210 and 1212 on the same network now that they occupy a same temporary space. The user may choose to update the addresses of the controllers via the CASRM application. Once controllers 1216a and 1216b are on the same network, the user may be able to control both through the same network, may be able to allow a temporary user access to both controllers on the new local network, and/or the like.

In some implementations, a user may be able to sign up for the services provided by a CASRM main controller and/or the CASRM cloud via entering user sign-up information into a sign-up user interface. In some implementations the user may be provided a different interface depending on the subscription the user is utilizing (e.g., whether the user is using multiple main controllers within the same site, multiple main controllers within different sites, a main controller in a residential and/or similarly small site, whether the user is utilizing all of the features within the CASRM, or whether the user is implementing a part of the CASRM infrastructure, and/or the like). In some implementations, the user may provide information such as her name, her location, payment information, floorplans, and/or like information about her site(s), and/or the like.

Figure 13:
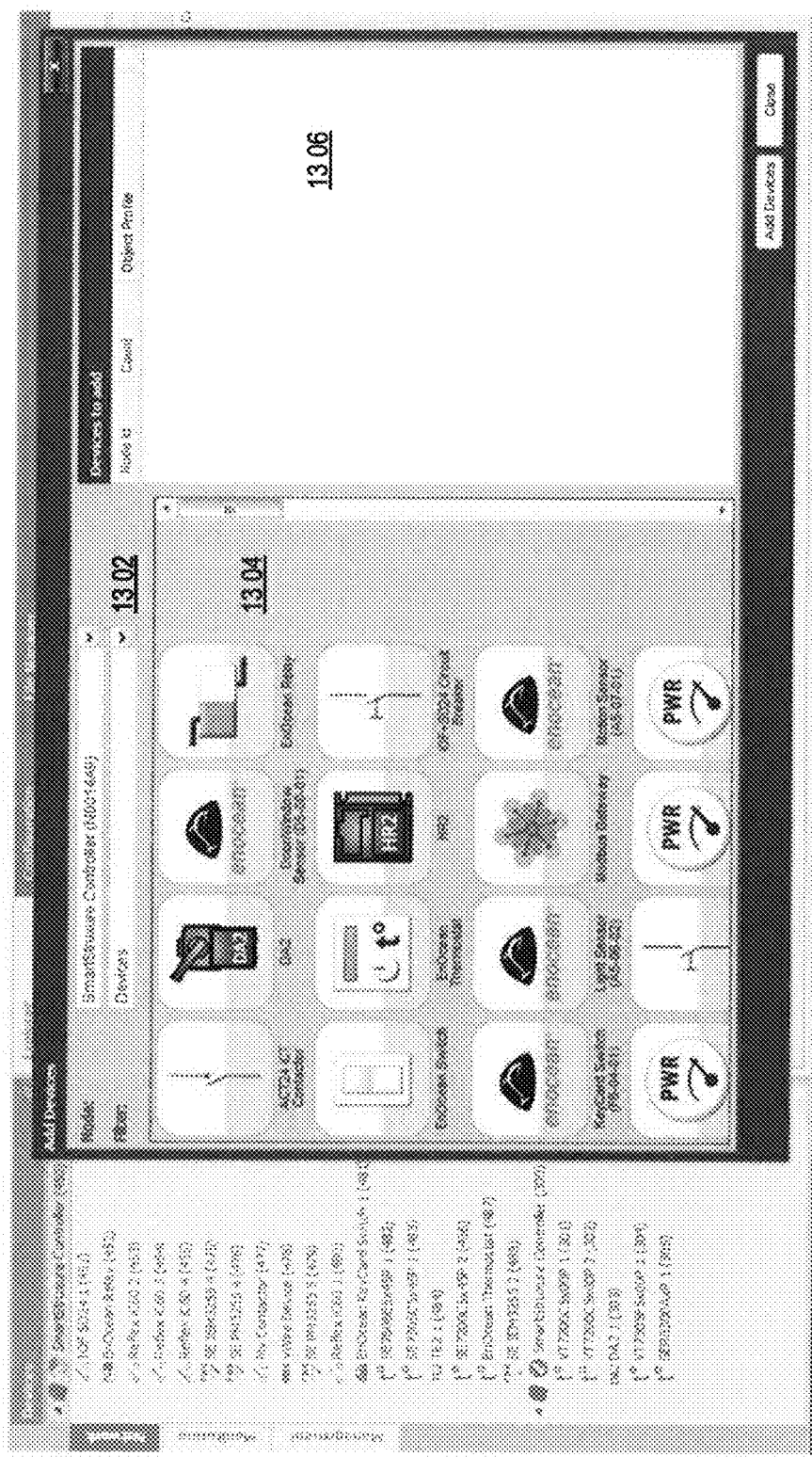
FIG. 13 shows a screenshot diagram illustrating adding devices in some embodiments of the CASRM.

In some implementations, referring to FIG. 13, the user may also set up her controllers via providing identifiers, locations, and/or the like for her main controllers, unit controllers, and/or the like. In some implementations, the user may also add devices 1302 such as a door and/or window sensor, a relay, an ACT24 iCT contactor, a switch, a thermostat, a circuit breaker, a keycard switch, a light sensor, a modbus and/or like gateway, a motion sensor, and/or the like. In some implementations, the user may be able to add such devices via selecting device icons 1304, and/or via dragging the icons to the device list area 1306, where the user's list of devices controlled by a particular controller and/or the like may be found. The user may then be able to confirm the added devices via an "Add Devices" button, and/or the like.

Figure 14:
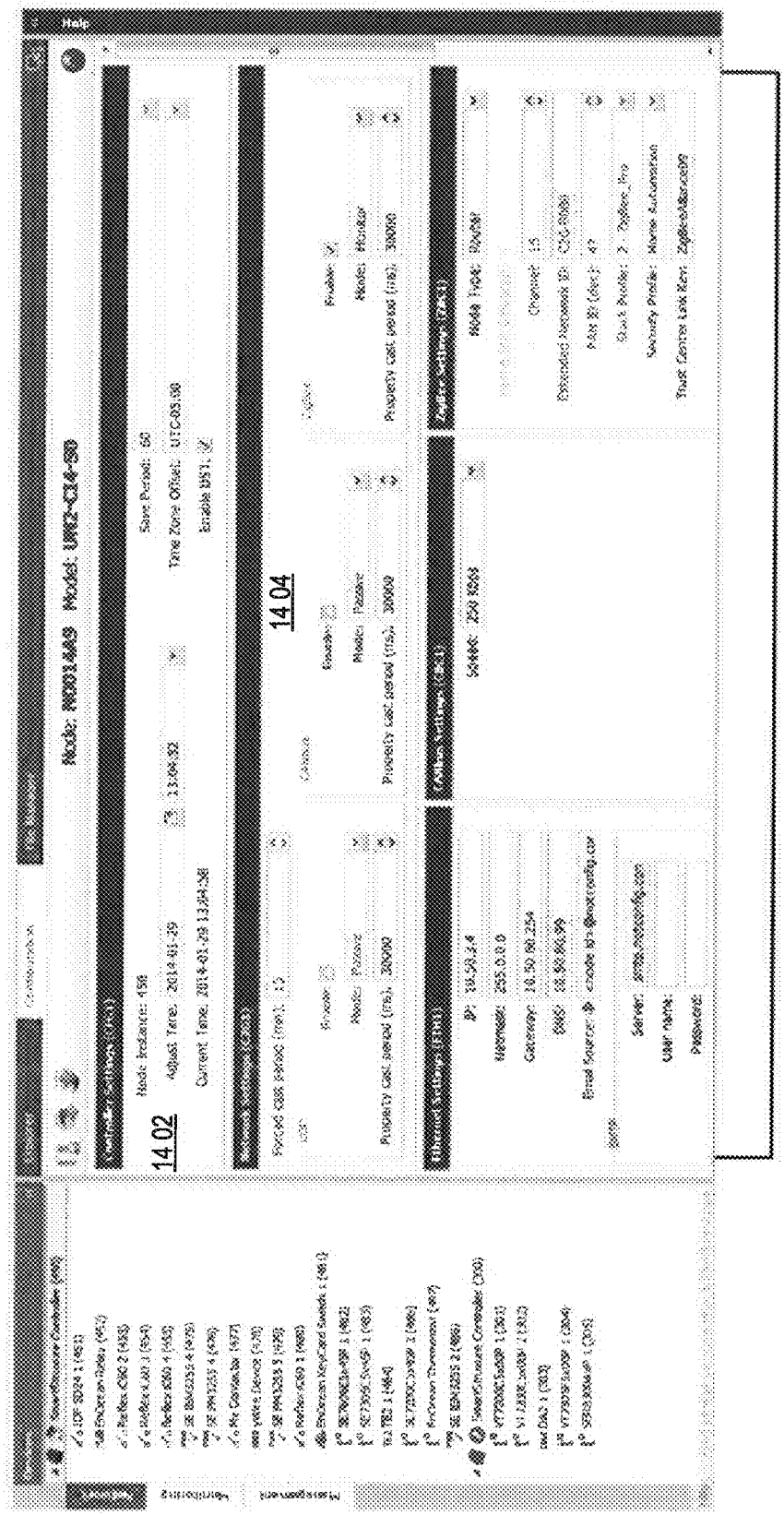
FIG. 14 shows a screenshot diagram illustrating editing device settings in some embodiments of the CASRM.

In some implementations, referring to FIG. 14, the user may be able to edit settings for her controllers, including the time, time zone, date, and/or the like for the controllers 1402, the network settings for the controller 1404, particular network layer (e.g., Ethernet, CANbus, Zigbee, and/or the like) settings 1406, and/or the like.

Figure 15:
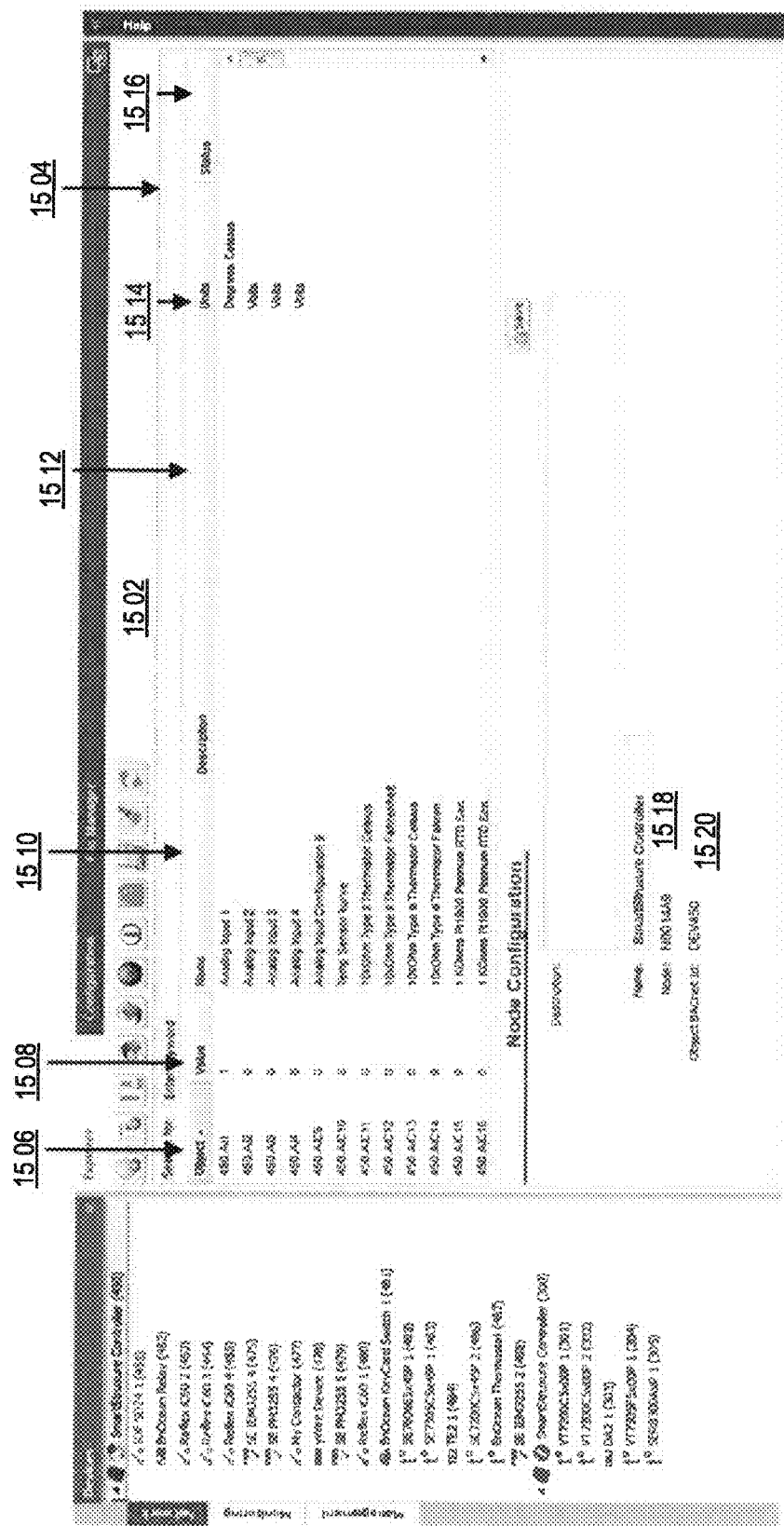
FIG. 15 shows a screenshot diagram illustrating managing devices in some embodiments of the CASRM.

In some implementations, referring to FIG. 15, the user may also be able to view a list 1502 of all of her devices and/or the like which have been added to her account, and may be able to search for 1504 and/or select any of the devices (which, in some implementations, may also be referred to as nodes within the user's local network) in order to edit the settings of the devices, viewing the status of the devices, and/or the like. The user may be able to view, for example, the object name and/or ID 1506, a value and/or setting for the device 1508, the name of the device 1510, a description of the device 1512, units that the device's sensors, and/or the like utilize 1514, the status of the device 1516 (e.g. on, off, inerror, and/or the like), and/or the like. In some implementations, the user may also be able to view the node ID 1518 and/or BACnet ID 1520, and/or the like, of each device.

Figure 16:
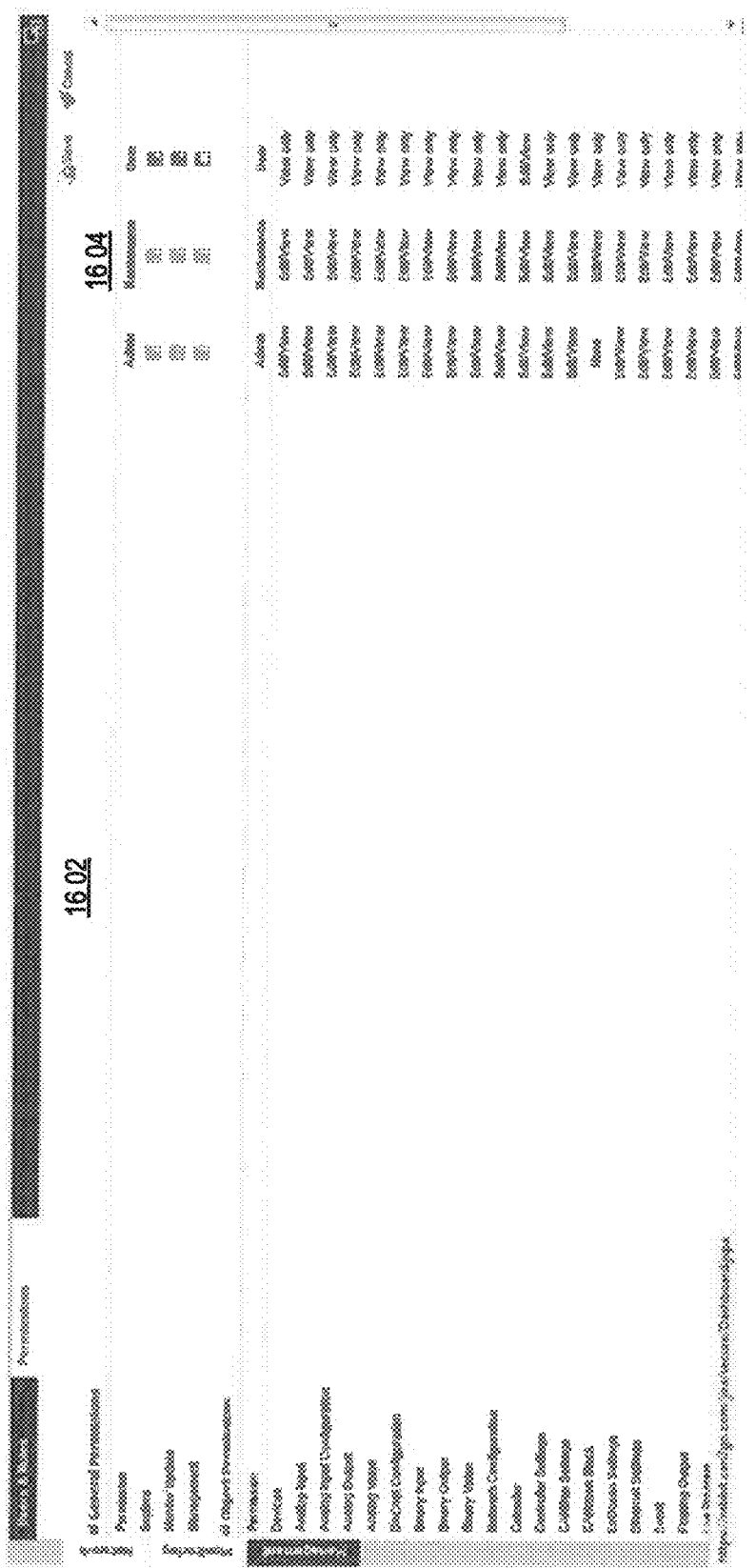
FIG. 16 shows a screenshot diagram illustrating managing device permissions in some embodiments of the CASRM.

In some implementations, referring to FIG. 16, the user may also be able to set permissions 1602 for the controllers, e.g., in order to determine who may change settings and/or like aspects of the user's local network, and/or the like. In some implementations the user may set permissions for controllers, resource management devices, network settings, input and/or output settings, and/or like settings, based on the type of user 1604 (e.g., based on whether the user is an administrative user, regular user, maintenance user, and/or the like).

Figure 17:
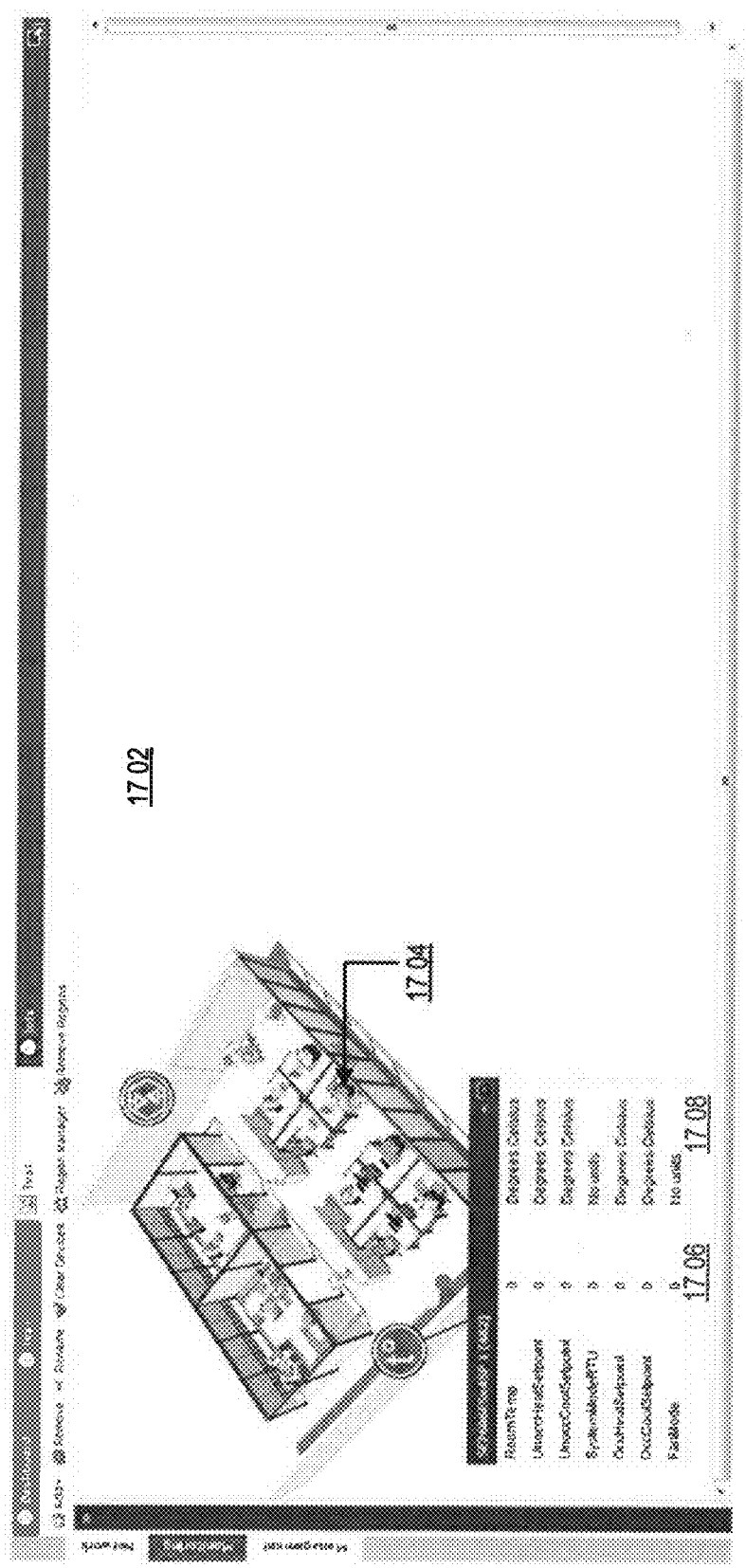
FIG. 17 shows a screenshot diagram illustrating monitoring devices on a map in some embodiments of the CASRM.

In some implementations, referring to FIG. 17, the user may also be able to view her controllers and/or like devices via a map interface 1702 which may mark the user's devices (e.g., via green markers on the map 1704), may provide sensor and/or like data from each device 1706, units for the data provided by each device 1708, and/or the like.

Figure 18:
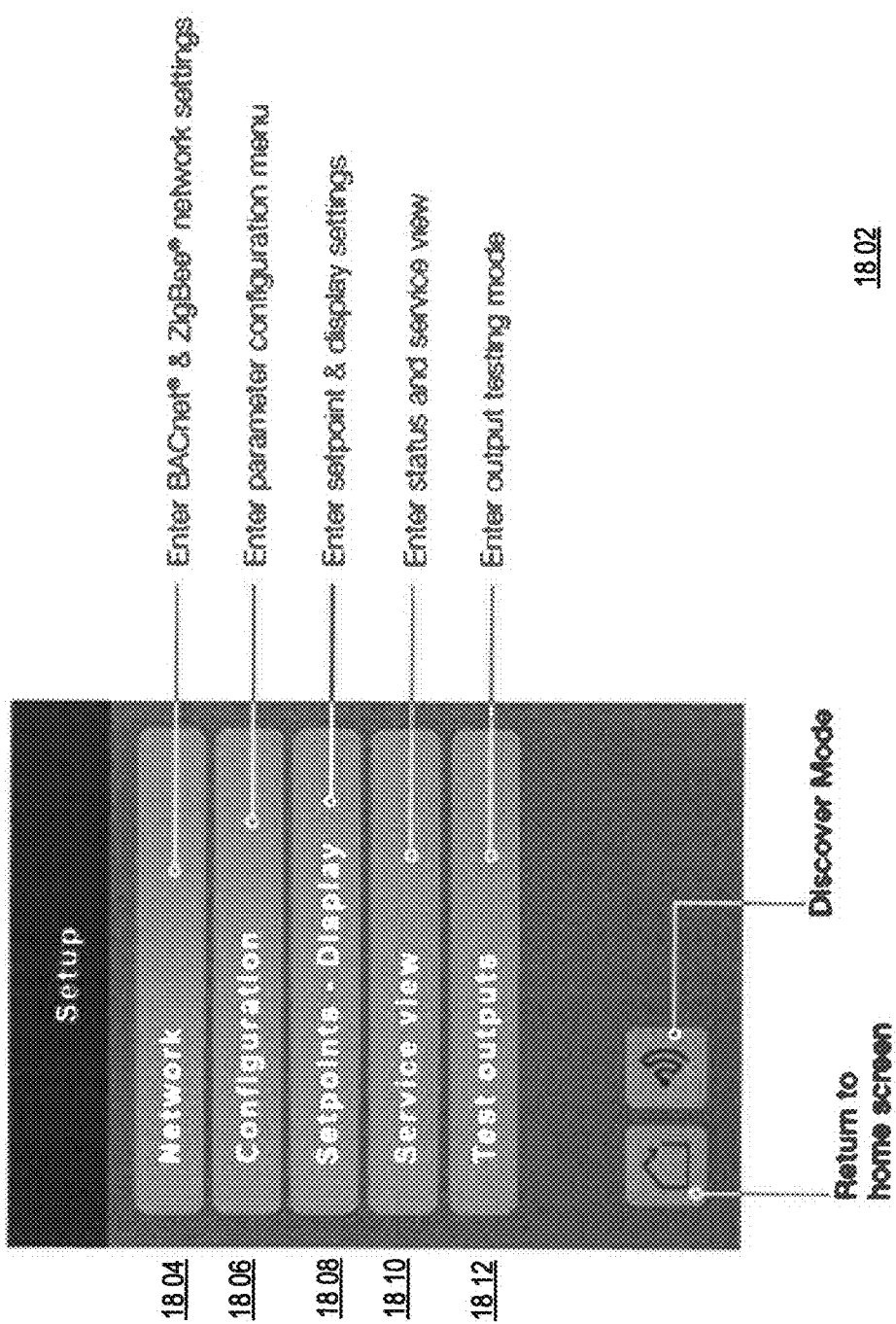
FIG. 18 shows a screenshot diagram illustrating device setup settings for controllers in some embodiments of the CASRM.

Referring to FIG. 18, main controllers may also have device setup settings 1802 that the user may provide upon initial bootup of the main controller, and/or the like. For example, the user may enter and/or view network settings 1804 (e.g., BACnet and/or ZigBee network settings), configuration settings 1806, setpoint and display settings for the main controller 1808, service and status view settings test outputs for the main controller 1810, and/or test outputs for the main controller 1812.

Figure 19A:
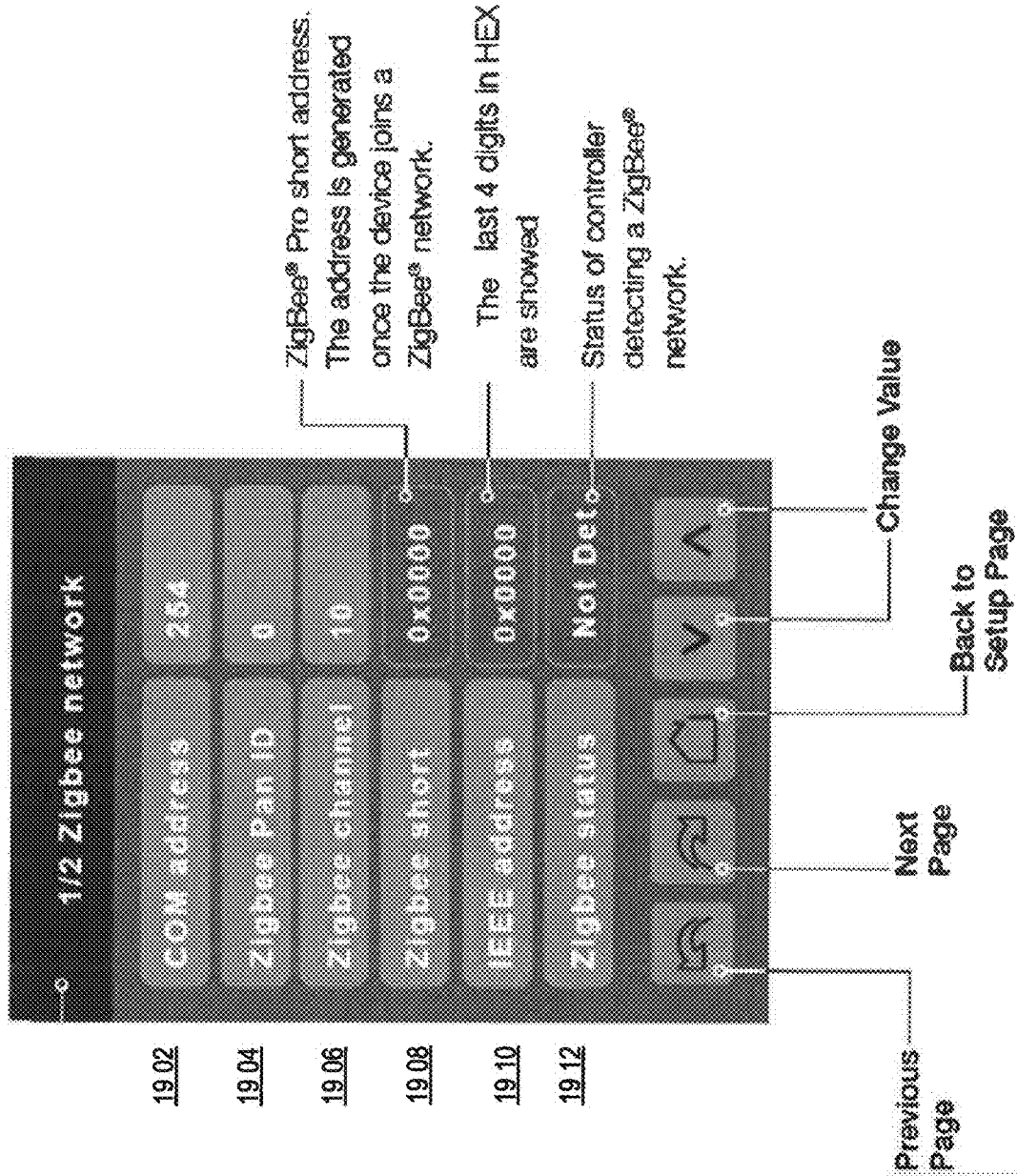
Figure 19B:
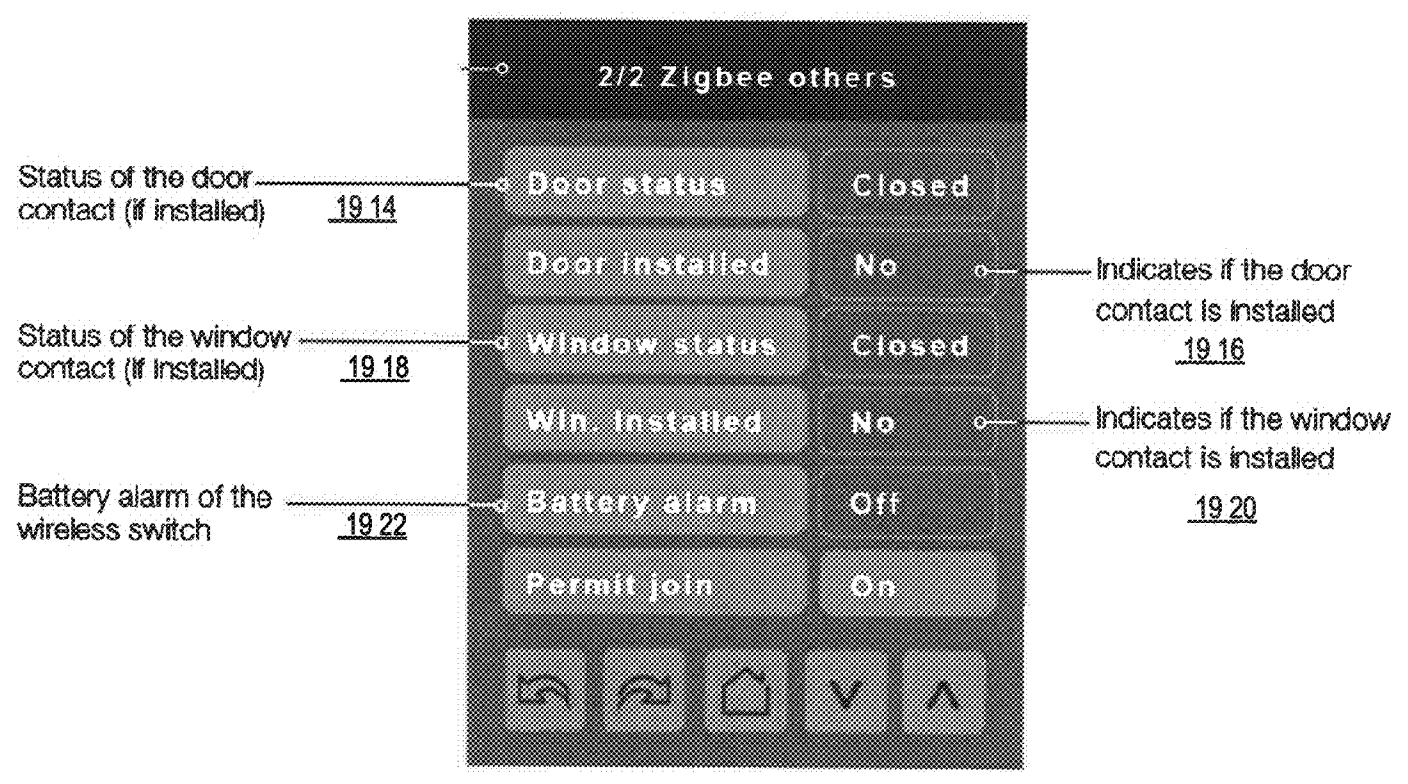

Referring to FIGS. 19A-B, network settings may include a COM address 1902. Network settings may also include Zigbee network information (e.g., Pan ID 1904, channel number 1906, short address 1908, IEEE address 1910, network status 1912, and/or status of possible add-on or devices connected to the main controller, including but not limited to the status of a door contact 2002, whether a door contact is installed 2004, a status of a window contact 2006 and an indicator of whether the window contact is installed 2008, whether there is a battery alarm for a wireless switch on the network 2010, and/or whether the main controller has been permitted to join the network, and/or the like).

Figure 20A:
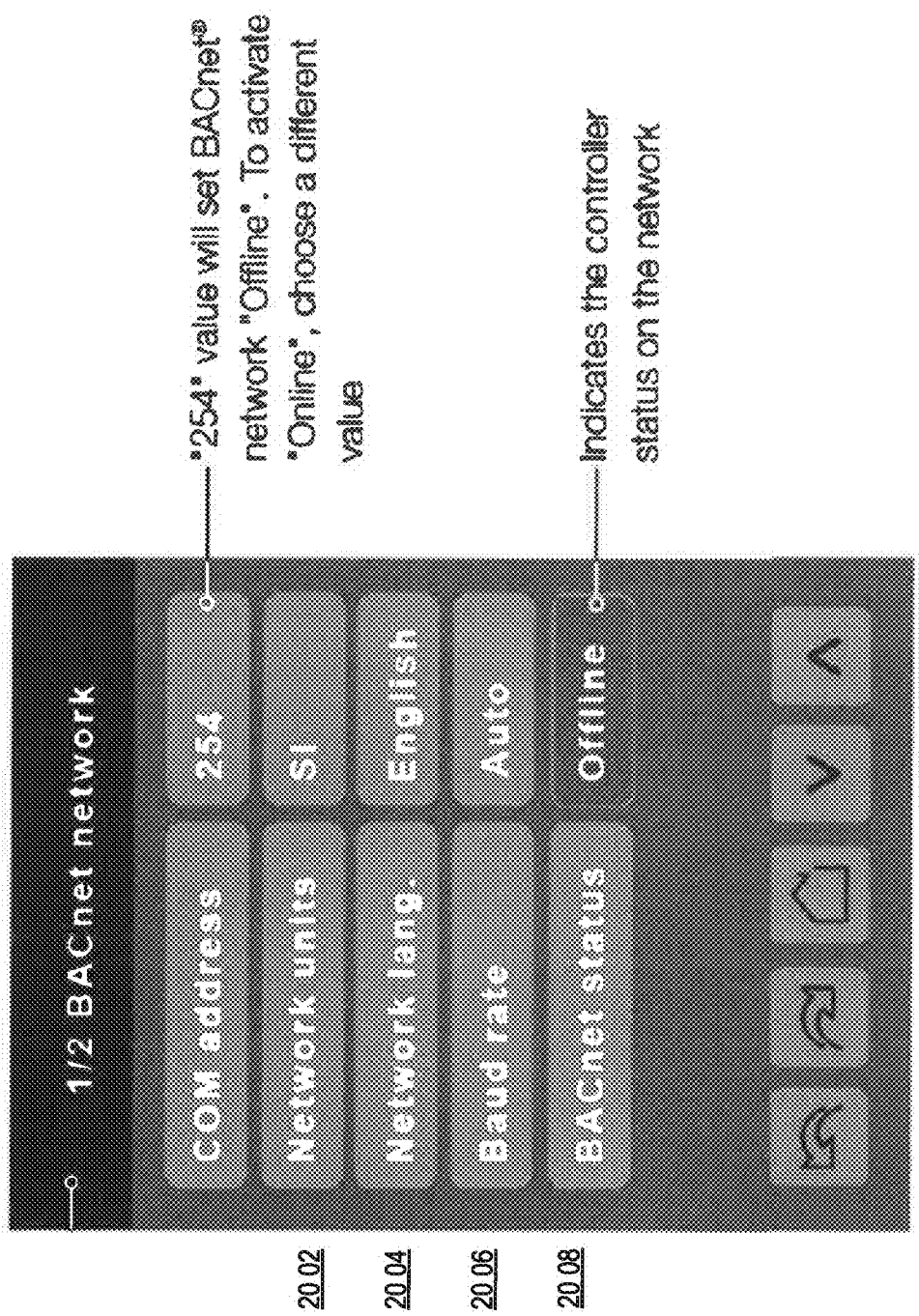
FIGS. 20A-B show screenshot diagrams illustrating BACnet network settings in some embodiments of the CASRM.
Figure 20B:
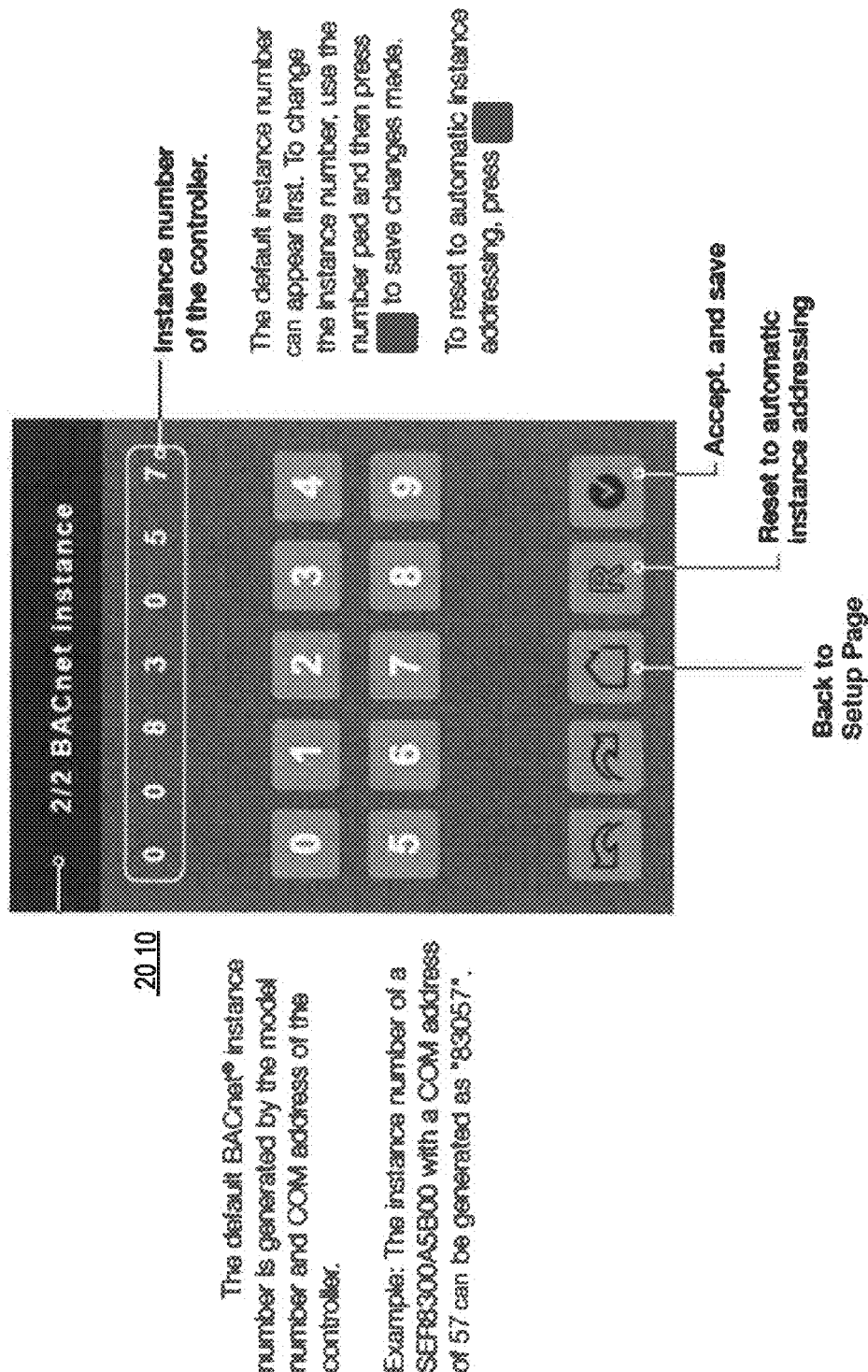

Referring to FIGS. 20A-B, network settings may further include BACnet network settings (e.g., network units 2002, network language 2004, baud rate 2006, a BACnet network status 2008, a BACnet instance number for a controller 2010 (e.g., generated by the main controller's model number and/or the main controller's COM address, and/or the like), and/or like settings). The BACnet and/or Zigbee network settings may be utilized within a physical data link layer between controllers, and/or may be utilized within a virtual representation of the physical data link layer (e.g., see FIGS. 1B-1E for further details).

Configuration settings 1806 can include binary input (131) settings, remote universal input (RUI) activation settings, occupancy commands, an auto mode flag, a fan menu flag, auto fan functionality, continuous fan heat, standby mode settings, a standby differential, a standby time, an unoccupied time, a temporary occupancy time, dehumidifier hysteresis, dehumidifier maximum cooling, dehumidifier lockout settings, cooling Compressor Cycle Rate (CPH), heating CPH, a status of a cooling valve, a status of a heating valve, pulsed heating settings, a pipe number, a sequence operation, a purge sample time period, a purge open time period, a main password for the main controller, a user password for the main controller, a temperature calibration setting, a humidity calibration setting, and/or a reset device settings option.

Setpoint and display settings 1808 may include a setpoint for cooling and/or heating when an area is unoccupied, a cooling and/or heating setpoint for when the main controller is on standby, a cooling and/or heating setpoint when the area is occupied, a default heating and/or cooling setpoint, a minimum deadband setpoint, a maximum heating and/or cooling setpoint, a minimum cooling and/or heating setpoint, a dehumidifier setpoint, a display color, primary information shown on the display, a standby screen enablement setting, a language setting, a units setting, a low light backlight setting, a night backlight setting, an RH display setting, and/or a user HMI setting, and/or like setpoints and/or display settings.

Service view settings 1810 may include a firmware revision number, room temperature, changeover temperature, supply temperature, outdoor temperature, room humidity, effective occupancy, PI heating demand, cooling demand limit, heating demand limit, binary input (BI) settings, remote universal input (RUI) activation settings, window alarm flag, service alarm flag, filter alarm flag, local motion flag, dehumidification status, and/or a device name (e.g., generated using the main controller's MAC address, and/or the like), and/or like service view settings.

Test outputs settings 1812 cooling output, heating output, fan speed outputs, pulsed heat demand output, and/or the like.

Figure 21:
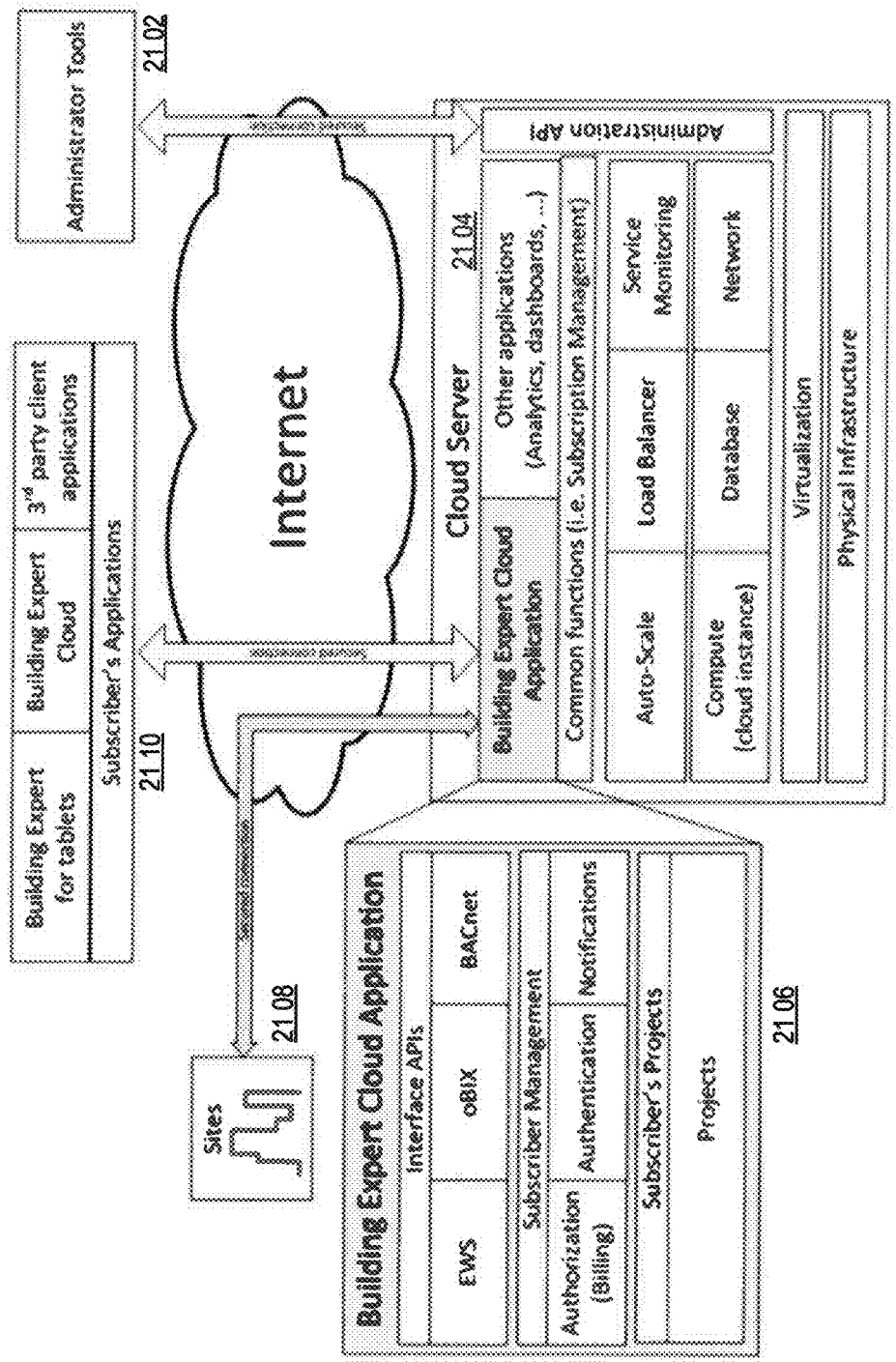
FIG. 21 show screenshot diagrams illustrating a network architecture for a CASRM controller network, in some embodiments of the CASRM.

FIG. 21 illustrates a network architecture for a CASRM controller network, in some embodiments. For example, a user may use administrator tools 2102, e.g., such as a CASRM user interface, and/or the like, in order to send settings and/or instructions to controllers and/or like devices to the CASRM cloud server 2104. The CASRM cloud server can serve as a network controller and manage network connections, network nodes (and addition/removal of network nodes from the network), network node load balancing, and/or like functionality. The CASRM cloud server may also manage and maintain the virtualization of the data link layer on the network, and/or the like. A utility administrator may use a building expert cloud application, e.g., communicating data in a plurality of network protocols (including but not limited to EWS, oBIX, and BACnet-related protocols), in order to manage devices across a plurality of sites 2108 containing a plurality of controllers. The utility administrator may also be able to obtain utility payments and/or the like through the CASRM cloud server, e.g., based on the resource usage collected by controllers within various sites, and/or the like.

The CASRM cloud server may use SSL, which may use date and time to verify that communication end points can be trusted. Htpdate may be use to query trusted https web servers and synchronise the CASRM cloud server's date and time.

Software running on the CASRM cloud server may be managed using opkg package management software. This software package management system may be similar to dpkg and Apt as used on Debian-like Linux distributions. The CASRM cloud server may also run Node.js (e.g., a JavaScript interpreter software platform on which the CASRM cloud server's application software runs), and Controller-app (e.g., a software application encoded, for example in JavaScript and configured to establish s communication channel between a Cloud Panel and the CASRM cloud server). Node.js (npm) modules as well as CSS and JavaScript files to support the CASRM cloud server's web application may also be instantiated on the CASRM cloud server. To guarantee that opkg gets software packages from the right server(s), the software may use HTTP(S) protocol to query a packages repository and download individual packages for opkg. Opkg packages may further be signed using a MD5 hash in order to ensure the integrity of the file.

During the system boot process, an initialization script may be responsible for starting the Controller-app application. Additionally, htpdate may run and fetch the date from the Building Expert Cloud Service, and set the received date as CASRM cloud server's date and time. The controller-app module allows users to access their network of controllers through the CASRM cloud server. Controller-app module may be encoded in CoffeeScript (e.g., compiled to JavaScript) and may run on top of the Node.js platform. The CASRM cloud server application may be composed of at least a client establishing a WebSocket tunnel between a resource management device and a CASRM cloud server, and/or an administration web application allows Cloud Panel owners to perform administration tasks, such as registering the Cloud Panel on the CASRM cloud server. Both modules may start when the application starts and each module can communicate with the other using Node.js events. For example, when a user registers the resource management device on the Cloud Service using the administration interface, an event is emitted and the WebSocket tunnel is established.

The WebSocket tunnel may establish a full-duplex communication channel between the resource management device and the CASRM cloud server. Traffic going through this tunnel may be encrypted using SSL. The CASRM cloud server may forward client applications' requests into this tunnel. On the resource management device's end of the tunnel, these requests may then be forwarded to the right service, e.g., other controller, oBIX or EWS services. Before establishing the tunnel, the controller-app may authenticate the resource management device on the CASRM cloud server. To do so, it may verify the resource management device's ID and/or a key assigned during the provisioning step. If the resource management device cannot be authenticated, the WebSocket tunnel may not be established and users may not be able to access the resource management device and/or internal services that sit behind it.

Monitoring of the CASRM cloud server may be handled by a controller-app-bootstrapper service, which may perform the following tasks:

- If the Controller-app module is not running, controller-app-bootstrapper may be initiated. If it fails to start more than a pre-determined number of times (e.g., 10 times), the CASRM cloud server may reboot.
- A watchdog file may be written to periodically ensure that if the monitoring process stops working, the CASRM cloud server may reboot.

The controller-app-bootstrapper service may also periodically determine if a updates to software packages on the CASRM cloud server are available. If so, packages may be upgraded.

The controller-app's administration web application may be used to register a resource management device to the CASRM cloud server. It may include a form that asks a resource management device owner to enter her username and password, as well as the resource management device's key issued by the Building Expert Administrator. If all information is correct, the resource management device may be registered to the user, and the user can start to access its data from all client applications such as RoomXpert-II for mobile applications, and Building Expert for web applications.

The CASRM cloud server may use a plurality of security standards and/or techniques in order to protect user data, and/or the like. For example, TSL/SSL may be used to authenticate connections made from the resource management device to any external service, and/or any confidential data transferred to/from the CASRM cloud server. PGP may be used to v validate the authenticity of an upgrade package, MD5 may be used to validate the integrity of the upgrade package, and HTTP(S) may be used to control privacy and user access. Communication may be done over HTTP(S) or a Secure Web Socket. In some implementations, NGINX may be a front-end exposed for a HTTP(S) and/or Secure Web Socket connection. IAM may be used to manage access and management of AWS. VPC, Bastion and Nat gateway may isolate resources into a private Cloud with private subnet, as well as protect access points with security rules and whitelisting. IPtable may block all ingoing connections to the Cloud Panel. CA and X509 certificates may validate the validity of the domain. Other such security measures may also be implemented on the CASRM cloud server, such as using a dedicated stack containing all specific customer information, an IP white list to restrict access to specific corporate networks, and/or special setting for deploying Cloud Panel within a Demilitarized Zone (DMZ).

Utility administrators and/or other users may also connect to the CASRM cloud server via subscriber applications 2110 which may not be directly hosted on the CASRM cloud server, e.g., via a plurality of applications on a plurality of platforms (e.g., tablet applications, third-party client applications, a cloud application other than the building expert cloud application, and/or the like). FIGS. 22-28 show logic flow diagrams illustrating a plurality of user account actions.

In some implementations, user profiles and controller properties may be stored in a database, e.g., in a MongoDB database, and/or the like. A MongoDB database may be utilized in order to facilitate better fault recovery in the event of an unexpected Redis service downtime, and/or the like. In some implementations, a user may be authenticated by the system using a plurality of authentication strategies, including local authentication (e.g., form-based authentication with secured cookie support for session tracking, used by the web application, and/or the like), basic authentication (e.g., HTTP(S) headers and/or like mechanisms for transmitting user credentials, and/or the like), and/or key authentication (e.g., using a hash function and/or authentication key to encode a user's credentials, e.g., using Passport, and/or the like). In some implementations, example rest resources URIs may include the following:

GET '/' (e.g., redirects to requested page if user is logged in; if not, redirects to welcome/login page);

GET '/controllers/password' (e.g., returns a randomized key string);

POST '/controllers' (e.g., saves new controller in persistent data storage; if a v controller with the same name exists, an error flash message shows);

PUT '/controllers/:name/update_key' (e.g., updates controller key in persistent data storage; if controller cannot be found, user is prompted to create it);

PUT '/controllers/id' (e.g., updates controller in persistent data storage identified by: id only if it is owned by user);

GET '/controllers/id' (e.g., retrieves controller in persistent data storage identified by: id);

POST '/controllers/id/register (e.g., sets ownership of controller to user registering controller; the registering of the controller is performed from controller-app web interface);

GET '/obix/controllers' (e.g., lists connected controllers in Obix format);

POST '/sessions/users' (e.g., user authentication from login page);

POST '/sessions/users/api_token' (e.g., user authentication from a token);

GET '/sessions/controllers (e.g., generates a token for a given controller);

DEL '/sessions/users' (e.g., terminates user web session);

POST '/users' (e.g., saves new user in persistent data storage);

POST '/users/lost-password' (e.g., sends password reset link by email to user);

POST '/users/:username/reset-password' (e.g., updates users password in persistent data storage if provided validation token matches the one set in the storage at a previous step ('/users/lost-password'));

GET '/users/id (e.g., retrieves user object identified by :id);

GET '/users' (e.g., retrieves user objects).

Figure 22:
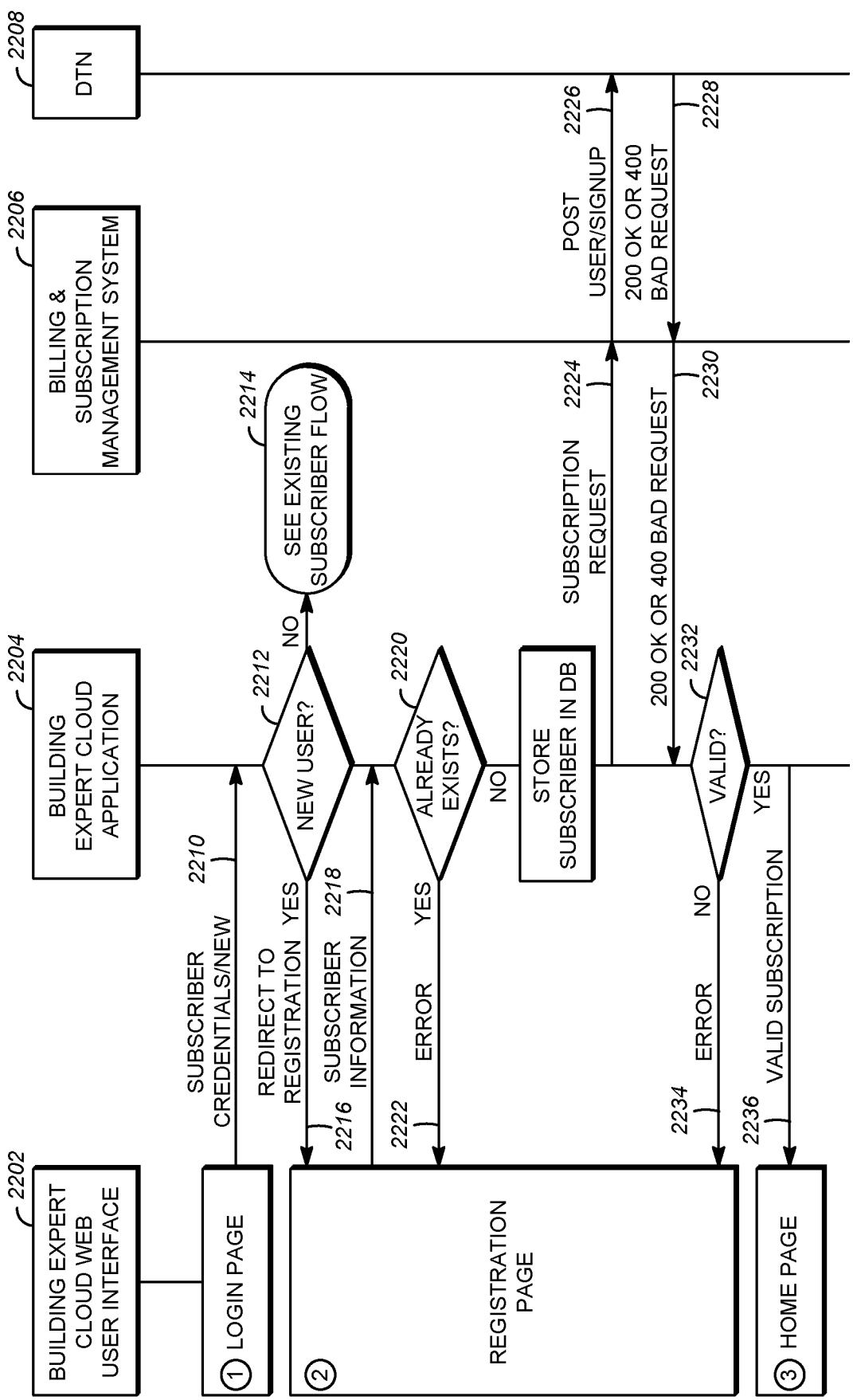
FIG. 22 shows a logic flow diagram illustrating a new subscriber sign-up, in some embodiments of the CASRM.

FIG. 22 shows a logic flow diagram illustrating a new subscriber sign-up, in some embodiments. For example, via a login page at a building expert cloud web user interface 2202, a building expert cloud application 2204 may receive subscriber credentials and/or user registration information 2210 inputted into the login page by a user. If the data received at the building expert cloud application indicates that the user is an existing user, the system may proceed to verify the user's credentials 2214 (e.g., see at least FIG. 23). If the data received at the building expert cloud application indicates that the user is a new user 2212, the building expert cloud application may redirect the user to a registration page, at which the user may submit subscriber registration information 2218 to the building expert cloud application.

The building expert cloud application may check 2220 to determine whether the subscriber registration information already exists in the CASRM database. If the information does match that of at least one user record in the CASRM database, the building expert cloud application may send an error 2222 to the registration page indicating a user account matching at least some of the provided information was located, and/or may suggest that the user try to log in using the submitted user account information. If the credentials do not yet exist, the building expert cloud application may store the credentials in the CASRM database, and may then send the subscription data to a billing and subscription management module 2206, which may forward 2226 the subscription to a Customer Management Center service 2208 for further processing. The DTN may send a notification to the billing and subscription management module 2228 indicating whether the processing of the account was successful or not. The billing and subscription management module may subsequently forward 2230 the notification to the building expert cloud application.

If the user's registration data was successfully processed and an account was successfully created 2232, the building expert cloud application may send a confirmation to the user 2236 indicating that the registration was successful, and may redirect the user to the home page of the building expert cloud web user interface. If there were any problems with processing the user's registration data and/or creating an account, the building expert cloud application may send a notification to the user 2234 indicating that the system could not create an account for the user, and/or may prompt the user to retry his registration data submission.

Figure 23:
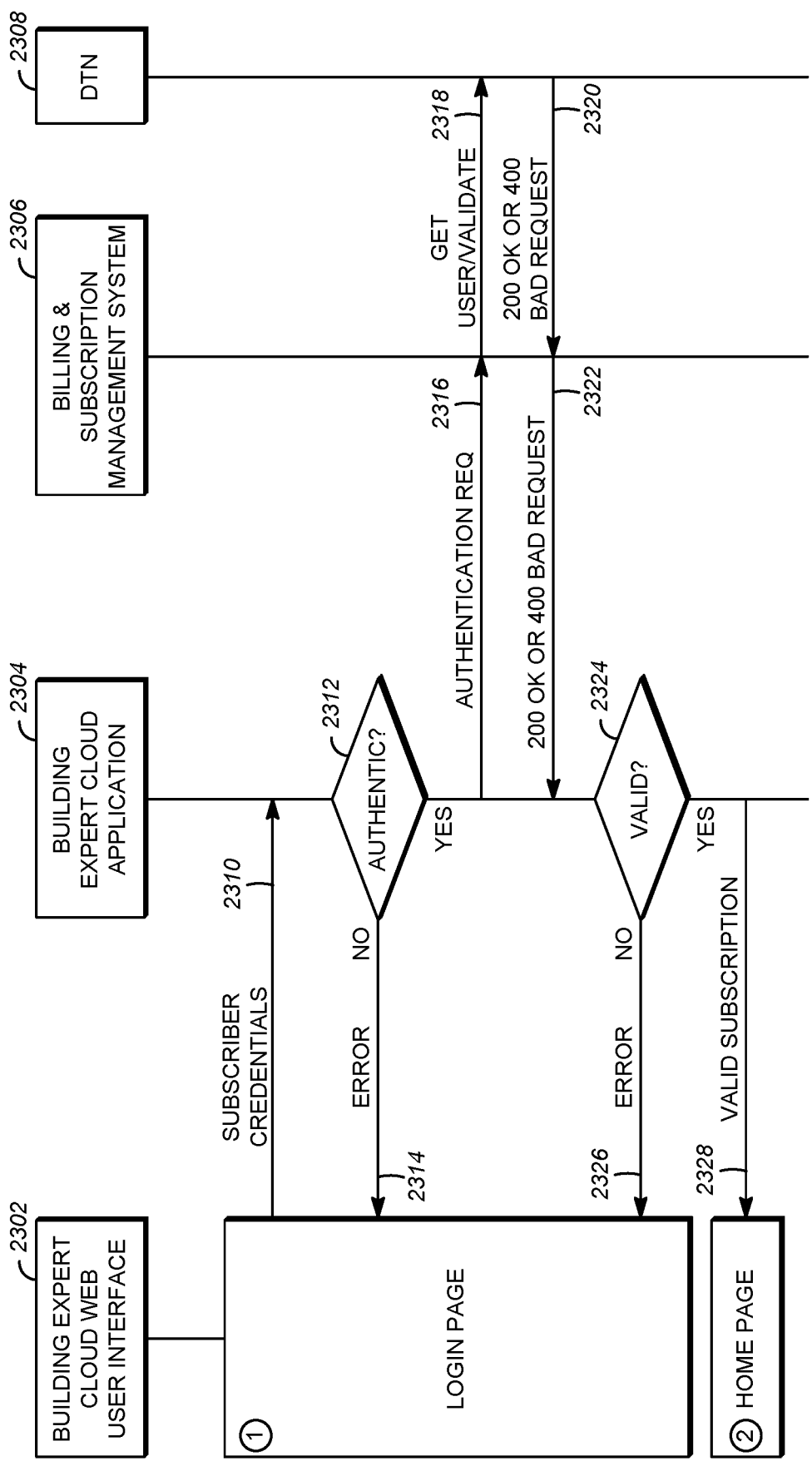
FIG. 23 shows a logic flow diagram illustrating logging into a subscriber account, in some embodiments of the CASRM.

FIG. 23 shows a logic flow diagram illustrating logging into a subscriber account, in some embodiments. For example, a user may provide subscriber credentials 2310 to a login page in a building expert cloud web user interface 2302, which may provide the credentials to a building expert cloud application 2304. The building expert cloud application may attempt to authenticate 2312 the credentials (e.g., determine whether the credentials follow usual credential requirements, and may provide an error message 2314 to the login page if the credentials were invalid. If the credentials were valid, the building expert cloud application may send a message 2316 to a billing and subscription management module 2306 for processing and/or retrieval of account data. The billing and subscription management module may, for example, provide the user identification information to a DTN 2308 via a GET request for the user account data 2318. The DTN may return the user's account data 2320, and/or an error message. The billing and subscription management module may forward this data 2322 to the building expert cloud application, which may determine whether the data indicates that the account credentials were valid or invalid 2324 (e.g., the account credentials are valid if an account in the DTN matched the credentials, and/or the like). If the credentials were valid 2328, the user may be directed to a building expert cloud web user interface home page. If the credentials were invalid, an error 2326 may be forwarded to the user indicating that an account matching the credentials could not be found.

Figure 24:
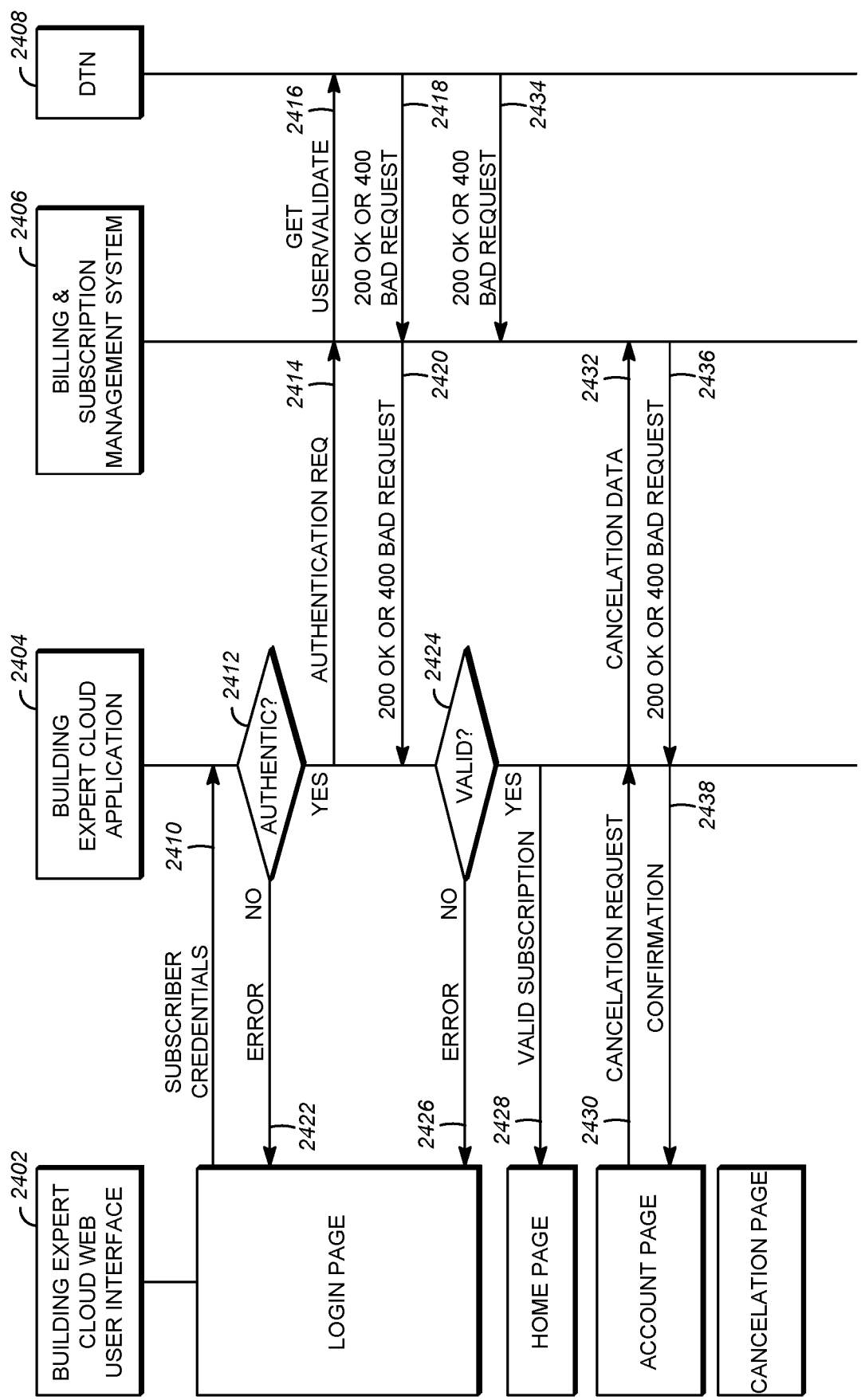
FIG. 24 shows a logic flow diagram illustrating logging into a subscriber account, in some embodiments of the CASRM.

FIG. 24 shows a logic flow diagram illustrating logging into a subscriber account, in some embodiments. In some implementations, a user may log into her user account, e.g., via a process 2410-2428 similar to that in FIG. 23. The user, via an account page on the building expert cloud web user interface home page 2402, may initiate an account cancellation request 2430. The building expert cloud application 2404 may receive the cancellation data and may forward 2432 it to the billing and subscription management module 2406. The billing and subscription management module may interact with the DTN 2408 in order to have the account cancelled (e.g., marked inactive, deleted, and/or the like). The DTN may send a confirmation message 2434 to the billing and subscription management module once it has attempted to process the account cancellation. The billing and subscription management module may forward the confirmation 2436 to the building expert cloud application, which may in turn forward the confirmation 2438 to the building expert cloud web user interface account page, e.g., such that the user may be informed that the cancellation has successfully or unsuccessfully be processed, and/or the like.

Figure 25:
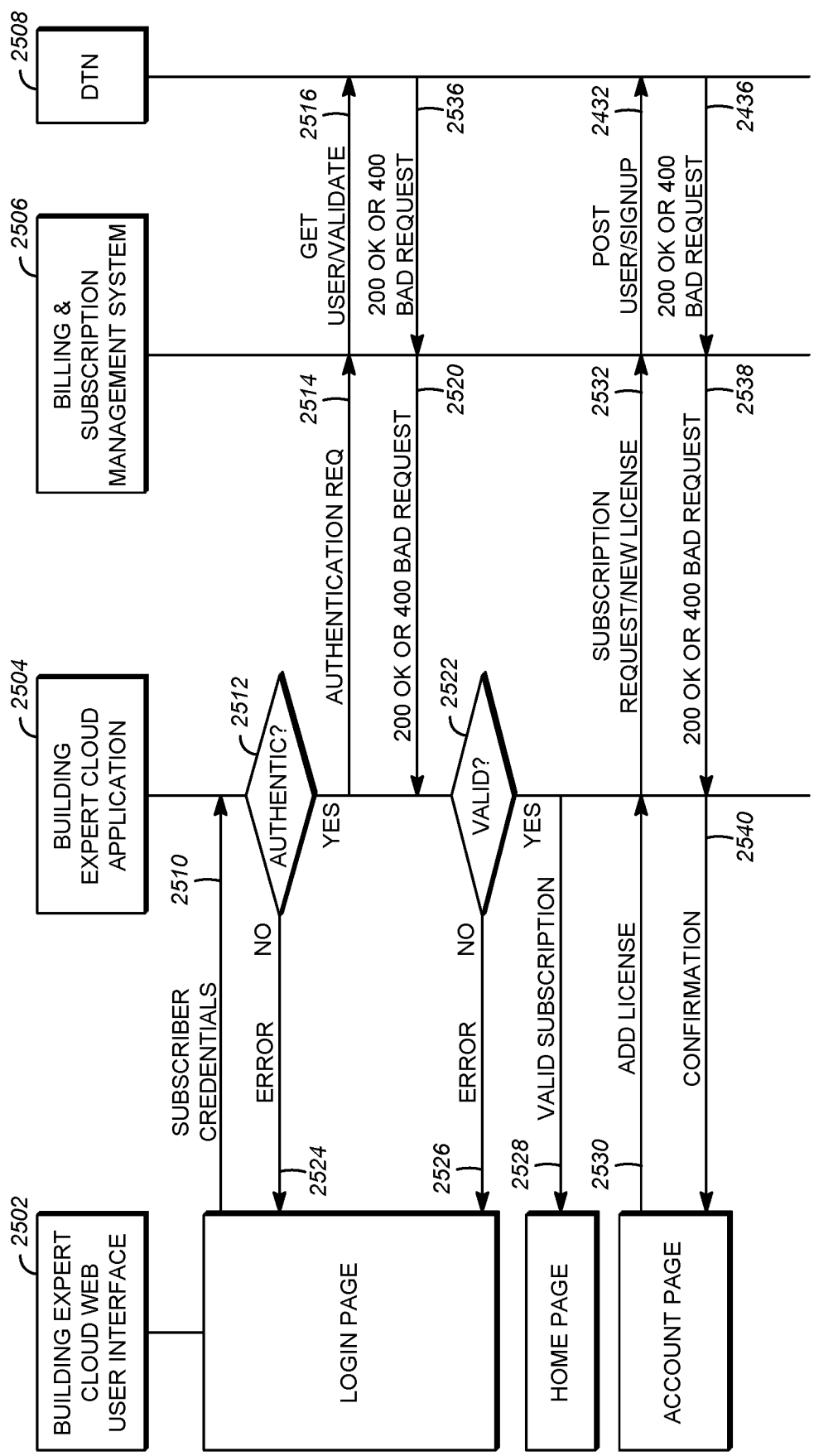
FIG. 25 shows a logic flow diagram illustrating adding a license to an account, in some embodiments of the CASRM.

FIG. 25 shows a logic flow diagram illustrating adding a license to an account, in some embodiments. In some implementations, a user may log into her user account, e.g., via a process 2510-2528 similar to that in FIG. 23. A user may indicate to the building expert cloud web user interface 2502 account page that she would like to purchase a service license, at which point the building expert cloud web user interface may forward the user's data 2530 (e.g., credentials, selection for the license, and/or the like) to the building expert cloud application 2504. The building expert cloud application may forward 2532 the data to the billing and subscription management module 2506, which may in turn forward 2534 the data to the DTN 2508. The DTN may process the request to purchase the license, and may generate and send a confirmation message 2536 to the billing and subscription management module. The billing and subscription management module may forward the confirmation message 2538 to the building expert cloud application, which may in turn forward the confirmation 2540 to the building expert cloud web user interface for display to the user.

Figure 26:
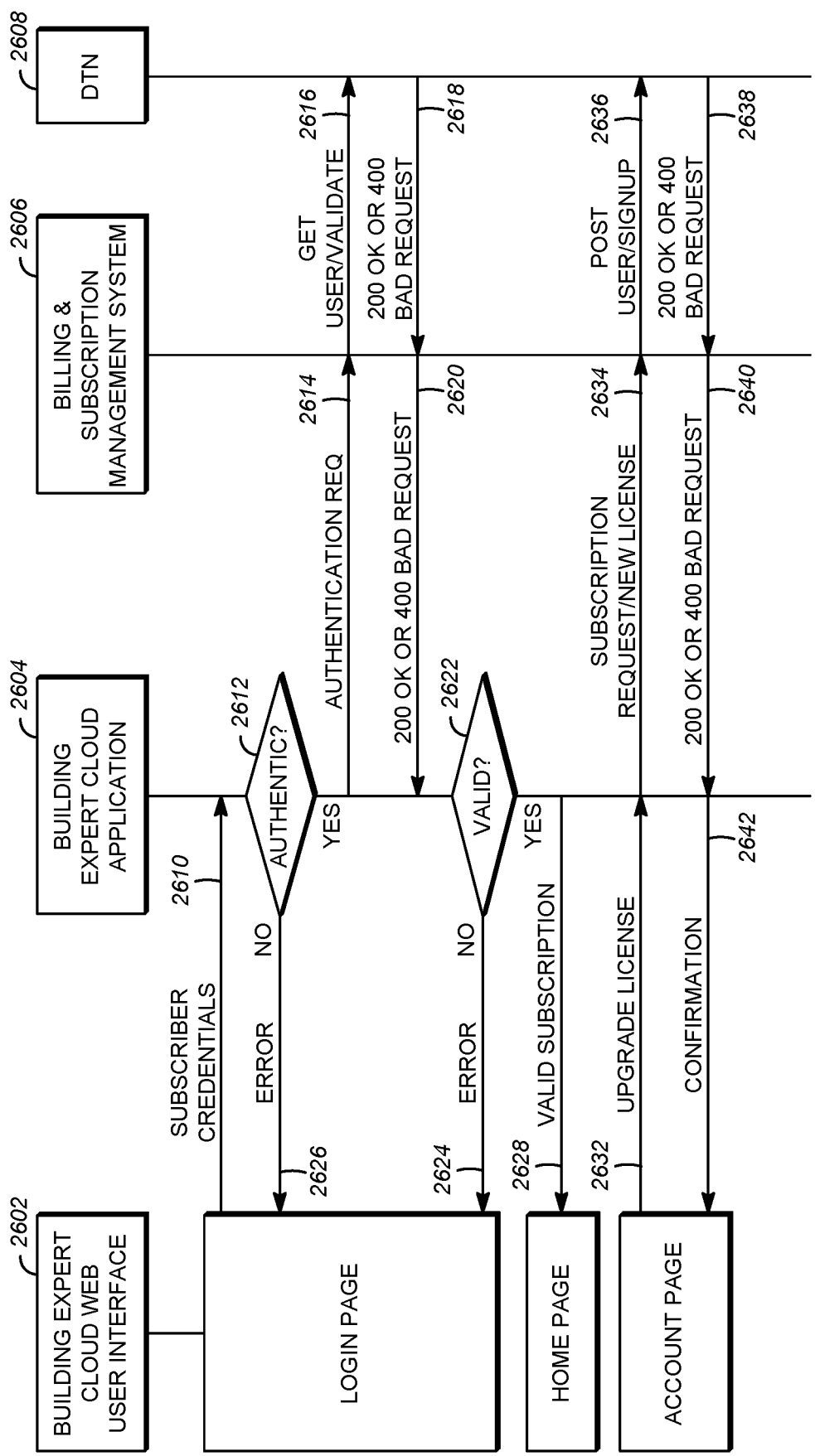
FIG. 26 shows a logic flow diagram illustrating upgrading a license for an account, in some embodiments of the CASRM.

FIG. 26 shows a logic flow diagram illustrating upgrading a license for an account, in some embodiments. In some implementations, a user may log into her user account, e.g., via a process 2610-2628 similar to that in FIG. 23. A user may indicate to the building expert cloud web user interface 2602 account page that she would like to upgrade a service license, at which point the building expert cloud web user interface may forward the user's data 2632 (e.g., credentials, selection for the upgraded license, and/or the like) to the building expert cloud application 2604. The building expert cloud application may forward 2534 the data to the billing and subscription management module 2606, which may in turn forward 2536 the data to the DTN 2608. The DTN may process the request to upgrade the license, and may generate and send a confirmation message 2538 to the billing and subscription management module. The billing and subscription management module may forward the confirmation message 2540 to the building expert cloud application, which may in turn forward the confirmation 2542 to the building expert cloud web user interface for display to the user.

Figure 27:
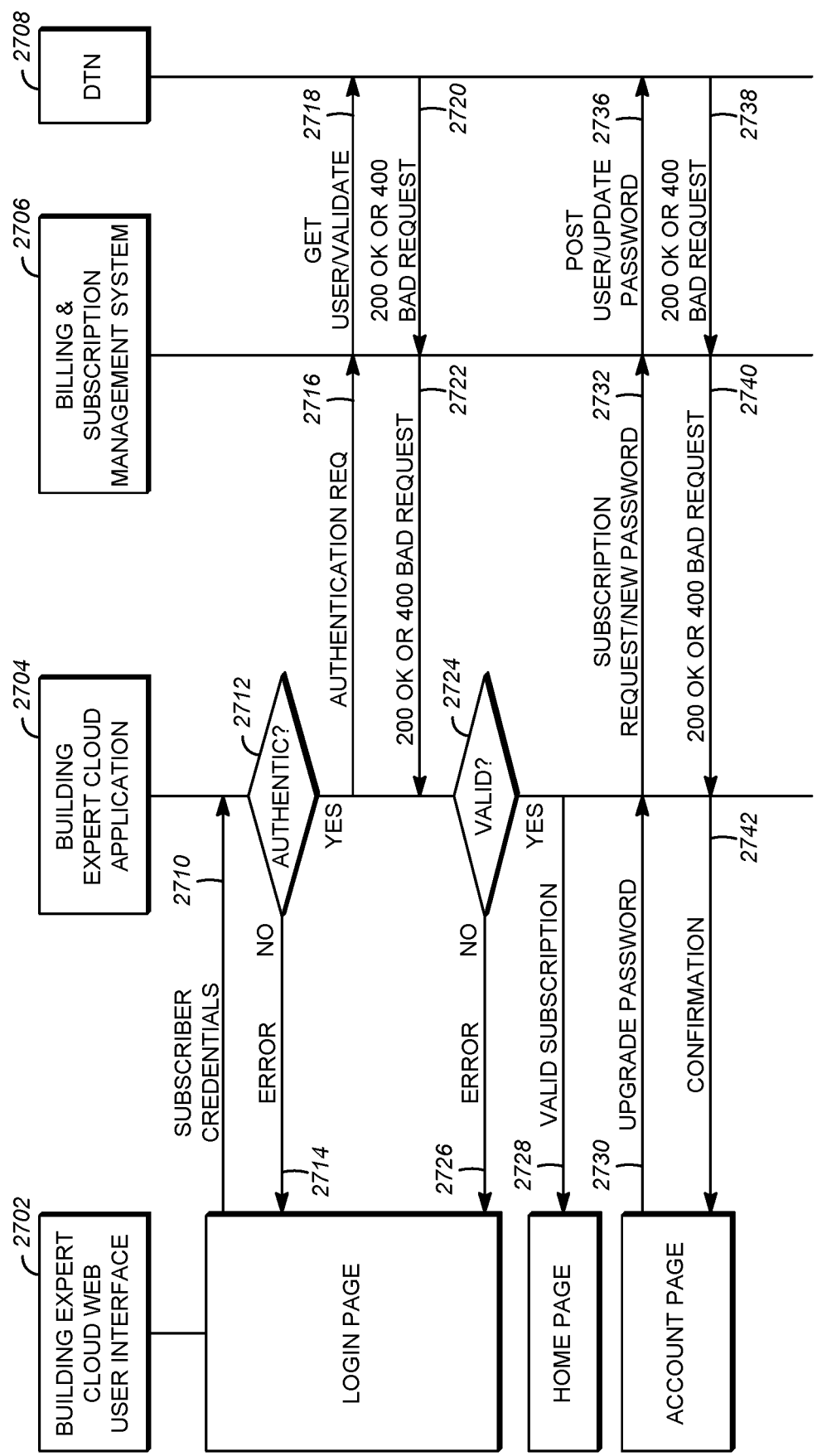
FIG. 27 shows a logic flow diagram illustrating changing a password for an account, in some embodiments of the CASRM.

FIG. 27 shows a logic flow diagram illustrating changing a password for an account, in some embodiments. In some implementations, a user may log into her user account, e.g., via a process 2710-2728 similar to that in FIG. 23. A user may indicate to the building expert cloud web user interface 2702 account page that she would like to change her password, at which point the building expert cloud web user interface may forward the user's data 2730 (e.g., credentials, new password, and/or the like) to the building expert cloud application 2704. The building expert cloud application may forward 2732 the data to the billing and subscription management module 2706, which may in turn forward 2736 the data to the DTN 2708. The DTN may process the request to upgrade the user's password, and may generate and send a confirmation message 2738 to the billing and subscription management module. The billing and subscription management module may forward the confirmation message 2740 to the building expert cloud application, which may in turn forward the confirmation 2742 to the building expert cloud web user interface for display to the user.

Figure 28:
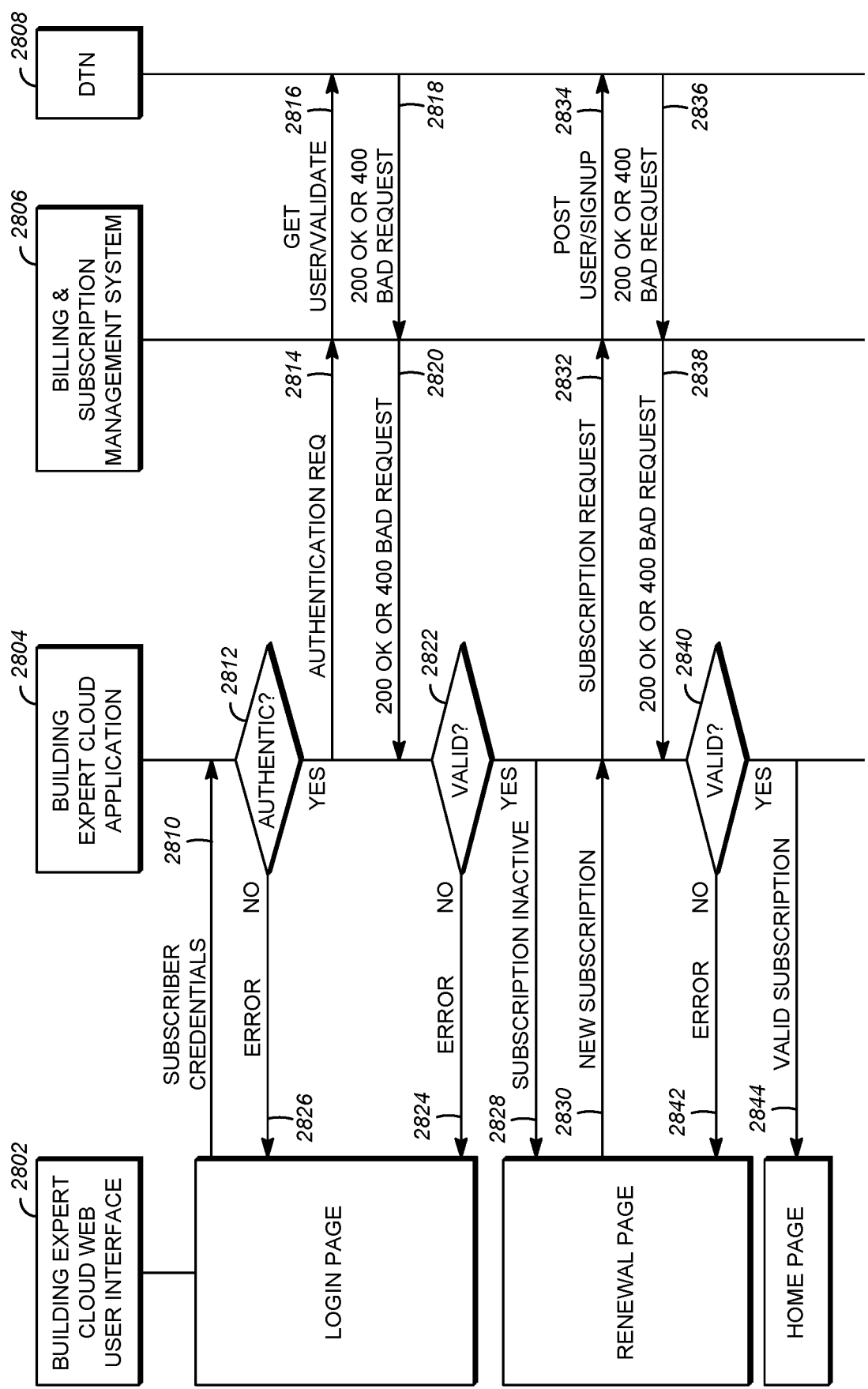
FIG. 28 shows a logic flow diagram illustrating manually renewing an account, in some embodiments of the CASRM.

FIG. 28 shows a logic flow diagram illustrating manually renewing an account, in some embodiments. In some implementations, a user may log into her user account, e.g., via a process 2810-2826 similar to that in FIG. 23. The building expert cloud application may, while validating the user's account, determine that the account and/or user's subscription is invalid 2828. A user may be prompted by the building expert cloud web user interface 2802 renewal page that she should renew her subscription. If the user does renew her subscription, the building expert cloud web user interface may forward the user's data 2830 (e.g., credentials, renewal account information, payment information, and/or the like)

to the building expert cloud application 2804. The building expert cloud application may forward 2832 the data to the billing and subscription management module 2806, which may in turn forward 2834 the data to the DTN 2808. The DTN may process the request to renew the user's account (e.g., by processing the payment and/or renewal data, and/or the like), and may generate and send a confirmation message 2836 to the billing and subscription management module. The billing and subscription management module may forward the confirmation message 2838 to the building expert cloud application. The building expert cloud application may then determine 2840 whether or not the subscription was successfully renewed. If the subscription has been successfully renewed, the building expert cloud application may send a confirmation 2844 to the building expert cloud web user interface indicating that the subscription is now valid and/or active again. If the subscription renewal was unsuccessful, the building expert cloud application may send an error message 2832 to the building expert cloud web user interface indicating that the user may retry renewing the subscription.

Figure 29:
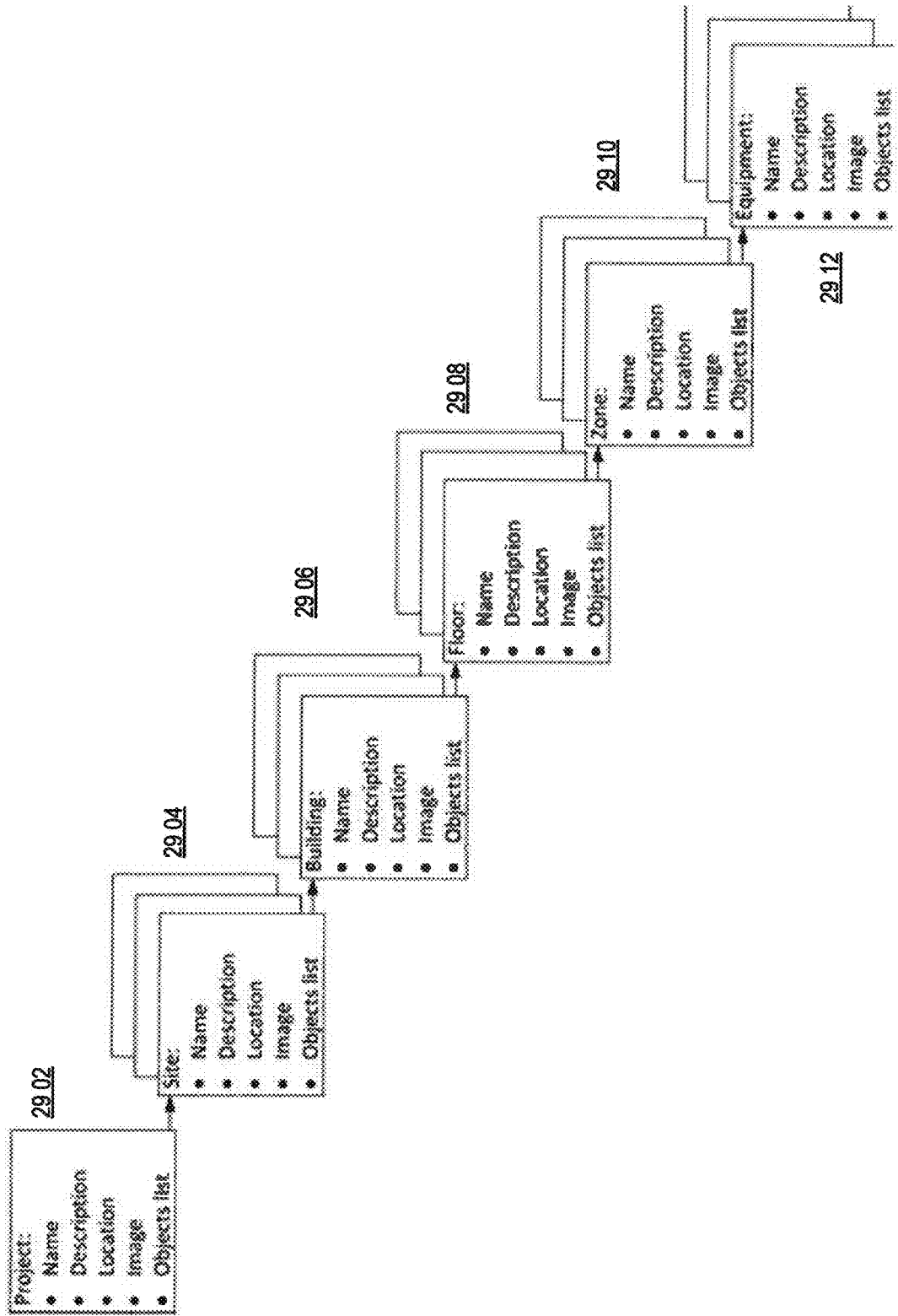
FIG. 29 illustrates a diagram of an object hierarchy in a CASRM controller, in some embodiments of the CASRM.

FIG. 29 illustrates a diagram of an object hierarchy in a CASRM controller, in some embodiments. For example, a project object 2902 may include attributes including but not limited to a project name, project description, project location, project image, and/or a project objects list. A project object may represent a project for a particular utility administrator, and/or the like. The project objects list may include at least one site object 2904. A site object may include attributes including but not limited to a site name, a site description, a site location, a site image, and/or a site objects list. A site object may represent a geographic location at which the administrator may monitor a plurality of resource management devices and/or like equipment. The site objects list, in turn, may include at least one building object 2906. A building object may include attributes such as a building name, a building description, a building location, a building image, and/or a building objects list.

A building object may represent a building, e.g., a home, commercial building, hotel, and/or the like which may contain a plurality of resource management devices and/or like equipment. The building objects list may include at least one floor object 2908, which may represent floors within the building. A floor object may include a floor name, floor description, a floor location, a floor image, and a floor objects list. The floor objects list may include at least one zone object 2910. A zone object may represent a zone within a floor (e.g., a room, a collection of rooms, and/or the like) which may be related to the project. The zone object may include a zone name, zone description, a zone location, a zone image, and a zone objects list. The zone objects list may include at least one equipment object 2912, which may represent a resource management device, a utility device, and/or another device which may be used within a zone. An equipment object may include a equipment name, equipment description, a equipment location, a equipment image, and a equipment objects list.

In some implementations, a project may have at least one site, which may contain at least one of a building, a floor, a zone, or equipment (e.g., a project need not comprise each of a building, floor, zone, and equipment).

CASRM Controller

Figure 30:
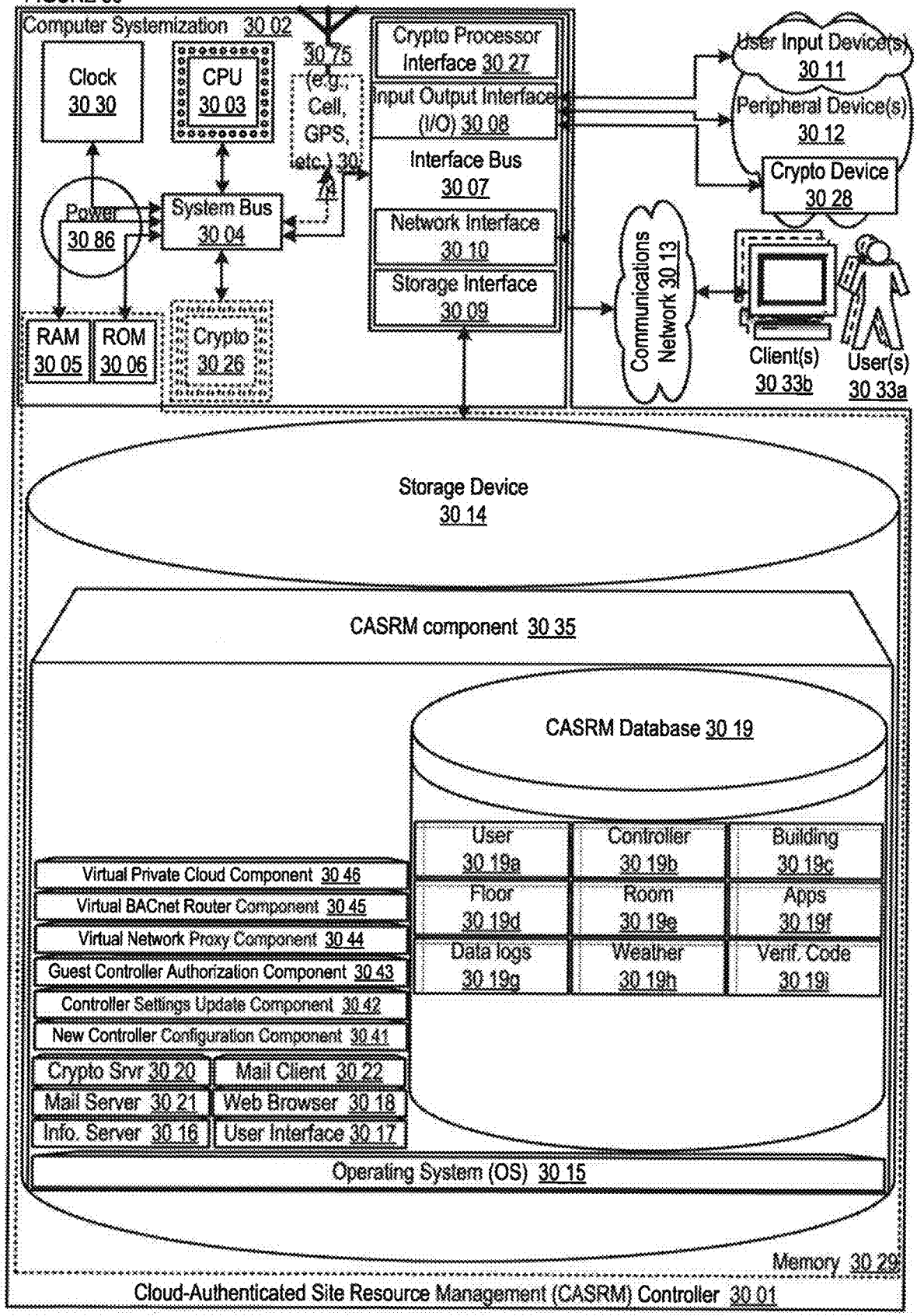
FIG. 30 shows a block diagram illustrating embodiments of a CASRM controller; and The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

FIG. 30 shows a block diagram illustrating embodiments of a CASRM controller. In this embodiment, the CASRM controller 3001 may serve to aggregate, process, store, search, serve, identify, instruct, generate, match, and/or facilitate interactions with a computer through NFC and virtual wallet technologies, and/or other related data.

Typically, users, which may be people and/or other systems, may engage information technology systems (e.g., computers) to facilitate information processing. In turn, computers employ processors to process information; such processors 3003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CASRM controller 3001 may be connected to and/or communicate with entities such as, but not limited to: one or more users from user input devices 3011; peripheral devices 3012; an optional cryptographic processor device 3028; and/or a communications network 3013.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The CASRM controller 3001 may be based on computer systems that may comprise, but are not limited to, components such as: a computer systemization 3002 connected to memory 3029.

Computer Systemization

A computer systemization 3002 may comprise a clock 3030, central processing unit ("CPU(s)" and/or "processor(s)" (these terms are used interchangeable throughout the disclosure unless noted to the contrary)) 3003, a memory 3029 (e.g., a read only memory (ROM) 3006, a random access memory (RAM) 3005, etc.), and/or an interface bus 3007, and most frequently, although not necessarily, are all interconnected and/or communicating through a system bus 3004 on one or more (mother)board(s) 3002 having conductive and/or otherwise transportive circuit pathways through which instructions (e.g., binary encoded signals) may travel to effectuate communications, operations, storage, etc. The computer systemization may be connected to a power source 3086; e.g., optionally the power source may be internal. Optionally, a cryptographic processor 3026 and/or transceivers (e.g., ICs) 3074 may be connected to the system bus. In another embodiment, the cryptographic processor and/or transceivers may be connected as either internal and/or external peripheral devices 3012 via the interface bus I/O. In turn, the transceivers may be connected to antenna(s) 3075, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing CASRM controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 3029 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the CASRM controller and beyond through various interfaces. Should processing requirements dictate a greater amount speed and/or capacity, distributed processors (e.g., Distributed CASRM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the CASRM may be achieved by implementing a microcontroller such as CAST's R8051XC2 microcontroller; Intel's MCS 51 (i.e., 8051 microcontroller); and/or the like. Also, to implement certain features of the CASRM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CASRM component collection (distributed or otherwise) and/or features may be implemented via the microprocessor and/or via embedded components; e.g., via ASIC, coprocessor, DSP, FPGA, and/or the like. Alternately, some implementations of the CASRM may be implemented with embedded components that are configured and used to achieve a variety of features or signal processing.

Depending on the particular implementation, the embedded components may include software solutions, hardware solutions, and/or some combination of both hardware/software solutions. For example, CASRM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the CASRM features. A hierarchy of programmable interconnects allow logic blocks to be interconnected as needed by the CASRM system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the CASRM may be developed on regular FPGAs and then migrated into a fixed version that more resembles ASIC implementations. Alternate or coordinating implementations may migrate CASRM controller features to a final ASIC instead of or in addition to FPGAs. Depending on the implementation all of the aforementioned embedded components and microprocessors may be considered the "CPU" and/or "processor" for the CASRM.

Power Source

The power source 3086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3086 is connected to at least one of the interconnected subsequent components of the CASRM thereby providing an electric current to all subsequent components. In one example, the power source 3086 is connected to the system bus component 3004. In an alternative embodiment, an outside power source 3086 is provided through a connection across the I/O 3008 interface. For example, a USB and/or IEEE 1394 connection carries both data and power across the connection and is therefore a suitable source of power.

Interface Adapters

Interface bus(ses) 3007 may accept, connect, and/or communicate to a number of interface adapters, conventionally although not necessarily in the form of adapter cards, such as but not limited to: input output interfaces (I/O) 3008, storage interfaces 3009, network interfaces 3010, and/or the like. Optionally, cryptographic processor interfaces 3027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3009 may accept, communicate, and/or connect to a number of storage devices such as, but not limited to: storage devices 3014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3010 may accept, communicate, and/or connect to a communications network 3013. Through a communications network 3013, the CASRM controller is accessible through remote clients 3033*b* (e.g., computers with web browsers) by users 3033*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed CASRM), architectures may similarly be employed to pool, load balance, and/or otherwise increase the communicative bandwidth required by the CASRM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of au input output interface. Further, multiple network interfaces 3010 may be used to engage with various communications network types 3013. For example, multiple network interfaces may be employed to allow for the communication over broadcast, multicast, and/or unicast networks.

Input Output interfaces (I/O) 3008 may accept, communicate, and/or connect to user input devices 3011, peripheral devices 3012, cryptographic processor devices 3028, and/or the like. I/O may employ connection protocols such as, but not limited to: audio: analog, digital, monaural, RCA, stereo, and/or the like; data: Apple Desktop Bus (ADB), IEEE 1394a4b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 3011 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 3012 may be connected and/or communicate to I/O and/or other facilities of the like such as network interfaces, storage interfaces, directly to the interface bus, system bus, the CPU, and/or the like. Peripheral devices may be external, internal and/or part of the CASRM controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the CASRM controller may be embodied as an embedded, dedicated, and/or monitor-less (i.e., headless) device, wherein access would be provided over a network interface connection.

Cryptographic units such as, but not limited to, microcontrollers, processors 3026, interfaces 3027, and/or devices 3028 may be attached, and/or communicate with the CASRM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 3029. However, memory is a fungible technology and resource, thus, any number of memory embodiments may be employed in lieu of or in concert with one another. It is to be understood that the CASRM controller and/or a computer systemization may employ various forms of memory 3029. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 3029 will include ROM 3006, RAM 3005, and a storage device 3014. A storage device 3014 may be any conventional computer system storage. Storage devices may include a drum; a (fixed and/or removable) magnetic disk drive; a magneto-optical drive; an optical drive (i.e., Blu ray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 3029 may contain a collection of program and/or database components and/or data such as, but not limited to: operating system component(s) 3015 (operating system); information server component(s) 3016 (information server); user interface component(s) 3017 (user interface); Web browser component(s) 3018 (Web browser); database(s) 3019; mail server component(s) 3021; mail client component(s) 3022; cryptographic server component(s) 3020 (cryptographic server); the CASRM component(s) 3035, including components 3041-3043; and/or the like (i.e., collectively a component collection). These components may be stored and accessed from the storage devices and/or from storage devices accessible through an interface bus. Although non-conventional program components such as those in the component collection, typically, are stored in a local storage device 3014, they may also be loaded and/or stored in memory such as: peripheral devices, RAM, remote storage facilities through a communications network, ROM, various forms of memory, and/or the like.

Operating System

The operating system component 3015 is an executable program component facilitating the operation of the CASRM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CASRM controller to communicate with other entities through a communications network 3013. Various communication protocols may be used by the CASRM controller as a subcarrier transport mechanism for interaction, such as, but not limited to: multicast, TCP/IP, UDP, unicast, and/or the like.

Information Server

An information server component 3016 is a stored program component that is executed by a CPU. The information server may be a conventional Internet information server such as, but not limited to Apache Software Foundation's Apache, Microsoft's Internet r Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report at Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CASRM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CASRM database 3019, operating systems, other program components, user interfaces, Web browsers, and/or the like.

Access to the CASRM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CASRM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CASRM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 3017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3018 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CASRM enabled nodes. The combined application may be nugatory on systems employing standard Web browsers.

Mail Server

A mail server component 3021 is a stored program component that is executed by a CPU 3003. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CASRM.

Access to the CASRM mail may be achieved through a number of APIs offered by the individual Web server components and/or the operating system.

Also, a mail server may contain, communicate, generate, obtain, and/or provide program component, system, user, and/or data communications, requests, information, and/or responses.

Mall Client

A mail client component 3022 is a stored program component that is executed by a CPU 3003. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: MAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3020 is a stored program component that is executed by a CPU 3003, cryptographic processor 3026, cryptographic processor interface 3027, cryptographic processor device 3028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the CASRM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the CASRM component to engage in secure transactions if so desired. The cryptographic component facilitates the secure accessing of resources on the CASRM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The CASRM Database

The CASRM database component 3019 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the CASRM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CASRM database is implemented as a data-structure, the use of the CASRM database 3019 may be integrated into another component such as the CASRM component 3035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3019 includes several tables 3019a-i. A user account table 3019a includes fields such as, but not limited to: user_ID, user_name, user_password, user_fname, user_lname, user_address, user_devices, user_email, user_date_added, user_controllers, user_buildings, and/or the like. The user account table may support and/or track multiple user accounts on a CASRM.

A controller table 3019b includes fields such as, but not limited to: controller_ID, controller_type, controller_make, controller_model, controller_version, controller_location, controller_settings_current, controller_settings_history, controller_child_controllers, controller_initiated, controller_last_updated, and/or the like. The controller table may support and/or track multiple controllers on a CASRM.

A building table 3019c includes fields such as, but not limited to: building_ID, building_name, building_address, building_GPS, building_floors, and/or the like. The building table may support and/or track buildings using controllers on a CASRM.

A floor table 3019d includes fields such as, but not limited to: floor_ID, floor_name, floor_controllers, floor_rooms, floor_number, and/or the like. The floor table may support and/or track floors using controllers on a CASRM.

A room table 3019e includes fields such as, but not limited to: room_ID, room_type, room_name, room_controllers, room_number, room_window_facing, and/or the like. The room table may support and/or track rooms using controllers on a CASRM.

An applications table 3019f includes fields such as, but not limited to: app_ID, app_controller_type, app_duration, app_created, app_code, app_version, app_supported, and/or the like. The applications table may support and/or track applications for controllers on a CASRM.

A data logs table 3019g includes fields such as, but not limited to: log_ID, log_date, log_settings, log_errors, logs_status, logs_usage, and/or the like. The building table may support and/or track data logs from controllers on a CASRM.

A weather table 3019h includes fields such as, but not limited to: weather_ID, weather_date, weather_temperature, weather_humidity, weather_daytime, weather_nighttime, weather_storm_data, and/or the like. The weather table may support and/or track weather data on a CASRM.

A verification code table 3019i includes fields such as, but not limited to: verification_ID, verification_controller, verification_URL, verification_auth_code, verification_duration, verification_created, and/or the like. The verification code table may support and/or track verification codes on a CASRM.

In one embodiment, the CASRM database may interact with other database systems. For example, employing a distributed database system, queries and data access by search CASRM component may treat the combination of the CASRM database, an integrated data security layer database as a single database entity.

In one embodiment, user programs may contain various user interface primitives, which may serve to update the CASRM. Also, various accounts may require custom database tables depending upon the environments and the types of clients the CASRM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3019a-i. The CASRM may be configured to keep track of various settings, inputs, and parameters via database controllers.

The CASRM database may communicate to and/or with other components in a component collection, including itself, and/or facilities of the like. Most frequently, the CASRM database communicates with the CASRM component, other program components, and/or the like. The database may contain, retain, and provide information regarding other nodes and data.

The CASRMs

The CASRM component 3035 is a stored program component that is executed by a CPU. In one embodiment, the CASRM component incorporates any and/or all combinations of the aspects of the CASRM that was discussed in the previous figures. As such, the CASRM affects accessing, obtaining and the provision of information, services, transactions, and/or the like across various communications networks. The features and embodiments of the CASRM discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the CASRM's features and facilities, and in many cases reduce the costs, energy consumption/requirements, and extend the life of CASRM's underlying infrastructure; this has the added benefit of making the CASRM more reliable. Similarly, many of the features and mechanisms are designed to be easier for users to use and access, thereby broadening the audience that may enjoy/employ and exploit the feature sets of the CASRM; such ease of use also helps to increase the reliability of the CASRM. In addition, the feature sets include heightened security as noted via the Cryptographic components 3020, 3026, 3028 and throughout, making access to the features and data more reliable and secure.

The CASRM transforms resource use, weather, and user settings inputs via CASRM's New Controller Configuration 3041, Controller Settings Update 3042, and Guest Controller Authorization Component 3043 components into resource management schedules and controls outputs.

The CASRM component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery (UI); MooTools; Prototype; script.aculo.us; Simple Object Access Protocol (SOAP); SWFObject; Yahoo! User Interface; and/or the like), WebObjects, and/or the like. In one embodiment, the CASRM server employs a cryptographic server to encrypt and decrypt communications. The CASRM component may communicate to and/or with other components in a component collection, including itself, and/or facilities of the like. Most frequently, the CASRM component communicates with the CASRM database, operating systems, other program components, and/or the like. The CASRM may contain, communicate, generate, obtain, and/or provide program component, system, user, and/or data communications, requests, and/or responses.

Distributed CASRMs

The structure and/or operation of any of the CASRM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CASRM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CASRM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLTENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:
  http://publib.boulder.ibm.com/infocenter/tivihelp/v2r1/index.jsp?topic=/com.ibm.IBMDI.doc/referenceguide259.htm
all of which are hereby expressly incorporated by reference.

Additional Embodiments

A1. An apparatus for managing resources, comprising a processor; and a memory disposed in communication with the processor and storing processor-executable instructions to receive a request from an at least one electronic resource monitoring device to authenticate a settings update for the least one resource monitoring device; verify the relationship between a user and the at least one resource monitoring device and a network on which the at least one resource monitoring device resides; send a confirmation to the at least one resource monitoring device indicating that it can update its settings; and store the information in the settings update in a database.

A2. The apparatus of embodiment A1 further comprising processor-executable instructions to generate a historical record of the settings updates submitted by the at least one resource monitoring device; and provide the historical record to the at least one resource monitoring device.

A3. The embodiment according to A1 or A2, wherein the at least one electronic resource monitoring device forwards its settings update to a local resource monitoring device. A4. The embodiment according to any of A1-A3, wherein network is a virtual network and wherein the request to authenticate includes credentials for logging into the virtual network.

A5. The embodiment(s) according to any of A1-A4, further comprising processor-executable instructions to receive from a user a request to authenticate an update to alter a resource monitoring device's virtual network address from a first virtual network to a second virtual network; authenticate the user via verifying access rights on the first virtual network, the second virtual network, and the resource monitoring device; move the resource monitoring device from the first virtual network to the second virtual network via updating the virtual network address of the resource monitoring device to reflect that it is on the second virtual network; and send a notification to the user indicating the device has been moved to the second virtual network.

The embodiments according to any of A1-A5, wherein the request to authenticate is sent to a virtual network layer emulating physical network infrastructure. The virtual network layer may emulate a BACnet network layer, and may further comprise secure virtual web sockets.

B1. A processor-implemented method for managing resources, comprising receiving a request from at least one electronic resource monitoring device to authenticate a settings update for the least one resource monitoring device; verifying the relationship between a user and the at least one resource monitoring device and a network on which the at least one monitoring device resides; sending a confirmation to the at least one resource monitoring device indicating that it can update its settings; and storing the information in the settings update in a database. The method further comprising generating a historical record of the settings updates submitted by the at least one resource monitoring device; and providing the historical record to the at least one resource monitoring device.

B2. The embodiment of B1, wherein the at least one electronic resource monitoring device forwards its settings update to a local resource monitoring device. The network is a virtual network and wherein the request to authenticate includes credentials for logging into the virtual network.

B3. The method of embodiment B1 or B2, further comprising receiving from a user a request to authenticate an update to alter a resource monitoring device's virtual network address from a first virtual network to a second virtual network; authenticating the user via verifying access rights on the first virtual network, the second virtual network, and the resource monitoring device; moving the resource monitoring device from the first virtual network to the second virtual network via updating the virtual network address of the resource monitoring device to reflect that it is on the second virtual network; and sending a notification to the user indicating the device has been moved to the second virtual network.

B4. The method of any of embodiments B1-B3, wherein the request to authenticate is sent to a virtual network layer emulating physical network infrastructure. The virtual network layer may emulate a BACnet network layer, and may further comprise secure virtual web sockets.

C1. A system for managing resources, comprising means for receiving a request from at least one electronic resource monitoring device to authenticate a settings update for the least one resource monitoring device; means for verifying the relationship between a user and the at least one resource monitoring device and a network on which the at least one resource monitoring device resides; means for sending a confirmation to the at least one resource monitoring device indicating that it can update its settings; and means for storing the information in the settings update in a database.

C2. The system of embodiment C1, further comprising means for generating a historical record of the settings updates submitted by the at least one resource monitoring device; and means for providing the historical record to the at least one resource monitoring device.

C3. The system of C1 or C2, wherein the at least one electronic resource monitoring device forwards its settings update to a local resource monitoring device. C4. The system of any of C1-C3, wherein the network is a virtual network and wherein the request to authenticate comprises credentials for logging into the virtual network.

C5. The system of any of embodiments C1-C4, further comprising means for receiving from a user a request to authenticate an update to alter a resource monitoring device's virtual network address from a first virtual network to a second virtual network; means for authenticating the user via verifying access rights on the first virtual network, the second virtual network, and the resource monitoring device; means for moving the resource monitoring device from the first virtual network to the second virtual network via updating the virtual network address of the resource monitoring device to reflect that it is on the second virtual network; and means for sending a notification to the user indicating the device has been moved to the second virtual network.

C6. The system according to any of embodiments C1-C5, wherein the request to authenticate is sent to a virtual network layer emulating physical network infrastructure. The virtual network layer may emulate a BACnet network layer, and may further comprise secure virtual web sockets.

D1. A processor-readable non-transitory computer medium for managing resources, storing processor instructions to receive a request from at least one electronic resource monitoring device to authenticate a settings update for the least one resource monitoring device; verify the relationship between a user and the at least one resource monitoring device and a network on which the at least one resource monitoring device resides; send a confirmation to the at least one resource monitoring device indicating that it can update its settings; and store the information in the settings update in a database.

D2. The medium of embodiment D1, further comprising processor-executable instructions to generate a historical record of the settings updates submitted by the at least one resource monitoring device; and provide the historical record to the at least one resource monitoring device.

D3. The medium of embodiment D1 or D2, wherein the at least one electronic resource monitoring device forwards its settings update to a local resource monitoring device. The network is a virtual network and wherein the request to authenticate comprises credentials for logging into the virtual network.

D4. The medium of any of embodiments D1-D3, further comprising processor-executable instructions to receive from a user a request to authenticate an update to alter a resource monitoring device's virtual network address from a first virtual network to a second virtual network; authenticate the user via verifying access rights on the first virtual network, the second virtual network, and the resource monitoring device; move the resource monitoring device from the first virtual network to the second virtual network via updating the virtual network address of the resource monitoring device to reflect that it is on the second virtual network; and send a notification to the user indicating the device has been moved to the second virtual network.

D5. The medium of any of embodiments D1-D4, wherein the request to authenticate is sent to a virtual network layer emulating physical network infrastructure. D6. The medium according to any of embodiments D1-D5, wherein the virtual network layer may emulate a BACnet network layer, and may further comprise secure virtual web sockets.

Additional embodiments are described below, which are understood to be implementable as methods, apparatuses, processes, systems, and so forth. Methods and processes according to the disclosure can be stored on tangible, computer readable media. The following are exemplary non-limiting embodiments:

E1. A building automation management device, comprising a processor and a memory disposed in communication with the processor and storing processor-executable instructions to: receive at a virtual cloud network controller a data packet from a source building resource control device; access a virtual routing table corresponding to a local virtual network associated with a control entity; determine a destination building resource control device based on the virtual routing table and at least one destination address in the data packet; and send the data packet to the destination building resource control device. In some embodiments, the device enables integration of a sub devices and/or components that have different communication protocols, for example, a source building resource control device using a first communication protocol, and a destination building resource control device uses a second communication protocol different from the first communication protocol.

E2. The building automation management device of embodiment E1, further comprising instructions to: authenticate the data packet from the source building resource control device.

E3. The building automation management device of E1 or E2, wherein the data packet includes destination building resource control device settings.

E4. The building automation management device of embodiment E1, E2, or E3, wherein the destination building resource control device is a secondary building resource device.

E5. The building automation management device of embodiment E4, wherein the secondary building resource device is one or more of an energy management device, an energy monitoring device, and/or a lighting device and wherein the settings altered are one of lighting settings and energy settings for devices connected to the secondary building resource device.

E6. The building automation management device of embodiment E4 or E5, wherein the settings altered are one or more of lighting settings and energy settings for one or more devices connected to the secondary building resource device.

E7. The building automation management device of embodiment E4, E5 or E6, wherein the secondary building resource device and/or a device connected thereto is a Heating, Ventilation, and Air Conditioning (HVAC) device, and wherein the settings altered are one of heating, ventilation, or air conditioning settings.

E8. The building automation management device of any of embodiments E1-E7, wherein the control entity is a user account authorized to operate the source building resource control device.

E9. The building automation management device of any of embodiments E2 to E8, wherein authenticating the data packet includes authenticating user credentials within the data packet.

E10. The building automation management device of any embodiments E1 to E9, wherein the local virtual network includes virtual network nodes, each of the virtual network nodes corresponding to a building resource control device operated by the control entity.

E11. The building automation management device of embodiment E10, wherein representations of the virtual network nodes are instantiated in the virtual cloud network controller.

E12. A building automation management device, comprising: a processor; and a memory disposed in communication with the processor and storing processor-executable instructions to: receive a registration request from a building resource control device; generate a first virtual local network; generate a virtual network node with a virtual local address, the virtual local address corresponding to a first location of the virtual network node within the first virtual local network; map the virtual network node to the building resource control device; store first virtual local network and virtual network node information in a database; receive a location modification request for a virtual network node corresponding to the building resource control device, the location modification request including instructions to modify the virtual local address of the virtual network node to correspond to a location on a second virtual network; move the building resource control device from the first virtual network to the second virtual network via changing the virtual network address of the virtual network node corresponding to the building resource control device to a second virtual network address located on the second virtual local network; and send a notification indicating the building resource control device has been moved to the second virtual network.

E13. The building automation management device of embodiment E12, further comprising instructions to: receive a registration request for a secondary building resource device; authenticate the registration request; generate a new virtual network node with a new virtual local address, the new virtual local address corresponding to a location of the new virtual network node within the first virtual local network; map the new virtual network node to the secondary building resource device; link the new virtual network node to the virtual network node corresponding to the building resource management device within the first virtual local network; store new virtual network node information in the database; and store permissions in the database to allow the secondary building resource device to be issued instructions from the building resource control device, the instructions issued from the building resource control device including instructions to alter the settings on the secondary building resource device.

E14. The building automation management device of embodiment E12 or E13, wherein the secondary building resource device is an energy management device, and wherein the settings altered are at least one of lighting settings and/or energy settings for one or more devices connected to the secondary building resource device.

E15. The building automation management device of embodiment E12, E13 and/or E14, wherein the secondary building resource device and/or a device connected thereto is a Heating, Ventilation, and Air Conditioning (HVAC) device, and wherein the settings altered are one of heating, ventilation, or air conditioning settings.

E16. The building automation management device of any of embodiment E12-E15, wherein the secondary building resource device comprises a plurality of building resource devices, wherein instructions issued from the building resource control device are implemented across the plurality of building resource devices.

E17. The building automation management device of any of embodiment E12-E16, wherein the secondary building resource device is a utility device in control of a utility resource, and wherein the settings altered are utility resource consumption settings.

E18. The building automation management device of embodiment E17, wherein the at least one utility resource is one of electric, gas, water, or oil.

E19. The building automation management device of any of embodiments E11 to E18, wherein the secondary building resource device is a secondary building resource control device, and wherein the settings altered include settings to control at least one further building resource device.

E20. The building automation management device of any of embodiments E12 to E19, wherein the building resource control device is associated with a building in a first geographic location and the secondary building resource device is associated with a building in a second geographic location separate from the first geographic location.

E21. The building automation management device of any of embodiments E12 to E20, wherein the registration request from a building resource control device is authenticated prior to generating the first virtual local network.

E22. A building automation management device, comprising: a processor; and a memory disposed in communication with the processor and storing processor-executable instructions to: receive a registration request from an electronic building resource control device operated by a user; add via the cloud network controller a virtual local network node to a virtual local network associated with the user, the virtual local network node corresponding to the electronic building resource management device; generate a virtual local Internet Protocol (IP) address for the virtual local network node; and provide the virtual local IP address to the electronic building resource control device.

E23. The building automation management device of embodiment E22, further comprising instructions to: authenticate the registration request from the electronic building resource control device.

E24. The building automation management device of embodiment E22, wherein the electronic building resource control device is a primary electronic building resource control device, wherein the primary electronic building resource control device is added to a new local virtual network associated with the user and the primary electronic building resource control device when the primary electronic building resource control device sends the registration request.

E25. The building automation management device of any of embodiments E22 to E24, wherein the electronic building resource control device is a secondary electronic building resource control device, wherein the secondary electronic building resource control device is added to an existing local virtual network associated with the user and the primary electronic building resource control device when the secondary electronic building resource control device sends the registration request.

E26. The building automation management device of any of embodiments E22 to E25, wherein the virtual local network is a virtual network instantiated on the cloud network controller.

E27. The building automation management device of any of embodiments E22 to E26, wherein adding the virtual local network node further comprises: updating a virtual local network topology map to include the virtual local network node as a virtual local network edge node in the virtual local network topology map.

E28. A building automation management hospitality device comprising: a processor; and a memory disposed in communication with the processor and storing processor-executable instructions to: receive an indication that a guest user is using a physical space associated with an electronic building resource control device; generate a verification code for the electronic building resource control device; provide the verification code to the electronic building resource control device for display; receive an authentication request based on the displayed verification code to authenticate the guest user; authenticate the guest user based on data in the authentication request; establish guest authorization access parameters based on the authentication of the authentication request, wherein the guest authorization parameters include a guest authorization expiration time; authorize guest user access to the electronic building resource control device according to the established guest authorization access parameters; and deauthorize guest user access to the electronic building resource control device according to the established guest authorization access parameters.

E29. The building automation management hospitality device of embodiment E28, wherein the verification code is one of a QR code or a bar code. In some embodiments, the verification code can be transmitted by a user's mobile device, either locally (e.g., via Bluetooth or the like) and/or may be sent over wireless networks such as wireless data and/or cellular networks).

E30. The building automation management device of embodiment E29, wherein the verification code includes one of an authentication code or a URL including an embedded authentication code.

E31. The building automation management device of any of embodiments E28 to E30, wherein the guest user access is deauthorized when the guest authorization expiration time has elapsed.

E32. The building automation management device of any of embodiments E28 to E31, wherein the device is part of a virtual network. In some implementations, embodiment E28 may be implemented on one or more of the embodiments of E1 to E27.

E33. The building automation management device of any of embodiments E1 to E32, wherein the source building resource control device uses a first communication protocol, and wherein the destination building resource control device uses a second communication protocol different from the first communication protocol.

E34. A building automation management device according to any one of E1 to E33, in combination with one of more of the remaining of E1 to E33.

E35. A method implementing the instructions of any of embodiments E1 to E34.

E36. A computer readable, non-transitory tangible medium for implementing the method of embodiment E35.

In order to address various issues and advance the art, the entirety of this application for CLOUD-AUTHENTICATED SITE RESOURCE MANAGEMENT DEVICES, APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CASRM individual and/or enterprise user, database configuration and/or relational model, data type, data transmission and/or network framework, syntax structure, and/or the like, various embodiments of the CASRM, may be implemented that enable a great deal of flexibility and customization. While various embodiments and discussions of the CASRM have included controllers for resource management, it is to be understood that the embodiments described herein may be readily configured and/or customized for a wide variety of other applications and/or implementations.

What is claimed is:

1. A building automation management device comprising:
a processor; and
a memory disposed in communication with the processor and storing processor-executable instructions to:
receive an indication that a guest user is using a physical space associated with an electronic building resource control device;
generate a verification code for the electronic building resource control device;
provide the verification code to the electronic building resource control device for display;
receive an authentication request based on the displayed verification code to authenticate the guest user;
authenticate the guest user based on data in the authentication request;
establish guest authorization access parameters based on the authentication of the authentication request, wherein the guest authorization parameters include a guest authorization expiration time;
authorize guest user access to the electronic building resource control device according to the established guest authorization access parameters; and
deauthorize guest user access to the electronic building resource control device according to the established guest authorization access parameters.

2. The building automation management device of claim 1, wherein the verification code is one of a QR code or a bar code.

3. The building automation management device of claim 2, wherein the verification code includes one of an authentication code or a URL including an embedded authentication code.

4. The building automation management device of claim 1, wherein the guest user access is deauthorized when the guest authorization expiration time has elapsed.

5. The building automation management device of claim 1, wherein the electronic building resource control device is part of a virtual network.

6. The building automation management device of claim 1, wherein a server is configured to receive the indication that the guest user is using the physical space associated with the electronic building resource control device located in the physical space, and
wherein the server is configured to generate the verification code to be sent by the server to the electronic building resource control device, the verification code including information the guest user uses to prepare the authentication request to send to the server for the purpose of authenticating the guest user with the server, and for gaining access to temporarily control the electronic building resource control device.

7. The building automation management device of claim 6, wherein the electronic building resource control device displays the verification code received from the server, and
wherein the guest user reads the displayed verification code with an electronic device of the guest user's to obtain communication information required for the guest user's electronic device to send the authentication request and data to the server.

8. The building automation management device of claim 7, wherein the server receives the authentication request from the guest user's electronic device,
wherein the server is configured to authenticate the guest user based on the data in the authentication request; and
wherein the server is configured to send guest user authorization access parameters to the guest user's electronic device to authorize the guest user's electronic device to interact with the electronic building resource control device to provide resource controls and settings to the electronic building resource control device according to the established guest authorization access parameters.

9. A building automation management method, comprising:
receiving, by a computing device, an indication that a guest user is using a physical space associated with an electronic building resource control device;
generating, by the computing device, a verification code for the electronic building resource control device;
providing, by the computing device, the verification code to the electronic building resource control device for display;
receiving, by the computing device, an authentication request based on the displayed verification code to authenticate the guest user;
authenticating, by the computing device, the guest user based on data in the authentication request;
establishing, by the computing device, guest authorization access parameters based on the authentication of the authentication request, wherein the guest authorization parameters include a guest authorization expiration time;
authorizing, by the computing device, guest user access to the electronic building resource control device according to the established guest authorization access parameters; and
deauthorizing, by the computing device, guest user access to the electronic building resource control device according to the established guest authorization access parameters.

10. The building automation management method of claim 9, wherein the verification code is one of a QR code or a bar code.

11. The building automation management method of claim 10, wherein the verification code includes one of an authentication code or a URL including an embedded authentication code.

12. The building automation management method of claim 9, wherein the guest user access is deauthorized when the guest authorization expiration time has elapsed.

13. The building automation management method of claim 9, wherein the electronic building resource control device is part of a virtual network.

14. The building automation management method of claim 9, wherein the computing device is configured to receive the indication that the guest user is using the physical space associated with the electronic building resource control device located in the physical space, and wherein the computing device is configured to generate the verification code to be sent by the computing device to the electronic building resource control device, the verification code including information the guest user uses to prepare the authentication request to send to the computing device for the purpose of authenticating the guest user with the computing device, and for gaining access to temporarily control the electronic building resource control device.

15. The building automation management method of claim 14, wherein the electronic building resource control device displays the verification code received from the server, and wherein the guest user reads the displayed verification code with an electronic device of the guest user's to obtain communication information required for the guest user's electronic device to send the authentication request and data to the server.

16. The building automation management method of claim 15, wherein the server receives the authentication request from the guest user's electronic device, wherein the server is configured to authenticate the guest user based on the data in the authentication request; and wherein the server is configured to send guest user authorization access parameters to the guest user's electronic device to authorize the guest user's electronic device to interact with the electronic building resource control device to provide resource controls and settings to the electronic building resource control device according to the established guest authorization access parameters.

17. A computer program product comprising computer executable program code recorded on a computer readable non-transitory storage medium, the computer executable program code comprising:

code for receiving an indication that a guest user is using a physical space associated with an electronic building resource control device;

code for generating a verification code for the electronic building resource control device;

code for providing the verification code to the electronic building resource control device for display;

code for receiving an authentication request based on the displayed verification code to authenticate the guest user;

code for authenticating the guest user based on data in the authentication request;

code for establishing guest authorization access parameters based on the authentication of the authentication request, wherein the guest authorization parameters include a guest authorization expiration time;

code for authorizing guest user access to the electronic building resource control device according to the established guest authorization access parameters; and code for deauthorizing guest user access to the electronic building resource control device according to the established guest authorization access parameters.

18. The computer program product of claim 17, wherein the verification code is one of a QR code or a bar code.

19. The computer program product of claim 18, wherein the verification code includes one of an authentication code or a URL including an embedded authentication code.

20. The computer program product of claim 17, wherein the guest user access is deauthorized when the guest authorization expiration time has elapsed.

* * * * *